United States Patent
Sengupta et al.

(10) Patent No.: US 10,886,963 B2
(45) Date of Patent: Jan. 5, 2021

(54) SYSTEM AND METHOD FOR TRANSCEIVER AND ANTENNA PROGRAMMABILITY AND GENERALIZED MIMO ARCHITECTURES

(71) Applicant: The Trustees of Princeton University, Princeton, NJ (US)

(72) Inventors: Kaushik Sengupta, Princeton, NJ (US); Xue Wu, San Diego, CA (US); Chandrakanth Chappidi, Princeton, NJ (US); Xuyang Lu, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 0 days.

(21) Appl. No.: 16/453,461

(22) Filed: Jun. 26, 2019

(65) Prior Publication Data

US 2019/0393921 A1 Dec. 26, 2019

Related U.S. Application Data

(60) Provisional application No. 62/690,115, filed on Jun. 26, 2018.

(51) Int. Cl.
*H04B 1/00* (2006.01)
*H04B 1/40* (2015.01)
(Continued)

(52) U.S. Cl.
CPC .............. *H04B 1/40* (2013.01); *H01Q 5/335* (2015.01); *H04B 1/0458* (2013.01); *H04B 1/18* (2013.01); *H04B 7/0413* (2013.01)

(58) Field of Classification Search
CPC ........ H04B 1/18; H04B 1/0458; H04B 7/088; H04B 7/0413; H04B 7/0617;
(Continued)

(56) References Cited

U.S. PATENT DOCUMENTS

| 7,330,152 B2* | 2/2008 | Zhang | ...................... H01Q 3/24 343/700 MS |
| 7,855,696 B2* | 12/2010 | Gummalla | ............. H01Q 1/243 342/359 |

(Continued)

OTHER PUBLICATIONS

C. R. Chappidi, X. Lu, X. Wu and K. Sengupta, "Antenna Preprocessing and Element-Pattern Shaping for Multi-Band mmWave Arrays: Multi-Port Transmitters and Antennas," in IEEE Journal of Solid-State Circuits. 2020.

(Continued)

*Primary Examiner* — Quochien B Vuong
(74) *Attorney, Agent, or Firm* — Meagher Emanuel Laks Goldberg & Liao, LLP

(57) ABSTRACT

Embodiments generally disclosed herein relate to a sub-wavelength multi-port codesign approach between the unit transceiver element and the integrated EM interface to enable a generalized broadband MIMO array with individually programmable element patterns. The co-design approach allows processing of radiated signals at the antenna level distinct from classical arrays. The transmitter and receiver architectures with the integrated EM interface are implemented in 65-nm CMOS and have a bandwidth of 37-73 GHz. Wireless links with data rates up to 12 Gb/s are demonstrated across the spectrum with a wide range of reconfigurability of the active EM interface. The multifunctional EM interface and the broadband transceivers can enable future efficient and compact MIMO arrays for reliable links exploiting frequency, spatial, pattern and polarization diversities.

32 Claims, 81 Drawing Sheets

(51) Int. Cl.
  *H01Q 5/335* (2015.01)
  *H04B 7/0413* (2017.01)
  *H04B 1/04* (2006.01)
  *H04B 1/18* (2006.01)
(58) Field of Classification Search
  CPC ........ H04B 1/0413; H04B 1/40; H01Q 5/335; H01Q 5/385; H01Q 5/45; H01Q 3/385; H01Q 21/22; H04W 16/28
  See application file for complete search history.

(56) References Cited

U.S. PATENT DOCUMENTS

| | | | | |
|---|---|---|---|---|
| 7,898,480 | B2* | 3/2011 | Ebling | G01S 13/931 |
| | | | | 343/700 MS |
| 8,190,104 | B2* | 5/2012 | Yamamoto | H04B 7/0808 |
| | | | | 455/562.1 |
| 8,577,302 | B2* | 11/2013 | Aldana | H04B 7/0417 |
| | | | | 455/562.1 |
| 8,934,774 | B2* | 1/2015 | Yi | H01Q 3/2676 |
| | | | | 398/103 |
| 9,698,839 | B2* | 7/2017 | Khlat | H04B 1/1027 |
| 10,045,364 | B2* | 8/2018 | Shtrom | H04B 17/102 |
| 10,381,716 | B2* | 8/2019 | Matitsine | H01Q 19/062 |
| 10,433,260 | B1* | 10/2019 | Krishnamachari | H04W 52/26 |
| 2015/0253419 | A1* | 9/2015 | Alland | G01S 7/02 |
| | | | | 342/385 |

OTHER PUBLICATIONS

X. Lu, C. R. Chappidi, X. Wu and K. Sengupta, "Antenna Preprocessing and Element-Pattern Shaping for Multi-Band mmWave Arrays: Multi-Port Receivers and Antennas," in IEEE Journal of Solid-State Circuits. 2020.

Wu, X., Lu, H. and Sengupta, K. "Programmable terahertz chip-scale sensing interface with direct digital reconfiguration at sub-wavelength scales," Nat Commun 10, 2722 (2019).

Wu, X. and Sengupta, K. "Single-chip source-free terahertz spectroscope across 0.04-0.99 THz: combining sub-wavelength near-field sensing and regression analysis," Opt. Express 26, 7163-7175 (2018).

X. Lu, X. Wu, H. Saeidi and K. Sengupta, "A Multi-Port Dual Polarized Antenna Coupled mm-Wave CMOS Receiver with Element-level Pattern and Notch Programmability and Passive Interferer Rejection Capability," 2019 IEEE Custom Integrated Circuits Conference (CICC), Austin, TX, USA, 2019, pp. 1-4.

C. R. Chappidi and K. Sengupta, "Frequency Reconfigurable mm-Wave Power Amplifier With Active Impedance Synthesis in an Asymmetrical Non-Isolated Combiner: Analysis and Design," in IEEE Journal of Solid-State Circuits, vol. 52, No. 8, pp. 1990-2008, Aug. 2017.

K. F. Warnick and M. A. Jensen, "Optimal Noise Matching for Mutually Coupled Arrays," in IEEE Transactions on Antennas and Propagation, vol. 55, No. 6, pp. 1726-1731, Jun. 2007.

T. S. Rappaport et al., "Millimeter Wave Mobile Communications for 5G Cellular: It Will Work!," in IEEE Access, vol. 1, pp. 335-349, 2013.

K. Sengupta, K. Dasgupta, S. M. Bowers and A. Hajimiri, "On-chip sensing and actuation methods for integrated self-healing mm-wave CMOS power amplifier," 2012 IEEE/MTT-S International Microwave Symposium Digest, Montreal, QC, 2012, pp. 1-3.

M. Boers et al., "A 16TX/16RX 60 GHz 802.11ad Chipset With Single Coaxial Interface and Polarization Diversity," in IEEE Journal of Solid-State Circuits, vol. 49, No. 12, pp. 3031-3045, Dec. 2014.

K. Sengupta and A. Hajimiri, "Designing Optimal Surface Currents for Efficient On-Chip mm-Wave Radiators With Active Circuitry," in IEEE Transactions on Microwave Theory and Techniques, vol. 64, No. 7, pp. 1976-1988, Jul. 2016.

* cited by examiner

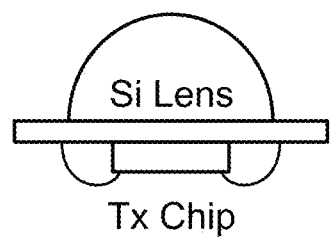
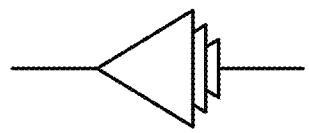
PA DAC
4X 2X 1X
Code 7
=4X+2X+1X
*FIG. 8(c)*

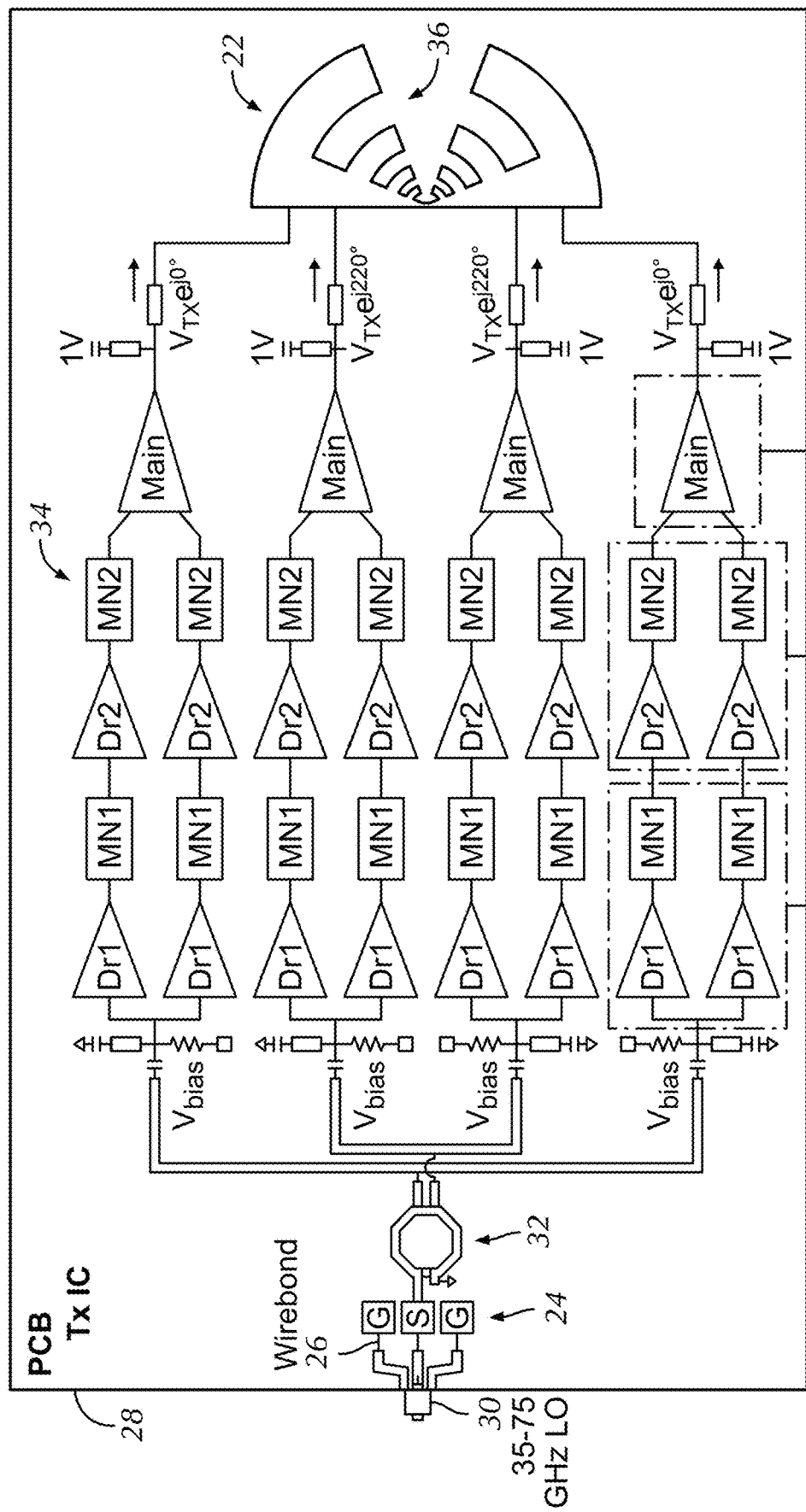

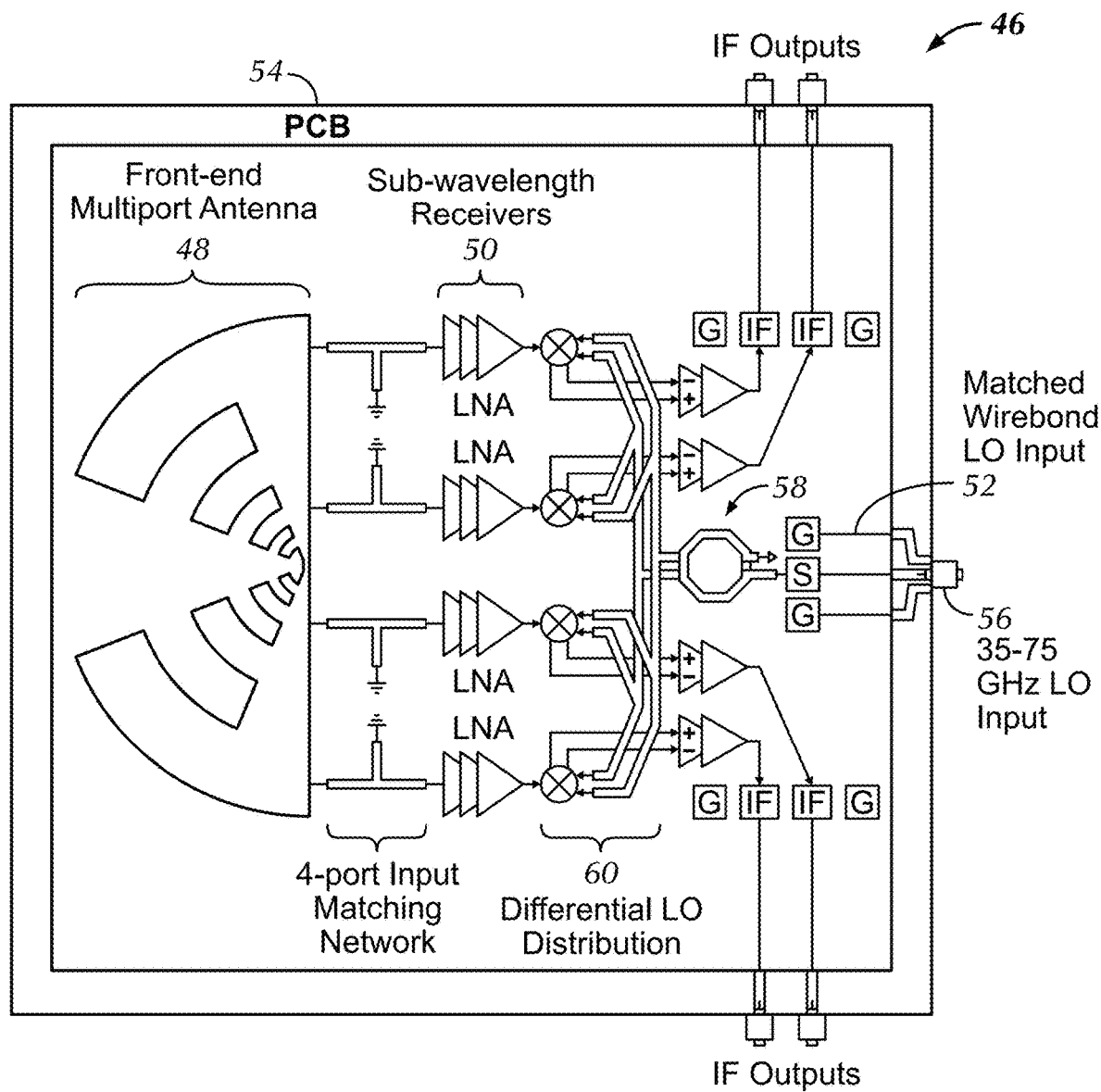
FIG. 14(a-1)

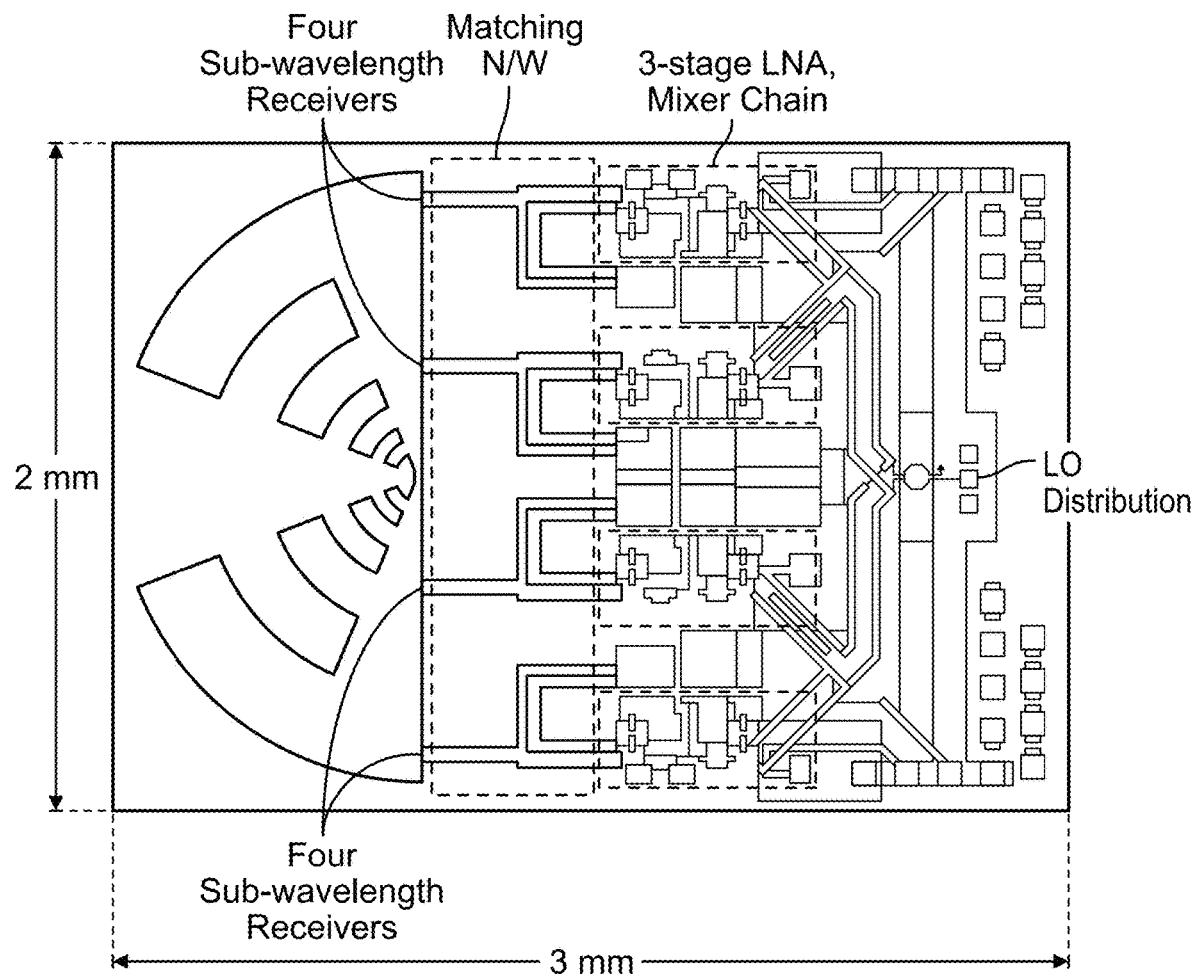
FIG. 14(a-2)

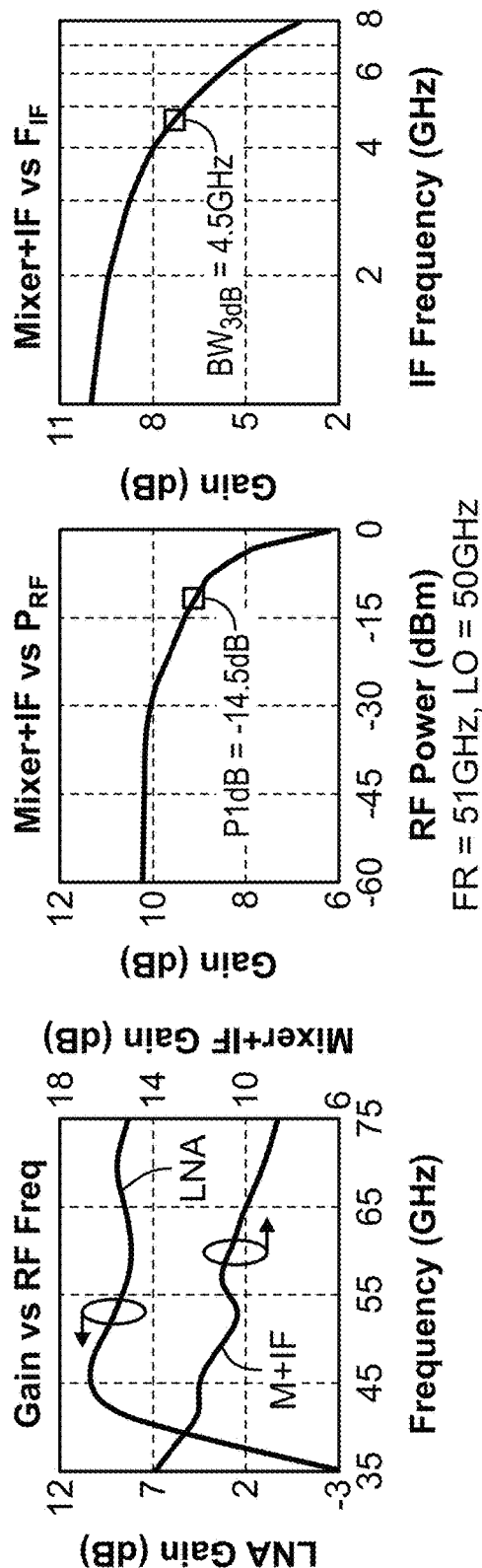
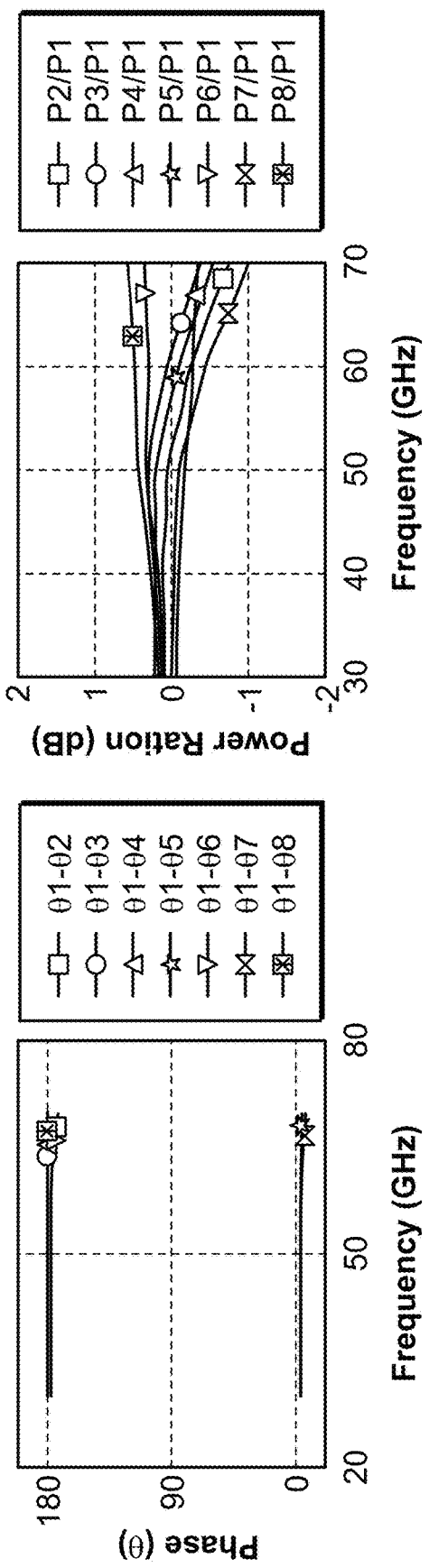
FIG. 15(b)

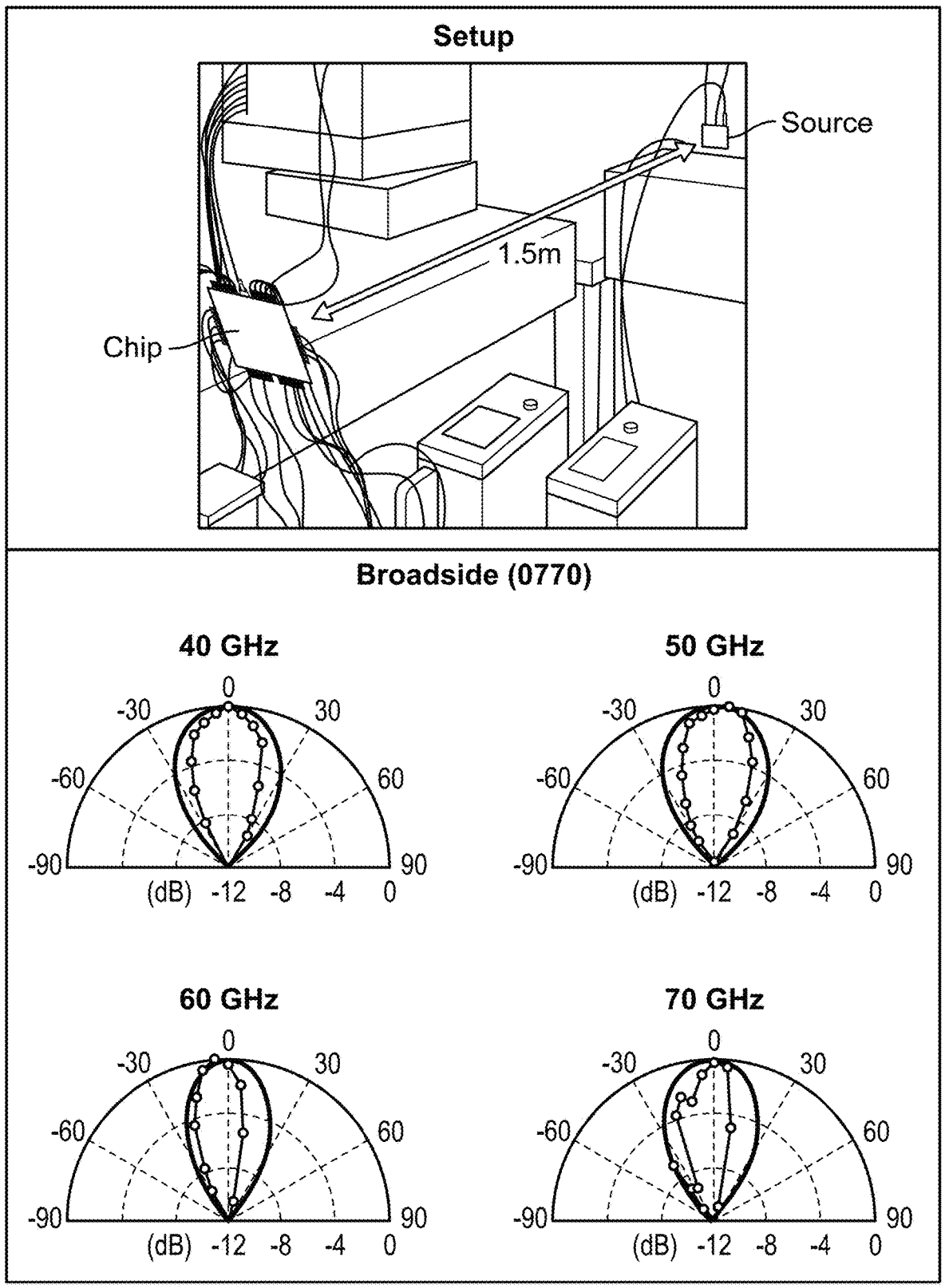
FIG. 22(a-1)

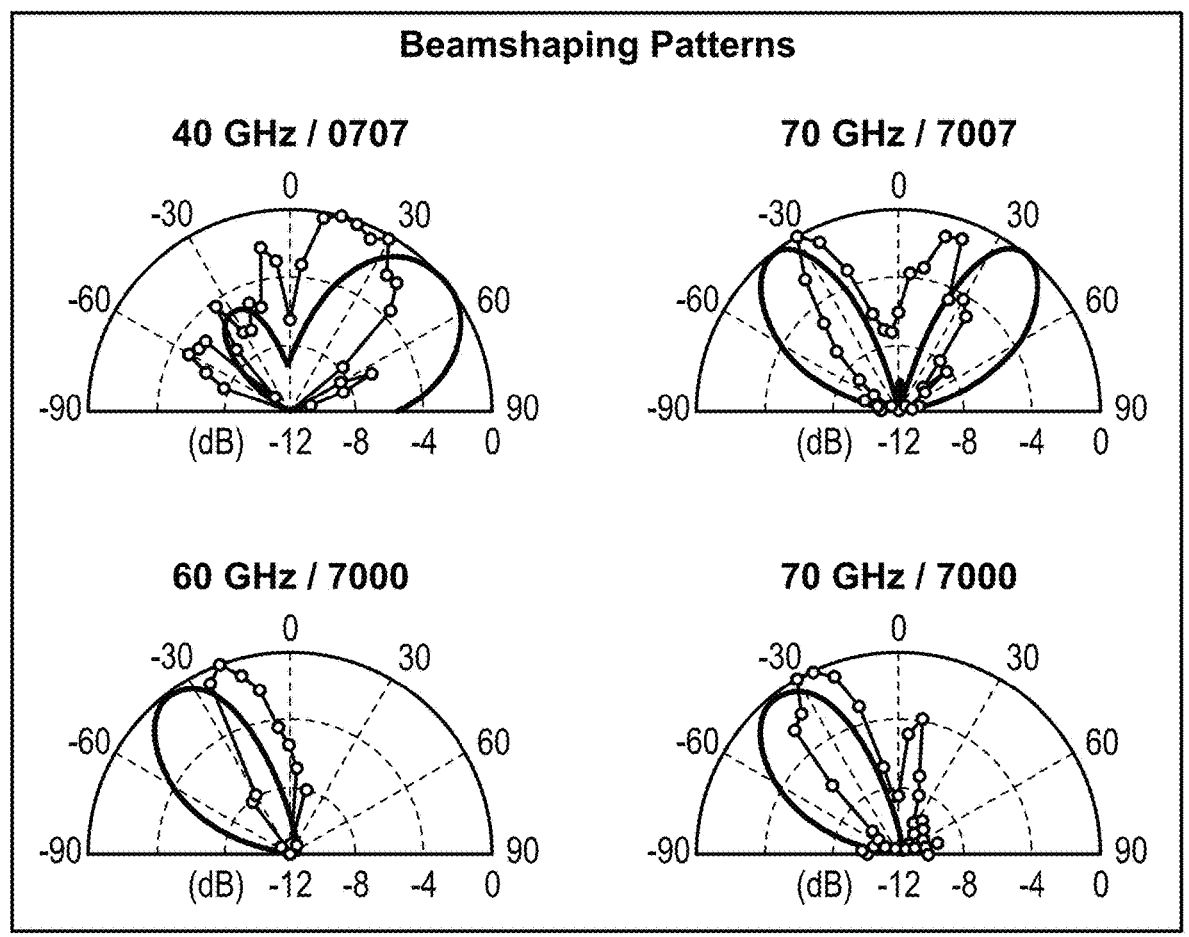
FIG. 22(a-2)

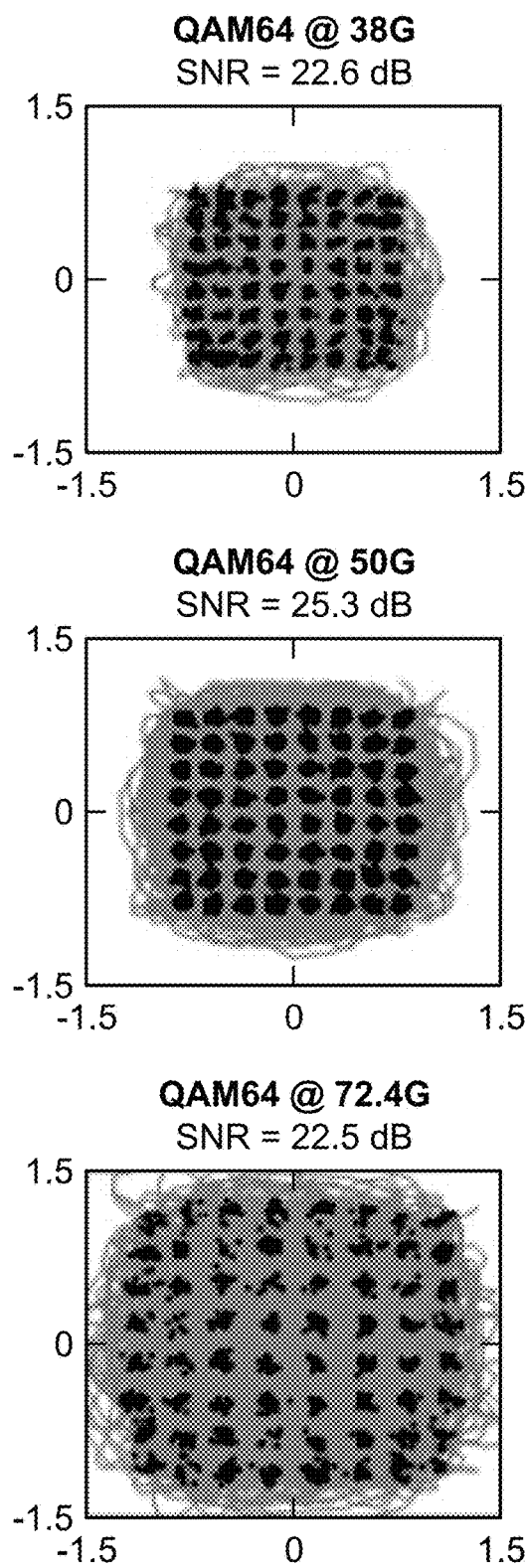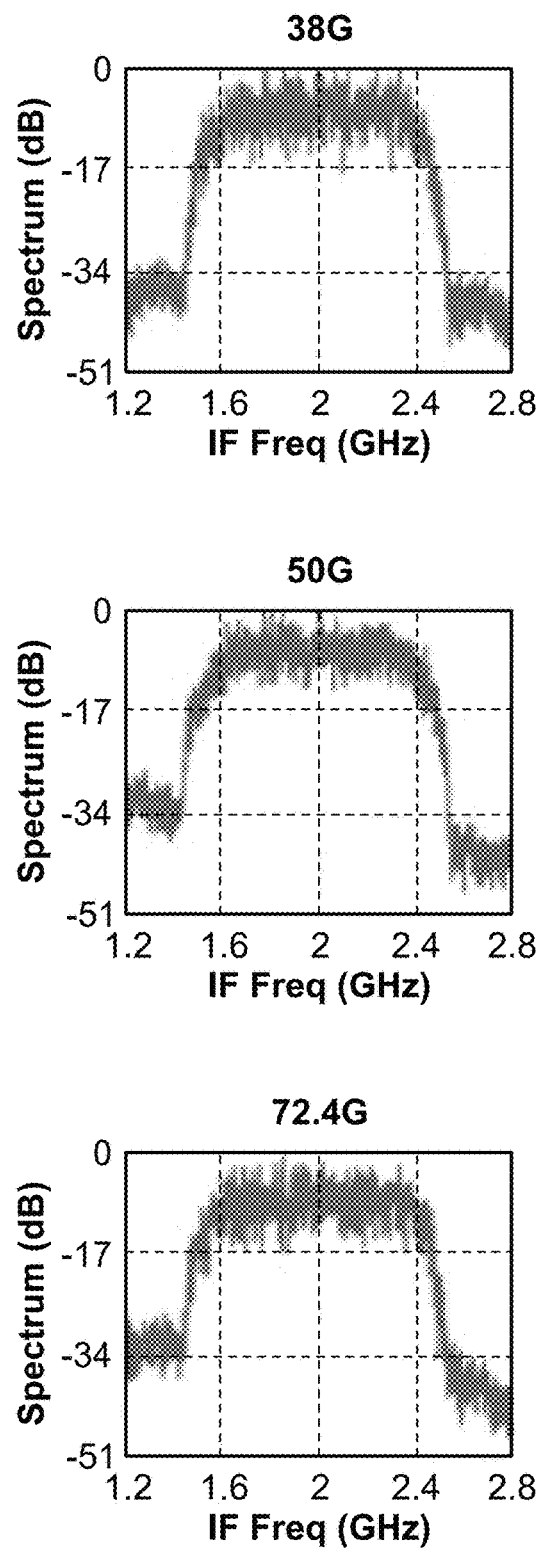
FIG. 25(c)

| | This Work | [12] | [13] | [14] | [20] | [11] | [40] | [41] | [42] | [43] |
|---|---|---|---|---|---|---|---|---|---|---|
| Num. of TRX Elements | 1 | 1 | 1 | 2 | 32 | 1 | 1 | 144 | 256 | 1 |
| Bandwidth (GHz) | 37-73 | Tx: 73.5-79.5 (LB) 88-93 (HB); Rx: 69-86 (LB) 86-101 (HB)* | 57-66 | 57-66 | 28 | 57-66 | 60 | 57-66 | 26.5-29.5 | 62-71 |
| Tx-Pdc (mW) | 145/port | 260 | 720 | 251/Tx | 287.5/Tx | 206 | 210/port | 58 | 90 | - |
| Tx-EIRP (dBm) | 25.6 | 14.61 | 25.52 | 24.4 | - | 18.3 | 9 | - | 36 | 37 |
| Rx-Gain (dB) | 26 | <21.3 | 70-72 | 16 | 34±4.0 | 40 | 34 | 30 | 34 | 30 |
| IF Bandwidth (GHz) | >4 | 6.5 (LB), 7.5 (HB) | 1 | 4.325 | 1.5 | - | 7 | >1.76 | - | 1 |
| Rx-Pdc (mW) | 123/port | 300 | 340 | 220/Rx | 206.3/Rx | 111 | 110/port | 46 | 42 | - |
| Modulation | 64-QAM | 16-QAM | 16-QAM | 64-QAM | - | BPSK | 16-QAM | 16-QAM | 64-QAM OFDM | 16-QAM |
| Rx Sensitivity (dBm) | -48 to -56 (EIS)⁷ | - | -59³ | -53⁶ | - | -55⁷ | -56 (EIS)⁷ | - | - | - |
| Rx Linearity | 5.5 (OIP3) | ~-7 (P1dB) | - | -14 (OIP3) | 21.8 (OIP3) | -5 to 8 (P1dB)* | - | -3 (P1dB) | - | 5 (P1dB) |
| Antenna Integration | Yes | External Horn Antenna (G:23 dBi) | Organic Packaged Antenna | External Horn Antenna (G:23 dBi) | Packaged Antenna Module | Patch on PCB | Dual-pol Patch on PCB | Patch on LTCC | Packaged Patch and Dipole Array | Yes |
| Single Element Pattern Reconfigurability (Pattern Diversity) | ±25-30° Beam Tilting, Dual Beams, Beam-Shaping | No | No | No | No | No | Yes Dual Polarization | No | No | Yes Dual Polarization |
| Antenna-level Interference Suppression | Yes 14-26 dB Peak at 65 GHz | No | No | No | No | No | No | No | No | No |
| Single Element Spatial Multiplexing and Spatial Diversity | Yes 2-data Streams | No | No | No | No | No | No | No | No | No |
| Technology | 65nm CMOS | 65nm CMOS | 130nm SiGe | 65nm CMOS | 130nm SiGe | 45nm CMOS SOI | 28nm CMOS | 28nm CMOS 40nm CMOS | 28nm CMOS | 45nm CMOS |

* Estimated from plots
1. $P_{Tx}$ = -8.4 dBm at back-off, EIRP estimated with external W-band antenna with 23 dBi gain, with back-off.
2. Estimated using $P_{sat}$ and BGA antenna with 8 dBi gain.
3. With MCS12 (16-QAM, 4.62 Gbps) and 1% PER.
4. Estimated using $P_{sat}$ and external horn antenna with 14 dBi gain.
5. Two channel bonding.
6. 1ch - 64 QAM, SNDR - 22.5 dB
7. SNR = 25 dB, IF = 1 GHz BW

FIG. 30

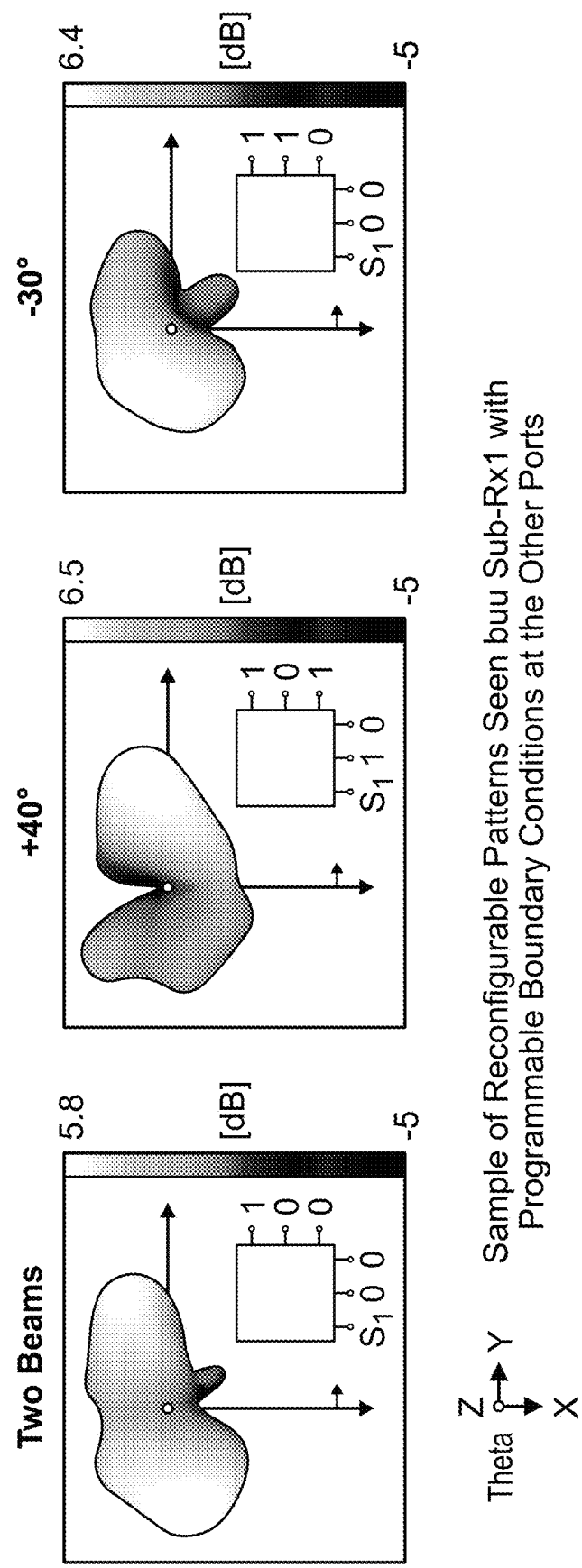
FIG. 32(b) Sample of Reconfigurable Patterns Seen buu Sub-Rx1 with Programmable Boundary Conditions at the Other Ports

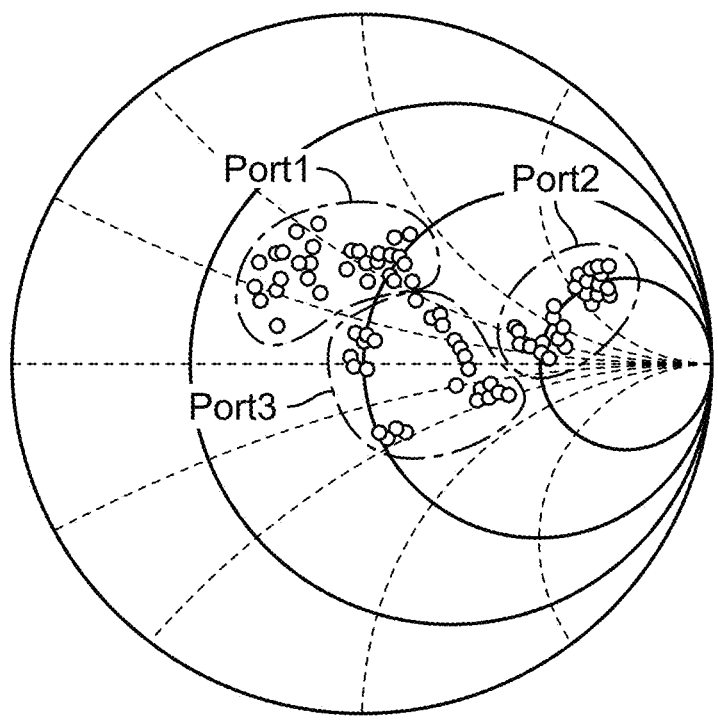
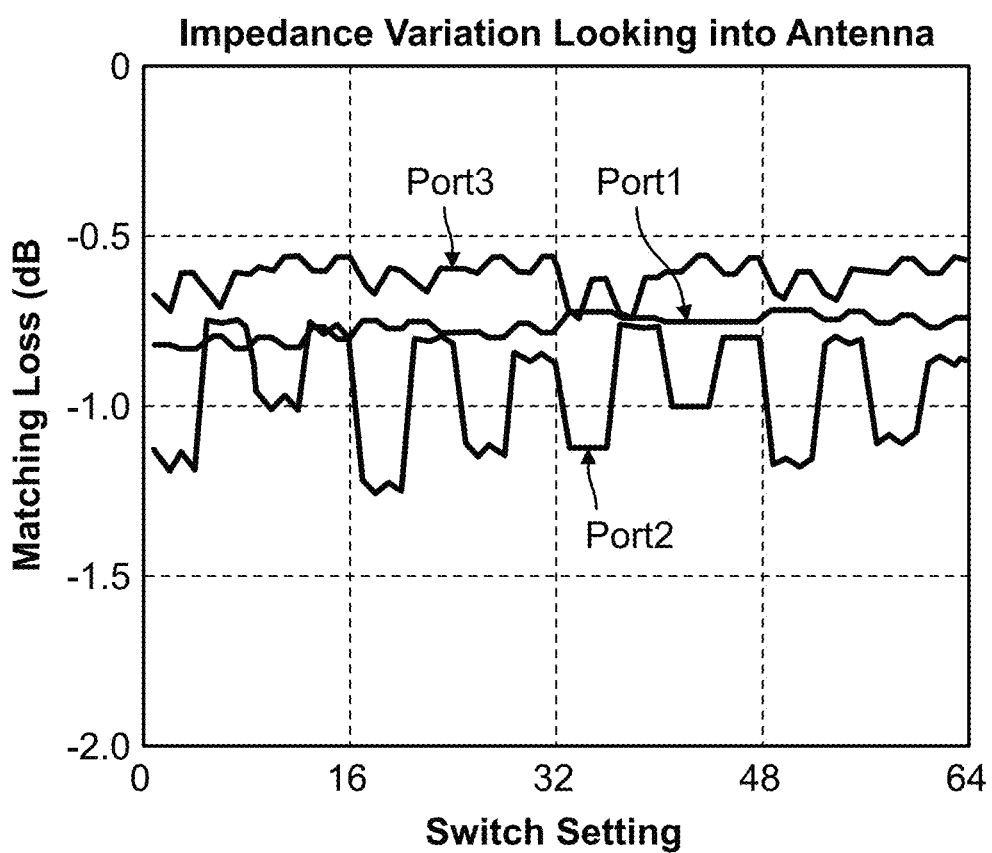
FIG. 33(b)

Switching Capacitor + LNA
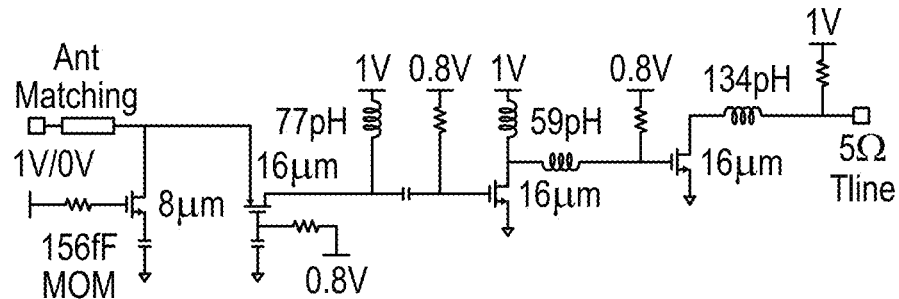
Mixer
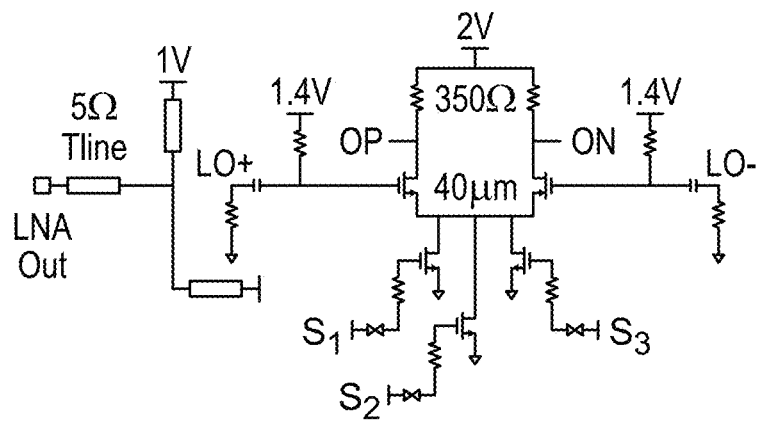
IF Amplifier
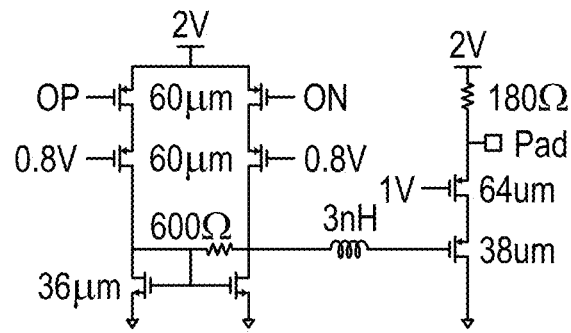
*FIG. 33(c-1)*

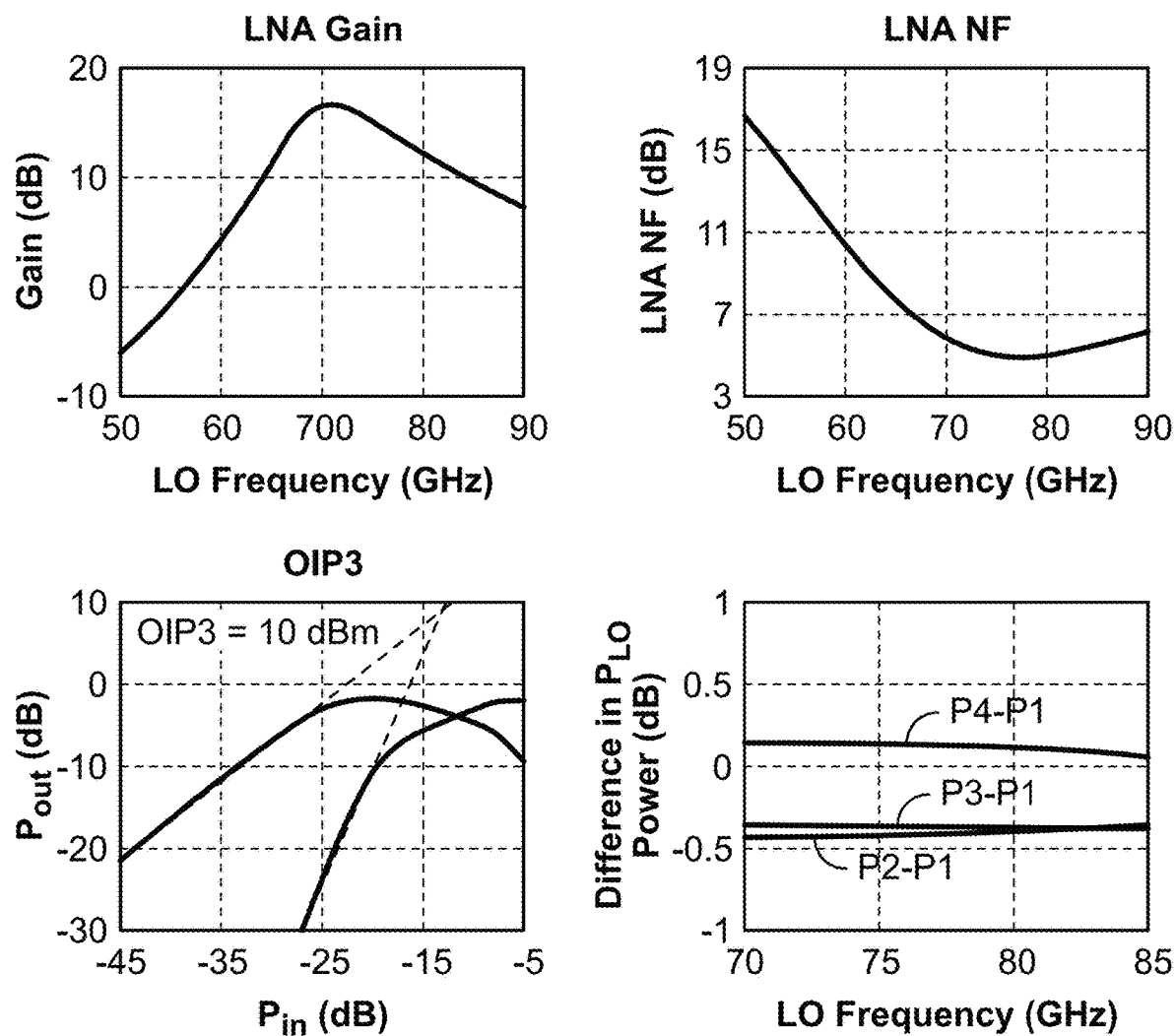
FIG. 33(c-2)

QAM 16 Broadside, Carrier = 67 GHz, 100 Mbps

|  | This Work | ISSCC 2018 Sowlati | ISSCC 2018 Chi | ISSCC 2017 Wu | ISSCC 2018 Kang |
|---|---|---|---|---|---|
| Number of RX Element | 1 | 144 | 1 | 2 | 1 |
| Number of Ports Each Element | 6 | 1 | 2 | 1 | 2 |
| Frequency (GHz) | 70 | 57-66 | 62-71 | 57-66 | 60 |
| Gain (dB) | 22 | 30 | 30 | 16 | 110 |
| Sensitivity (dBm) | -52 | - | - | -53* | - |
| Pdc (mW) | 134 | 46 | - | 220 | 210 |
| Single Element Pattern Diversity | Max+Notch Polarization | No | Polarization | No | Polarization |
| Antenna Integration | On-Chip | LTCC Substrate | On-Chip | No | PCB |
| Modulation | 16 QAM | 16 QAM | 16 QAM | 64 QAM | 16 QAM |
| Technology | 65nm | 28nm / 40nm | 45nm | 65nm | 28nm |

*1ch-64QAM SNDR = 22.5dB

*FIG. 37*

SYSTEM AND METHOD FOR TRANSCEIVER AND ANTENNA PROGRAMMABILITY AND GENERALIZED MIMO ARCHITECTURES

CROSS-REFERENCE TO RELATED APPLICATIONS

This application claims priority to provisional application 62/690,115, filed Jun. 26, 2018, which is herein incorporated by reference in its entirety. This application is also related to provisional application 62/528,843, filed Jul. 5, 2017, which is herein incorporated by reference in its entirety.

STATEMENT REGARDING FEDERALLY SPONSORED RESEARCH OR DEVELOPMENT

This invention was made with government support under Grant No. N00014-15-1-2217 awarded by the Office of Naval Research, Grant No. ECCS-1408490 awarded by the National Science Foundation, and Grant No. FA9550-16-1-0566 awarded by the Air Force Office of Scientific Research. The government has certain rights in the invention.

FIELD OF THE INVENTION

The present invention relates generally to transceiver and antenna programmability and, more particularly, to architectures for transceivers allowing for a programmable antenna interface that can be reconfigured to change its radiation pattern across a wide range of frequencies.

BACKGROUND OF THE INVENTION

Future mm-Wave networks and transceivers are expected to operate in an extremely heterogeneous environment beginning from the electromagnetic propagation channels and extending up to the network layers. Massive multi-user multiple-input multiple-output (MIMO) arrays are expected to play a major role by allowing beamforming for reduced path loss, spatial multiplexing for spectral re-use, and efficient linear precoding exploiting channel hardening. Hardware implementations of such systems with energy-efficient transmitters and receivers, along with complex arrays with either integrated or packaged antennas have been demonstrated in silicon in recent years.

As multiple non-contiguous spectral bands open up across 28-100 GHz, frequency-agile arrays with the capability of operating over multiple bands will become important. To ensure spatial diversity in presence of hand blockage, it is expected that multiple (at least two) arrays might be needed at the user equipment. Evidently, scaling such an arrangement with dedicated arrays across the multiple spectral bands under space and power constraints can be challenging. On the other hand, operation of frequency-agile arrays over spectral ranges stretching over 2:1 involves its own set of challenges. On the circuits side, some of these include efficient broadband frequency synthesis, linear-broadband-and-efficient Pas, and spectral and spatial interference mitigation. In addition, assuming wideband interfaces and circuits, beamforming over wide frequency range with fixed antenna spacings in uniform linear arrays (ULA) can engender serious grating lobes at frequencies where spacings approach a wavelength ($\lambda$). This needs to be mitigated to enable seamless operation across a broad frequency range.

As such, there is a need for programmability and a MIMO architecture that addresses the above challenges.

SUMMARY OF THE INVENTION

Various deficiencies in the prior art are addressed by systems, methods, architectures, mechanisms, and/or apparatus for element level programmability where each element in an array can be independently reconfigured to assume a set of patterns. Through control of element lobe and notch, new array patterns can be synthesized with strict control of side and grating lobes over a wide spectral range for frequency-agile arrays. In addition, through a multi-port co-design approach between the unit transceiver elements and the integrated electromagnetic (EM) interface, broadband operation and unique antenna-level processing of signals can be achieved in a manner distinct from classical arrays. This includes pointing the element pattern towards the array maxima, turning the element notch to suppress a spatial interference at the antenna, creating dual beams for supporting wide angles of arrival and departure, and processing of multiple independent data streams in a single radiating surface. Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which:

FIG. 8(c) depicts each port driven by a 3-bit digital PA where the code corresponds to the PA DAC settings according to an embodiment of the present invention;

FIGS. 11(a)-(e) depict architecture and constituent circuits of the multi-port Tx and radiator along with the die photo according to an embodiment of the present invention;

FIGS. 14(a-1)-(a-2) depict architecture and constituent circuits of the multi-port Rx and radiator along with the die photo according to an embodiment of the present invention;

FIGS. 15(a)-(b) depict a schematic of Rx circuits, LO distribution, and simulated performance according to an embodiment of the present invention;

FIG. 22(*b*) depicts data multiplexing with EM orthogonality with the edge port excitations according to an embodiment of the present invention;

FIG. 23(*b*) depicts measured OIP3 at 49 GHz with 100 MHz offset according to an embodiment of the present invention;

FIG. 25(*b*) depicts port patterns serving as the basis set for localized beam-forming at the output of the *IF* stage creating a wide array of element patterns according to an embodiment of the present invention;

FIG. 25(*c*) depicts far-field link measurements at 38, 50, and 72.4 GHz with 64-QAM at 12 Gb/s according to an embodiment of the present invention;

FIG. 26(*b*) depicts rejection of C.W. signals at the edge ports corresponding to ±25° incidence signals and measured constellations of transmitted QPSK and 8-PSK simultaneously at the two edge ports after the antenna de-multiplexing according to an embodiment of the present invention;

FIG. 26(*c*) depicts antenna-level suppression of the spatial interferer resulting in the EVM to be dominated by the SNR till $P_{int}/P_{sig}$~10 dB according to an embodiment of the present invention;

FIG. 30 depicts a table comparing MM-Wave transceivers according to an embodiment of the present invention;

FIG. 32(*b*) depicts a simulated subset of patterns for a single receiver (sub-Rx1) when the boundary conditions of the other ports are varied according to an embodiment of the present invention;

FIG. 32(*c*) depicts patterns demonstrating beam maxima control and element notch control according to an embodiment of the present invention;

FIG. 33(*b*) depicts a dual polarized 6-port coupled antenna stack and the 6-port matching networks with a 1-bit switch capacitor for distributed reconfiguration according to an embodiment of the present invention;

FIGS. 33(*c*-1)-(*c*-2) depict a dual polarized 6-port coupled antenna stack and the 6-port matching networks with a 1-bit switch capacitor for distributed reconfiguration according to an embodiment of the present invention;

FIG. 36(*b*) depicts measured $P_{-30}°$-$P_{+30}°$ according to an embodiment of the present invention;

FIG. 36(*c*) depicts measured SINR of three selected configurations across interference power for 100 MHz QPSK according to an embodiment of the present invention;

FIG. 36(*d*) depicts switch setting and measured normalized patterns of three selected configurations according to an embodiment of the present invention; and FIG. 37 depicts a comparison table according to an embodiment of the present invention.

DETAILED DESCRIPTION OF THE INVENTION

Multiple-input multiple-output (MIMO) arrays employ a series of identical transceiver elements with periodically spaced identical and static antenna elements at a given frequency. The fixed antenna spacing limits the frequency of operation of the array due to the appearance of severe grating lobes at frequencies where spacings approach one wavelength.

To address this, generally disclosed herein are embodiments for element level programmability where each element in an array can be independently reconfigured to assume a set of patterns. Through control of element lobe and notch, new array patterns can be synthesized with strict control of side and grating lobes over a wide spectral range for frequency-agile arrays. In addition, through a multi-port co-design approach between the unit transceiver elements and the integrated electromagnetic (EM) interface, broadband operation and unique antenna-level processing of signals can be achieved in a manner distinct from classical arrays. This includes pointing the element pattern towards the array maxima, turning the element notch to suppress a spatial interference at the antenna, creating dual beams for supporting wide angles of arrival and departure, and processing of multiple independent data streams in a single radiating surface.

The transmitter and receiver architectures with the integrated EM interface are implemented in 65-nm bulk CMOS process. The transceiver has a bandwidth of 37-73 GHz. Wireless links with data-rates up to 12 Gb/s are demonstrated across the spectrum along with a wide range of reconfigurability of the active EM interface. The multifunctional EM interface and the broadband transceivers can enable future efficient and compact MIMO arrays for reliable links exploiting frequency, spatial, pattern, and polarization diversities.

Generally disclosed herein are systems and methods to enable element-level programmability that allows each element pattern to be shaped independently. This has a significant impact on the array performance, including its ability to operate over wide spectral ranges. In order to achieve this, a multi-port co-design approach is included between the unit transceiver elements and the integrated EM interface that ensures simultaneous broadband operation, programmable element-level patterns, and antenna-level signal processing techniques distinct from classical arrays.

Typically, array operation relies on antenna spacing of $\lambda/2$ at the frequency of operation to minimize grating lobes. This cannot be ensured across the frequency range for wideband arrays. As an example, for an array operating over a 2:1 spectral range from 37-74 GHz, a 4 mm spacing between the elements translates to a $\lambda/2$ spacing at 37 GHz and $\lambda$ spacing at 74 GHz. Such sub-sampling of the spatial domain leads to generation of severe grating lobes and resultant non-functionality of an array.

Figure 1A:
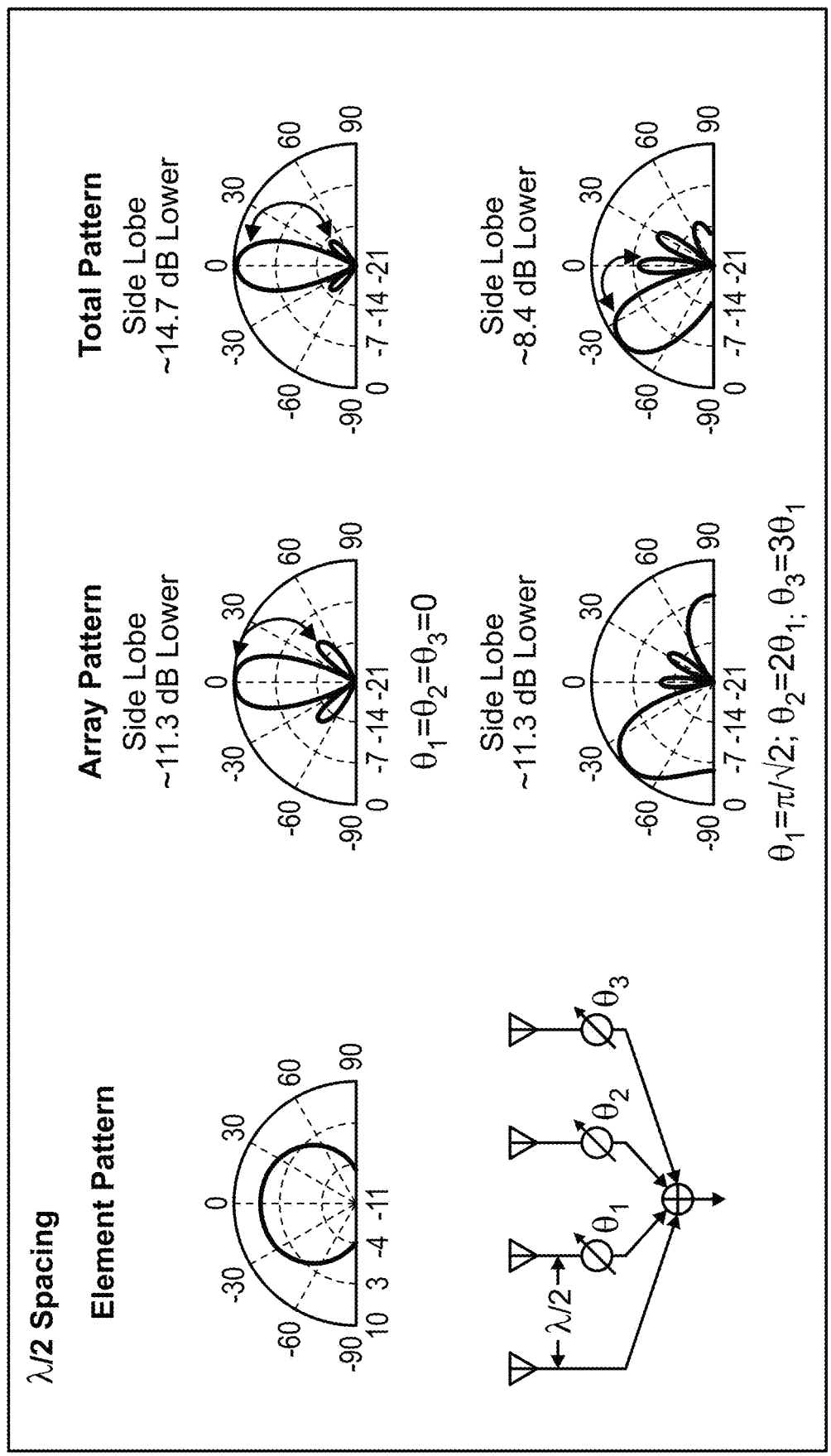
FIG. 1(a) depicts a uniform linear array (ULA) having side lobes and grating lobes with spacings of $\lambda/2$ according to an embodiment of the present invention.
Figure 1B:
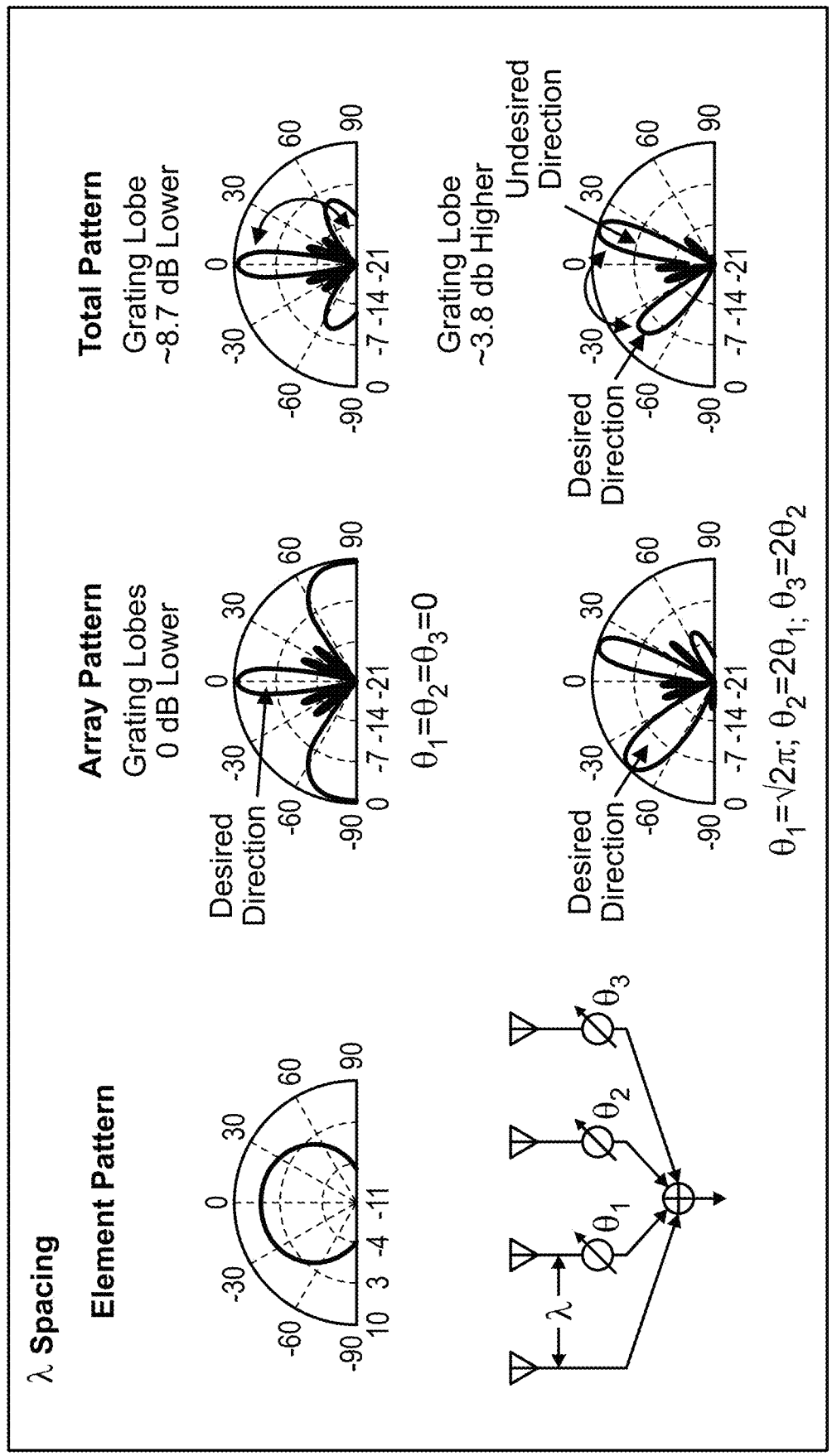
FIG. 1(b) depicts a ULA having side lobes and grating lobes with spacings of $\lambda$ according to an embodiment of the present invention.

FIGS. 1(a)-(d) illustrates this with an example of uniform linear array (ULA) with 4 elements. As shown in FIG. 1(a), a typical 4-element ULA with spacing of $\lambda/2$ and a linear phase progression results in 11.3 dB side lobe in the array factor (AF) independent of the scan angle. This approaches 13.25 dB for large arrays. Due to the finite directivity of the element pattern, the side lobe increases with scan angle, reaching around 8.4 dB for a scan angle of ±45° for a patch antenna with 6 dB of directivity. When operated at twice this frequency, the spacing stretches to $\lambda$. and this results in severe grating lobes as shown in FIG. 1(b) making the array non-functional.

In order to overcome this effect for operation of broadband arrays, variation of inter-element spacings have been investigated. Aperiodic, random, fractal, and sparse arrays with optimized non-uniform array spacings that can allow beamforming over wide spectral range with low grating lobes have been proposed. The technique draws similarity with information preserving sub-Nyquist sampling of time-domain signals which are sparse in the spectral domain. However, such complex aperiodic spacings make it extremely challenging to scale to large arrays in a cost-effective fashion. These preclude any tiling of identical sub-array elements which has become a dominant method for building large arrays. It is feasible to have separate antenna arrays for widely separated bands and connect to the transceivers with a switchable network, but scaling to a wide frequency range evidently becomes very complex.

Another possible approach to avoid grating lobe issues is to ensure a spacing of $\lambda/2$ at the higher frequency range, and tolerating a much shorter separation at the lower frequency end. Tightly coupled arrays operating over a 6:1 bandwidth and with spacings varying from $\lambda/12$ to $\lambda/2$ have been demonstrated. However, in such a case, the aperture area for the lower frequency bands is effectively much smaller. Therefore, signal collection and SNR improvement with array operation is sacrificed and the strong mutual coupling among array elements with tight spacing can cause severe issues in beamforming, interference nulling, and MIMO operation.

Figure 1C:
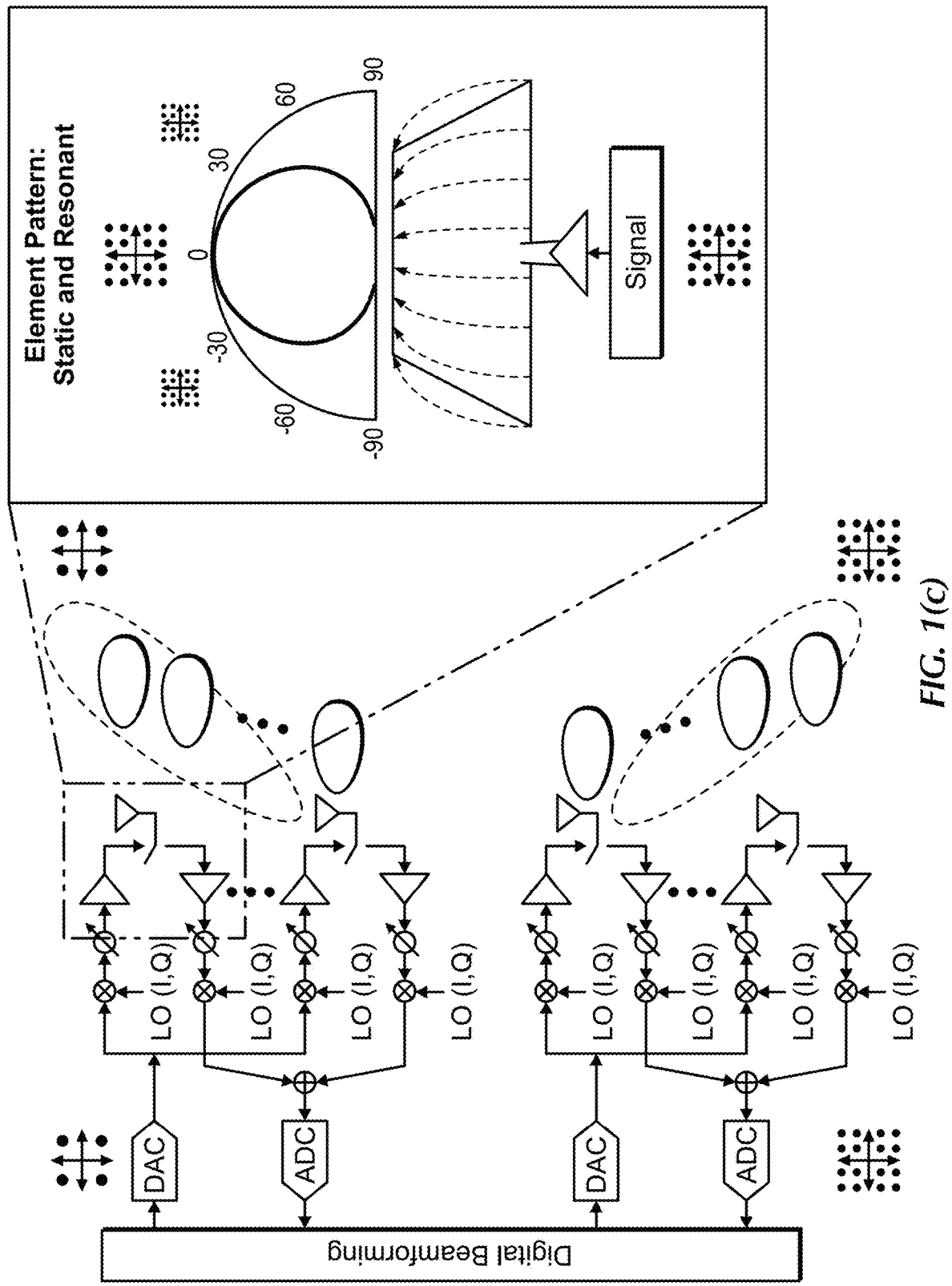
FIG. 1(c) frequency-specific hybrid beamforming with identical, narrowband, resonant, and static antenna as each element according to an embodiment of the present invention.
Figure 1D:
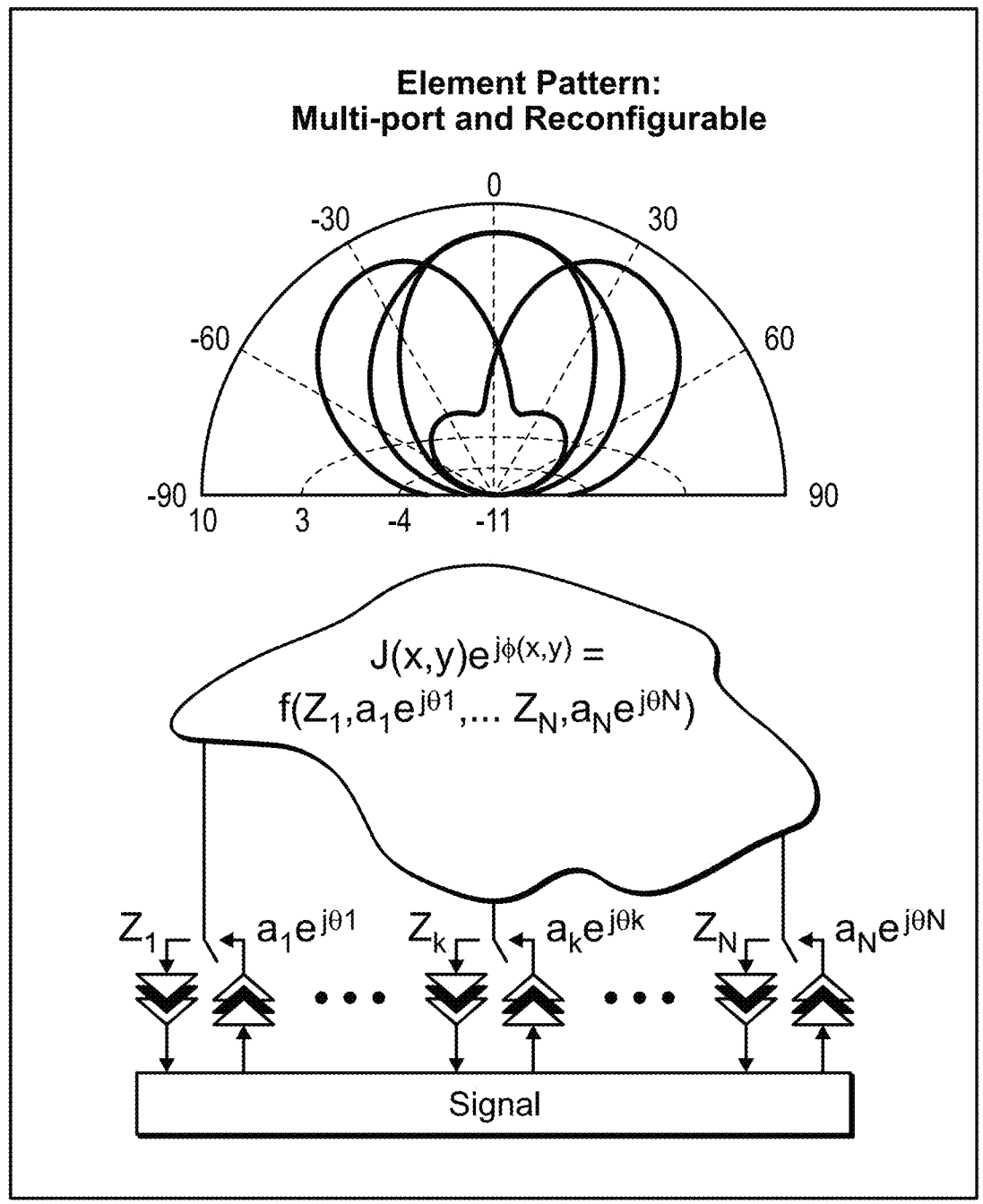
FIG. 1(d) frequency-specific hybrid beamforming allowing element-level pattern synthesis and shaping with sub-wavelength actuations according to an embodiment of the present invention.

Generally disclosed herein is a methodology to enable scaling of periodic and frequency-agile arrays by enabling programmability at the single element level. The general concept to engineer such programmability in element level patterns is to move from a classical single-port single frequency resonant passive antenna structure at each element to a multi-port antenna structure where the actuation and boundary conditions are programmable at sub-wavelength scales. This results in controllable element patterns as illustrated in FIGS. 1(c)-(d).

Figure 2A:
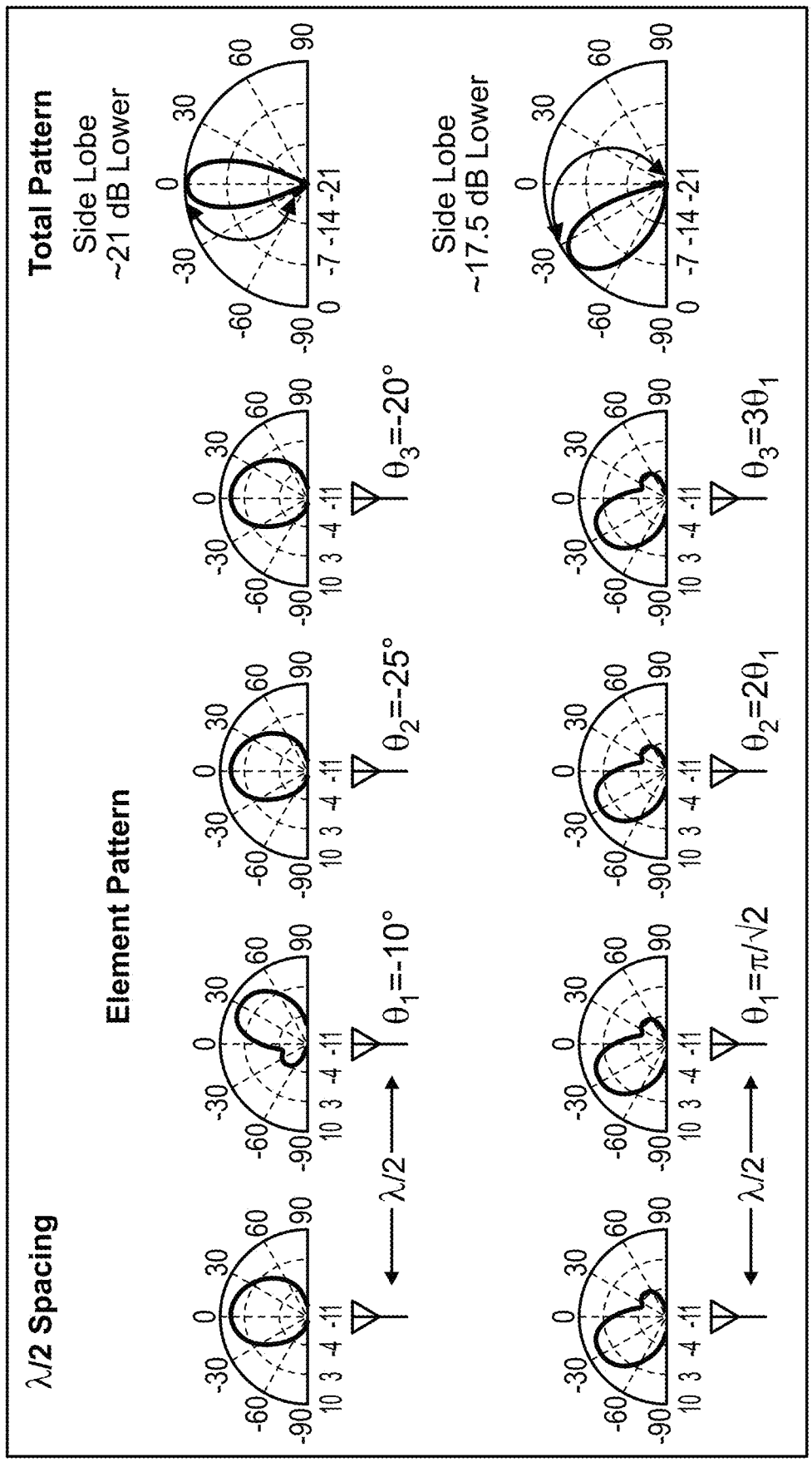
FIG. 2(a) depicts optimal choice of element patterns for suppression of side lobes in a 4-element ULA without amplitude taping for spacing $\lambda$ according to an embodiment of the present invention.
Figure 2B:
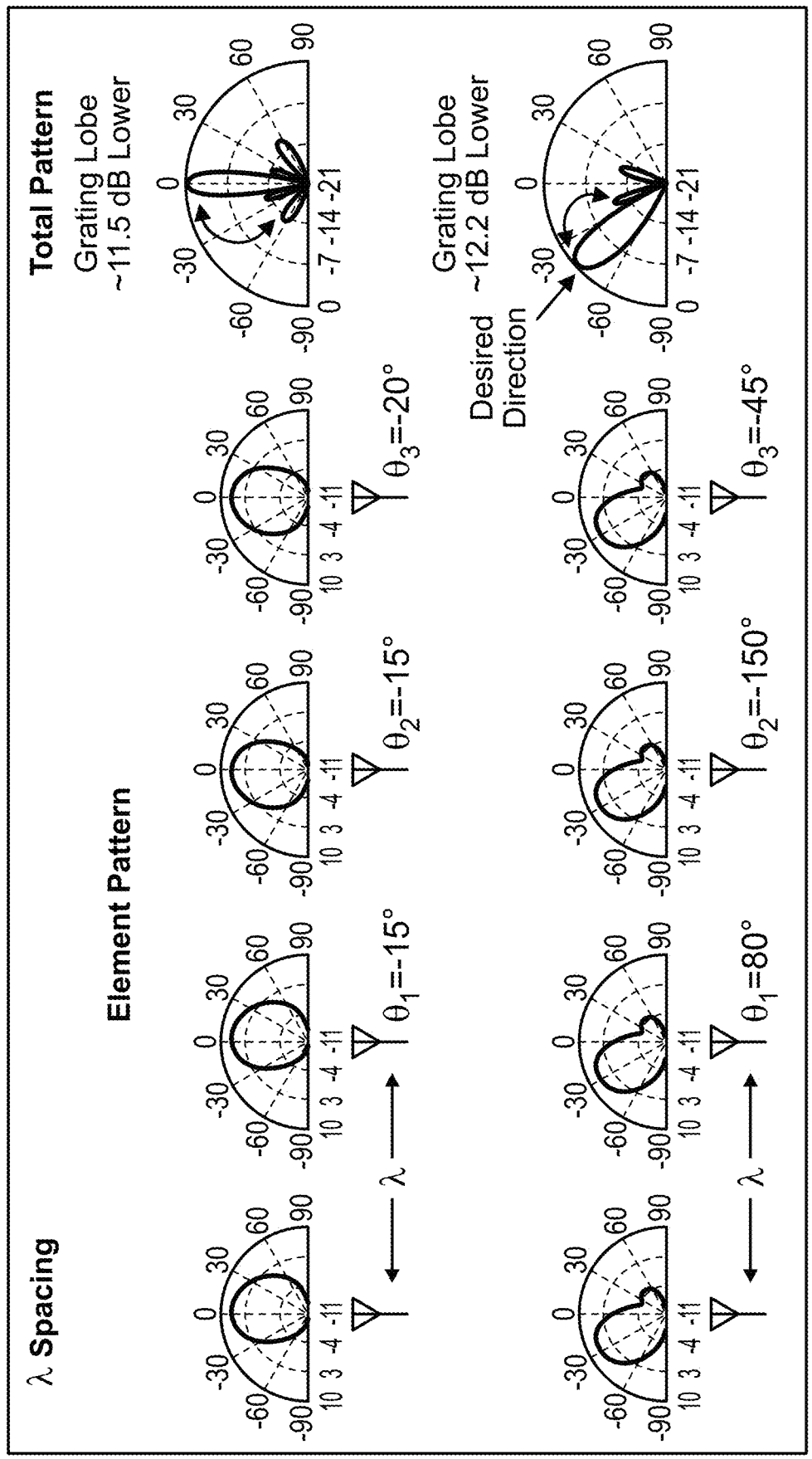
FIG. 2(b) depicts suppression of grating lobes for spacings as wide as $\lambda$ by turning an element notch towards a grating lobe according to an embodiment of the present invention.

FIGS. 2(a)-(b) shows the array performance of a 4-element ULA with element-level programmability. As shown, side lobes and grating lobes can be suppressed significantly by allowing element pattern shaping. In the presented example, the side lobes are reduced by 9 dB for $\lambda/2$ spacing and 45° array direction by allowing element pattern to point in the direction of array maxima and requiring no amplitude tapering (as illustrated by comparing FIG. 1(a) and FIG. 2(a)). In addition, grating lobes are reduced by 16 dB for spacing of $\lambda$ for the same array direction (as illustrated by comparing FIGS. 1(b) and 2(b)). This is achieved by turning the element notch to point in the direction of the grating lobes.

Unlike a classical array, where all the element patterns are identical, optimization of the total pattern, grating and side lobes can yield solutions where individual element patterns for a given beam direction can be different, as shown by FIG. 2(a). It is important to note that while the directivity of each element pattern is still limited by the aperture area of the antenna, the ability to shape the element lobe and element notch provides the ability to tailor the total pattern across a wide range of spacings to enable frequency agility in periodic arrays.

In addition, such multi-port structures also allow unique signal processing functionalities at the antenna level. These include the ability to suppress a spatial interferer at the element antenna surface before any beamforming. This can be achieved by shaping the receiver element notch to point towards the direction of the spatial interferer. This can significantly relax linearity and power requirements of each element. Further, through multi-port excitations and reception, each element can process more than one spatial beam for wide angles of arrival and departure in non-line-of-sight (NLOS) communication. By allowing signal combination on the antenna surface, this multiport antenna can simultaneously serve as a broadband power combiner.

An architecture can be achieved with the capabilities of:

Frequency diversity: Broadband transmitter (Tx)/receiver (Rx) with multi-port integrated radiator, has a 3-dB bandwidth of 37-73 GHz, and supports wireless links with data-rates up to 12 Gb/s anywhere across the spectrum. Spectral agility will be critical in ensuring scalability of MIMO arrays as more frequency bands open up across the mm-Wave spectrum.

Pattern diversity: The integrated radiator has the capability of element-level pattern shaping including discrete control of element maxima and element notch. Over a 2:1 spectral range, this can allow suppression of array side lobes for frequencies where spacing is $\lambda/2$ and suppression of grating lobes at spacings of $\lambda$.

Antenna-level signal processing: The system can reject spatial interferers directly at the element antenna level by rotating the element notch, thereby reducing linearity requirements of the corresponding transceivers. Extending the same phenomenon, the multi-port structure can also process more than one beam with large spatial separation for non-line-of-sight (NLOS) communication.

Spatial and partial polarization diversity: The multiport structure can show spatial diversity. The architecture also allows partial polarization diversity through controllable cross-polarization components.

Figure 3:
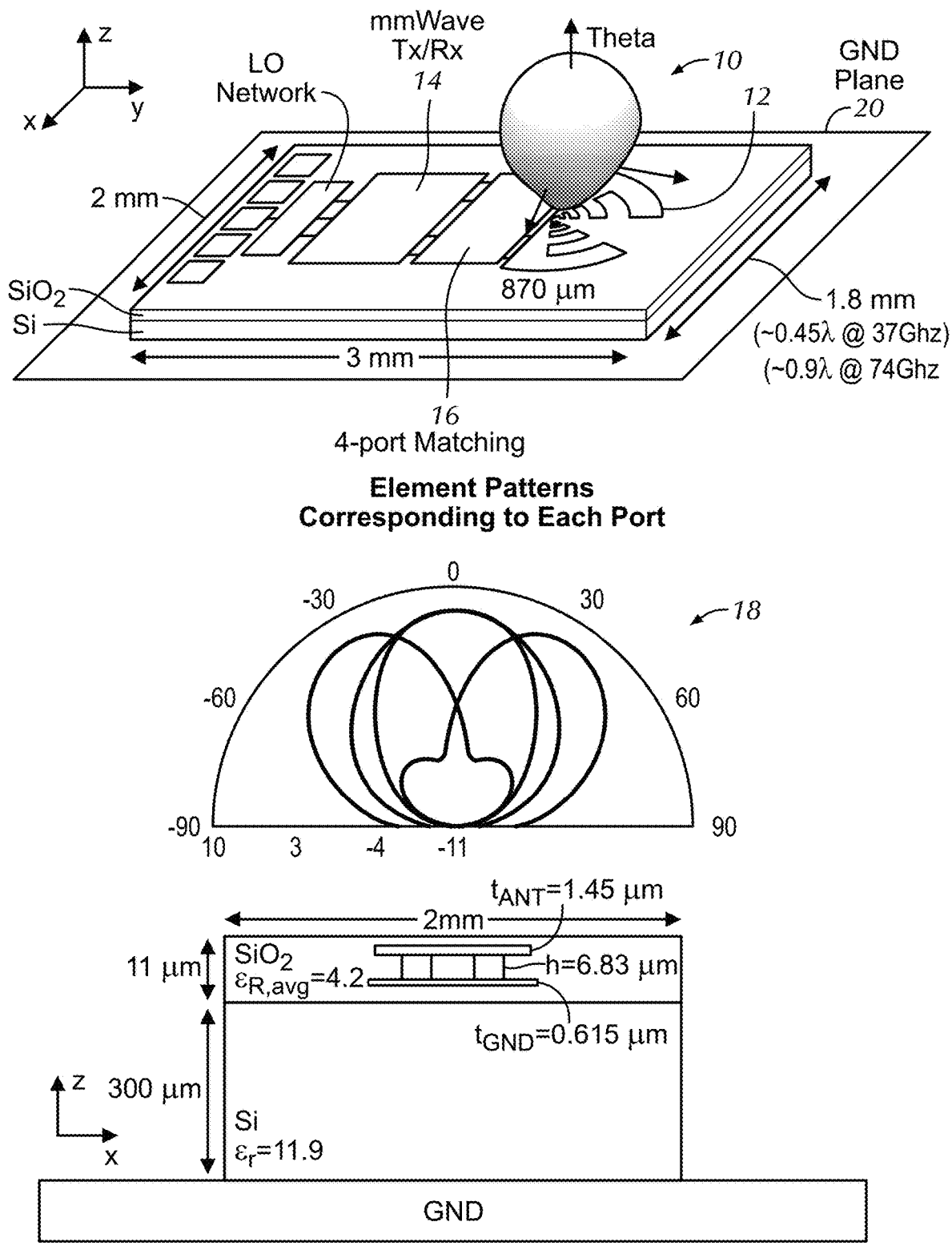
FIG. 3 depicts an implemented 4-port on-chip antenna and the simulated radiation patterns on the grounded substrate according to an embodiment of the present invention.

Sub-Wavelength Multi-Port Architectures, Element Pattern Synthesis, and Tx/Rx Properties The ability to configure the multi-port driving (and boundary) conditions on a passive metal radiator opens up a codesign space of the radiator and the integrated electronics. FIG. 3 shows a 4-port on-chip antenna 10 implemented according to an embodiment of the present invention. The antenna 10 is a half section of log-periodic tooth antenna 12 and interfaces with the Tx/Rx 14 through a 4-port matching network 16. Design considerations and matching will be described further, but here, the antenna stack 10 and the four elemental port radiation patterns 18 are presented to illustrate the functionalities of an array system enabled through element-level pattern shaping. The simulated radiation pattern 18 corresponding to the 4-port excitations at 70 GHz are shown in FIG. 3. The reconfigurability of the patterns is achievable with a grounded substrate 20 or when abutted with a silicon lens at the backside (to be described further in FIGS. 8(a)-(c) and FIGS. 10(a)-(b)).

Synthesizing Transmitter Element Patterns

The transmitter-antenna properties are qualitatively shown in FIGS. 4(a)-(d). The following illustrates some of the unique properties of element-level pattern reconfigurability.

Figure 4A:
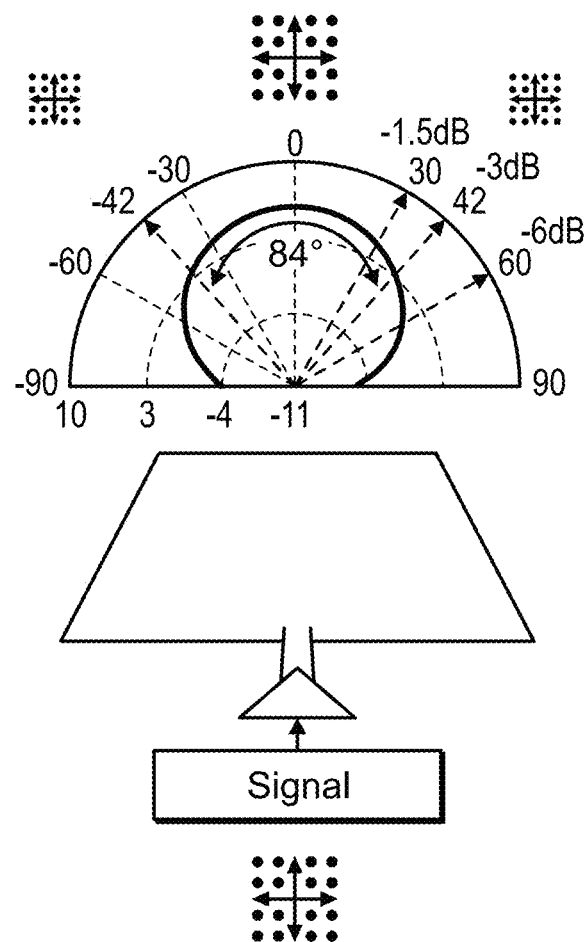
FIG. 4(a) depicts a patch antenna and its half power beamwidth (HPBW) which determines the scan range of the array according to an embodiment of the present invention.
Figure 4B:
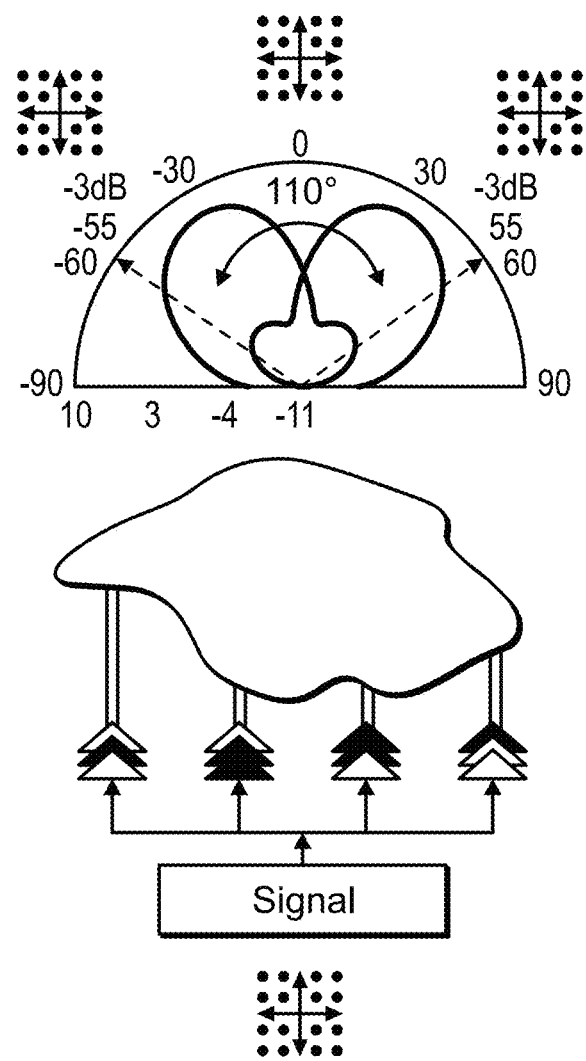
FIG. 4(b) depicts a multi-port antenna-Tx interface increasing scan range according to an embodiment of the present invention.

1) Increased scan range: A classical resonant $\lambda/2$ patch antenna has a directivity of 4-6 dB with the latter corresponding to half-power beamwidth (HPBW) of ~84°. It is important to note that while the field intensity varies slowly within the HPBW, the reduction is highly nonlinear outside the range and can reach up to 6 dB below the maximum at ±60°. Element directivity is the primary determining factor in the scan range of the array. On the other hand, electronically actuated multi-port antenna can rotate the element pattern towards the array maxima, thereby increasing the scan range. In this nonlimiting example, with a 6.9 dB element pattern, electronic reconfigurability increases the scan range from ±70° to ±110°, as shown in FIG. 4(b).

2) Reduced side lobes, suppressed grating lobes and frequency agility: More important than the control of the element maxima is that of the element notch. The ability to point it towards the grating lobe can allow suppression of grating lobe radiation at frequencies where the spacing is comparable to $\lambda$. This can allow efficient operation over a wide spectral range. Even at a frequency where the spacing corresponds to $\lambda/2$, element-level pattern optimization allows suppression of side lobes with phase-only control and without any amplitude tapering. This is quantitatively illustrated in FIGS. 5(a)-(d).

Figure 5A:
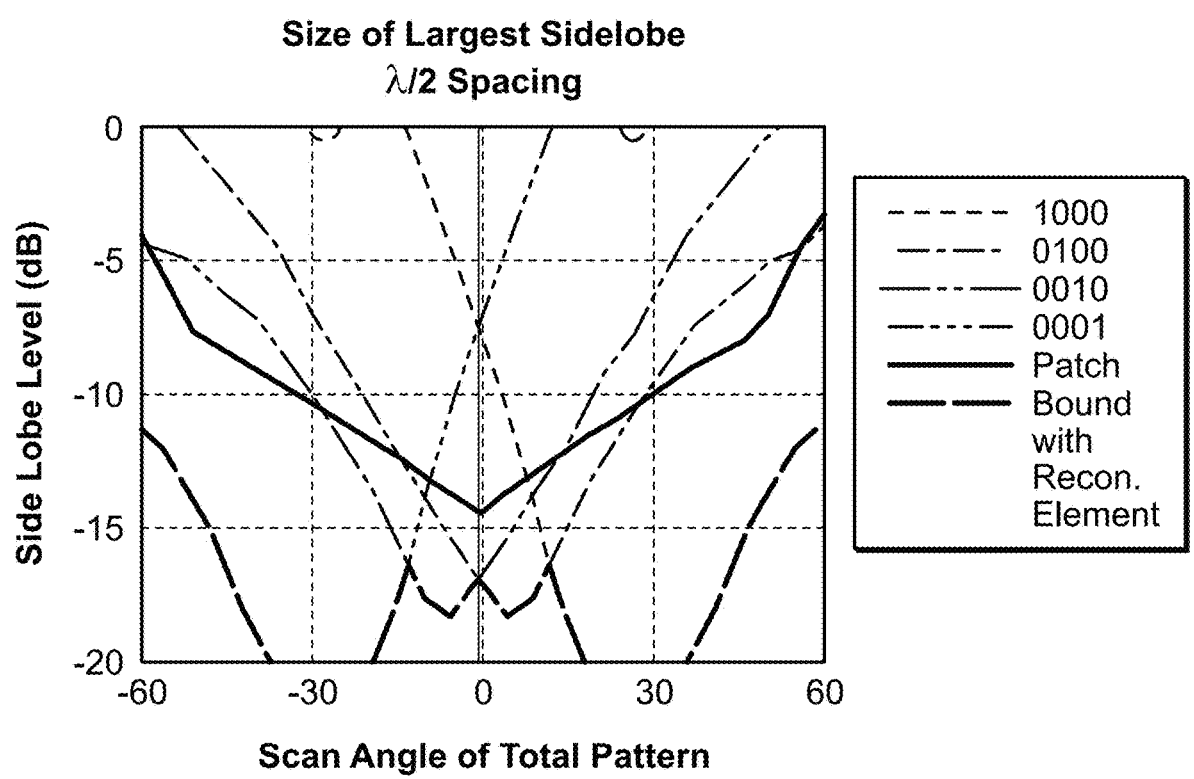
FIG. 5(a) depicts side lobe levels for frequency where element spacing is λ/2 for the patch and for each of the four example element patterns of the multi-port radiator according to an embodiment of the present invention.
Figure 5B:
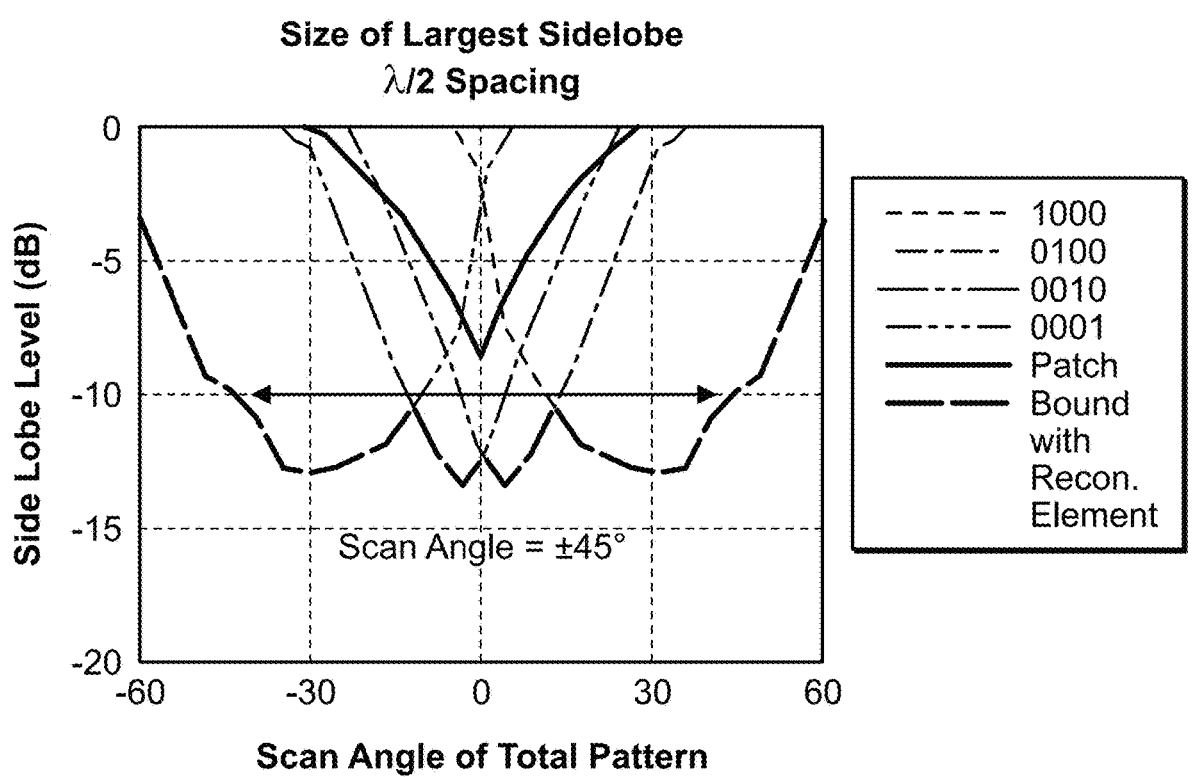
FIG. 5(b) depicts grating lobe sizes at twice the frequency where the element spacing is λ according to an embodiment of the present invention.

FIGS. 5(a)-(d) compares the side-lobe levels for various scan angles in azimuth for linear phase excitations in a 4-element ULA implemented with a patch and the proposed reconfigurable antenna element. With the four patterns corresponding to each port of the Tx chip (of the embodiment in FIG. 3), the simulated side lobe levels for the 4-element array is presented across the scan angle. The lower bound for all the patterns indicate optimal side lobe suppression at a given scan angle. As illustrated, there is a 10-15 dB improvement in the side lobe level suppression compared to a static patch element across a ±60° scan angle (shown by FIG. 5(a)). The effect is remarkable for operation at frequencies where the element spacing approaches $\lambda$. FIG. 5(b) illustrates that even with a periodic array, an array scan angle of greater than 90° can be achieved with linear phase excitation ensuring grating lobes 10 dB below the maxima. This is achieved by placing the element notch in the neighborhood of the grating lobe. In comparison, as expected, the grating lobes make a periodic patch array non-functional.

Figure 5C:
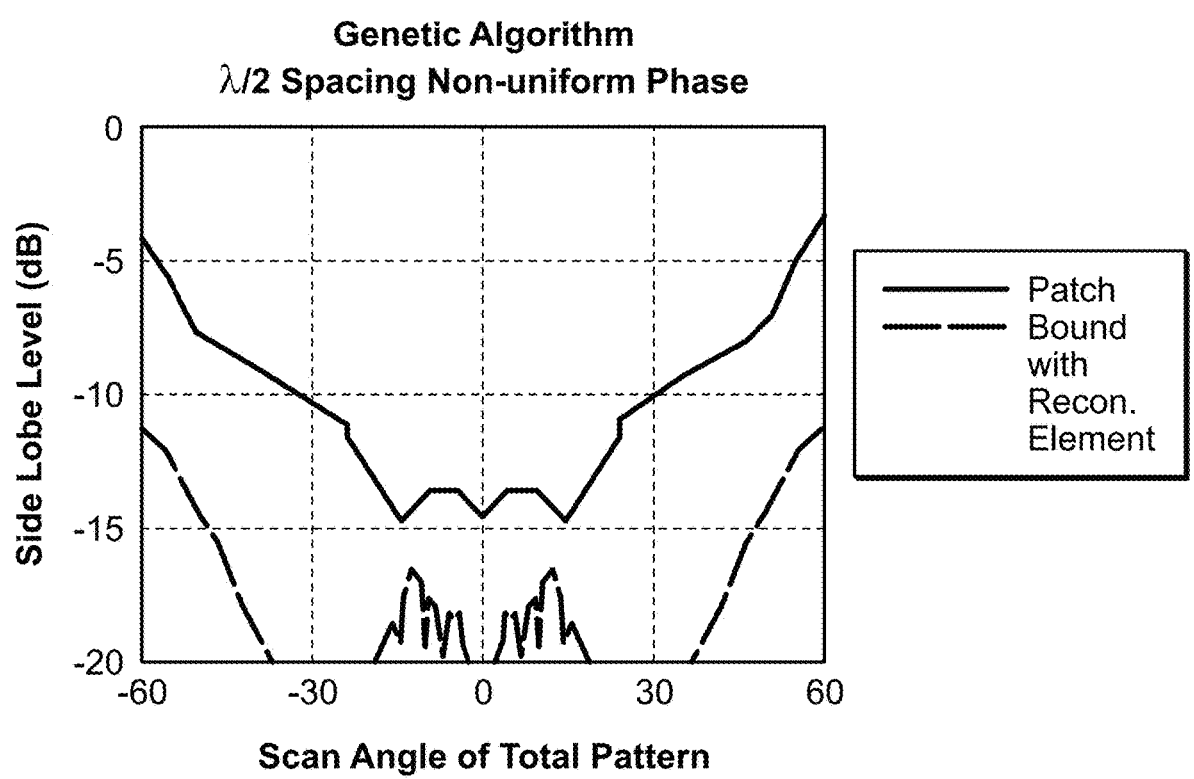
FIG. 5(c) depicts achievable performances when each element has independent element pattern reconfigurability (among the four) with non-uniform phase control according to an embodiment of the present invention.
Figure 5D:
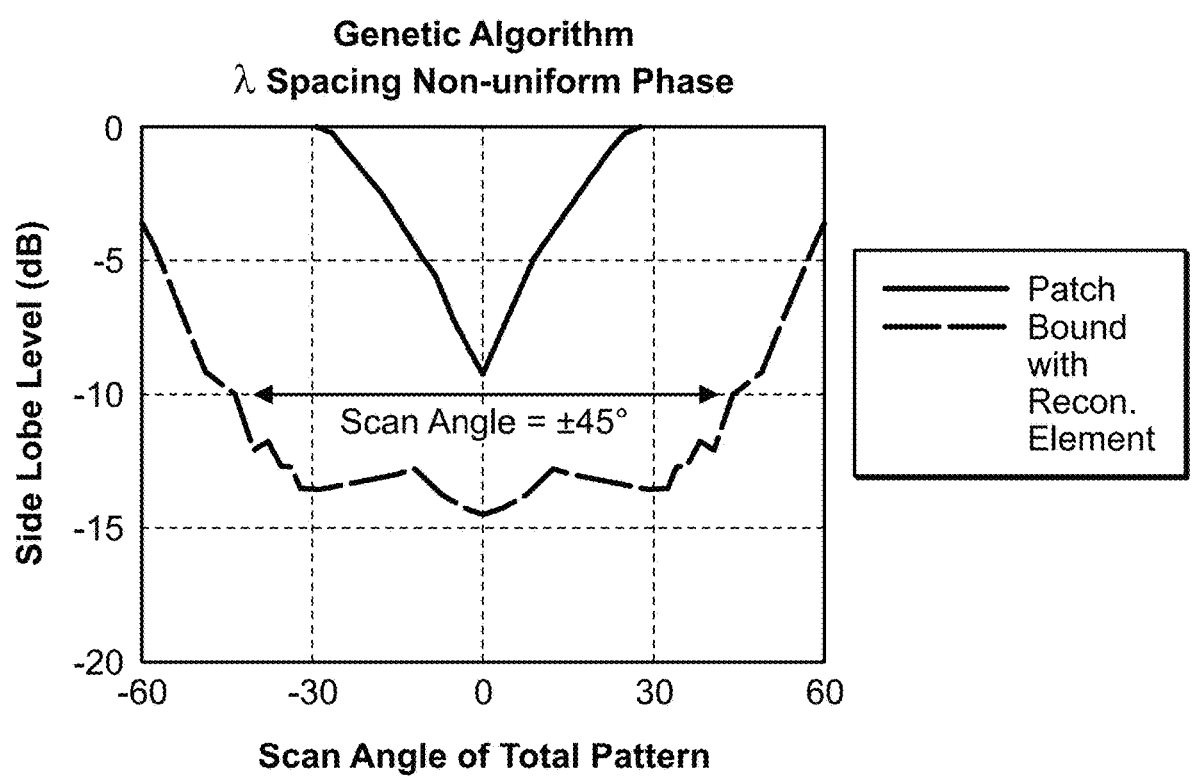
FIG. 5(d) depicts achievable performances when each element has independent element pattern reconfigurability (among the four) with non-uniform phase control according to an embodiment of the present invention.

With non-uniform phase control (and no amplitude tapering), slightly larger side and grating lobe suppression can be achieved as shown in FIGS. 5(c) and (d). This is easily realizable since all paths typically have full 360° of phase control. This can be even improved with amplitude tapering which has little effect for a conventional static element array with $\lambda$ spacing.

Figure 4C:
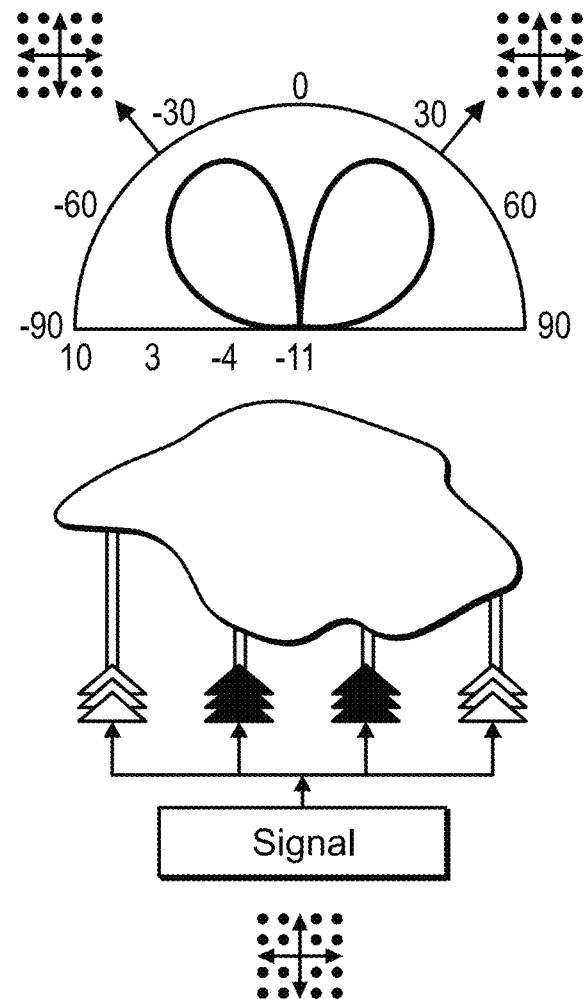
FIG. 4(c) depicts a multi-port antenna-Tx interface establishing dual beams for wide angles of departure in a single antenna according to an embodiment of the present invention.
Figure 4D:
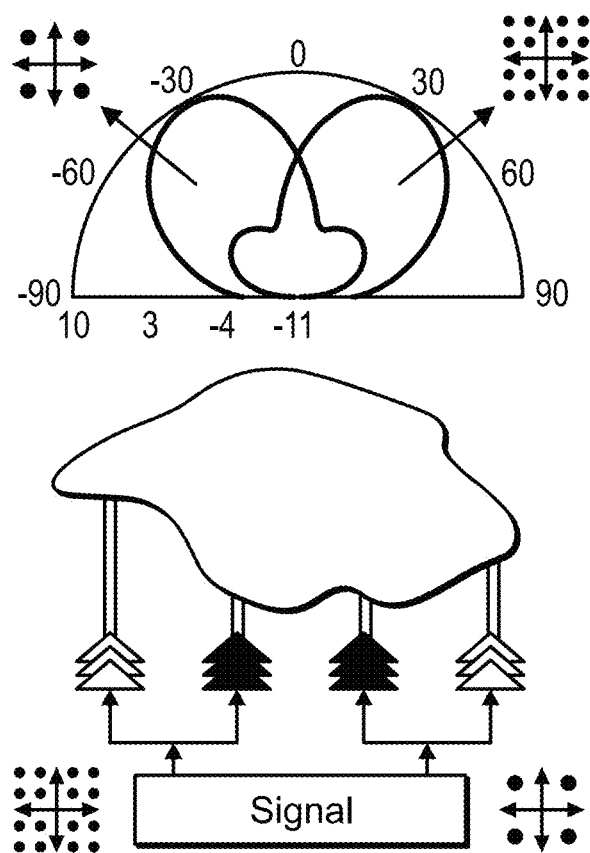
FIG. 4(d) depicts a multi-port antenna-Tx interface transmitting multiple independent beams according to an embodiment of the present invention.

3) Dual beams: In addition, the element pattern can be programmed to suppress the main lobe and split into two directions to enable efficient transmission across the wide angles of departure for NLOS channels (as illustrated in FIG. 4(c)). As an extension of this, edge port excitations can create two independent dual beams in a single antenna aperture (as shown by FIG. 4(d)). It can be noted that while the beamwidth is ultimately limited by the total effective area of the EM interface and the boundary conditions, the fine granular control of the EM fields enables these properties with radiating surfaces of aperture size $A_e \sim \lambda^2$.

Figure 29:
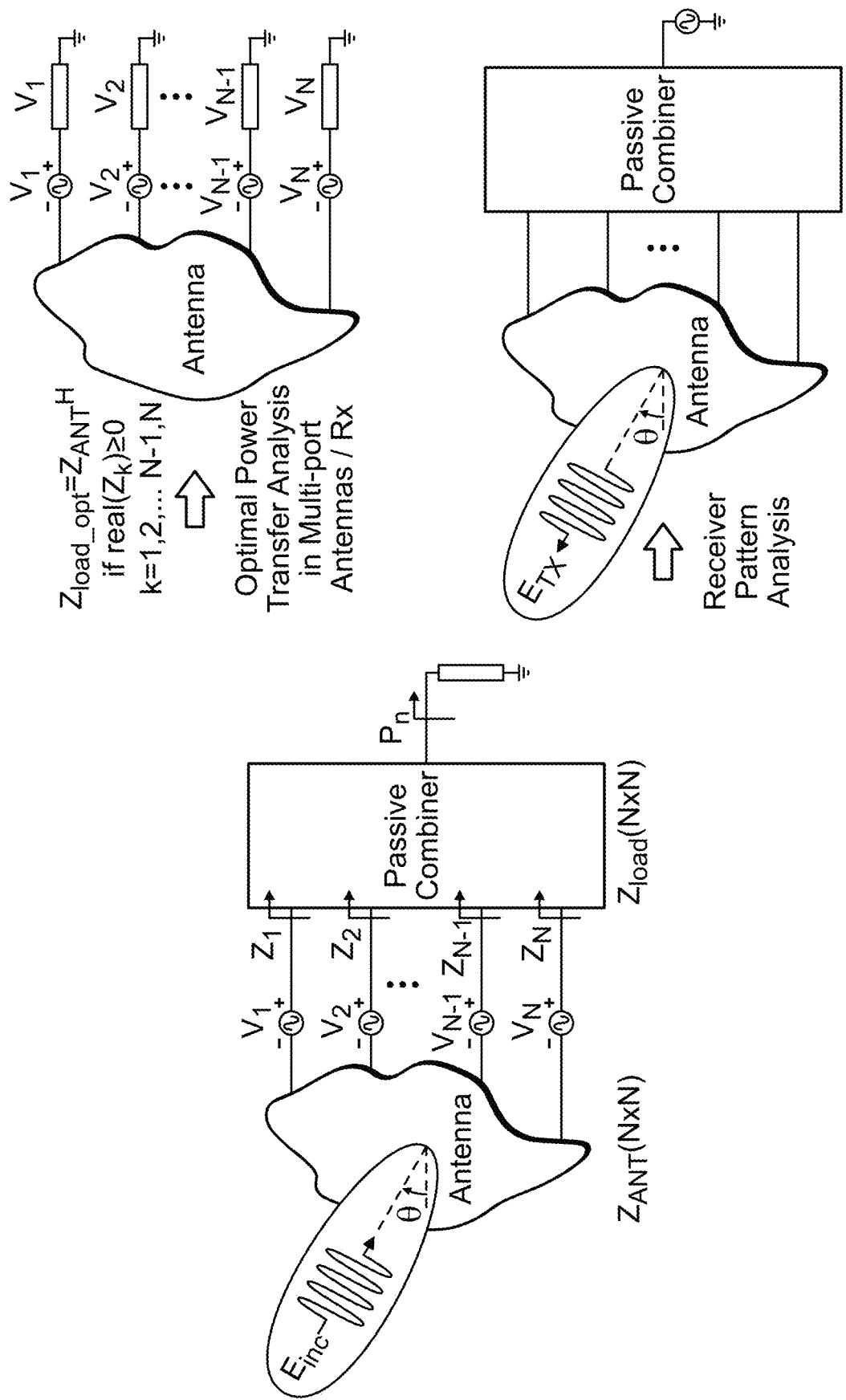
FIG. 29 depicts a model of optimal power transfer in multi-port antenna-coupled receivers and simulation of the receiving patterns according to an embodiment of the present invention.

Synthesizing Receiver Element Patterns and Antenna-Level Processing:

Reception pattern of a single port antenna is the same as the transmission pattern. For a multi-port antenna, the reciprocity holds when the various ports are combined through a reciprocal network to generate one signal per transceiver element. The details are illustrated in FIG. 29, but fundamentally this is because the combiner can be assumed to be part of the antenna structure. Therefore, a multi-port antenna with a multi-port combiner becomes equivalent to a single port antenna and its receiving pattern can be simulated from its transmission pattern. Moreover, such combining of the multiple ports locally is necessary to allow for scalability of the proposed architecture for large arrays. The port element patterns in FIGS. 6(a)-(d) are nearly identical to the respective transmission ones in FIGS. 4(a)-(d). Therefore, the multi-port structure allows an enhanced scan range and efficient creation of dual beams similar to the Tx interface.

Figure 6A:
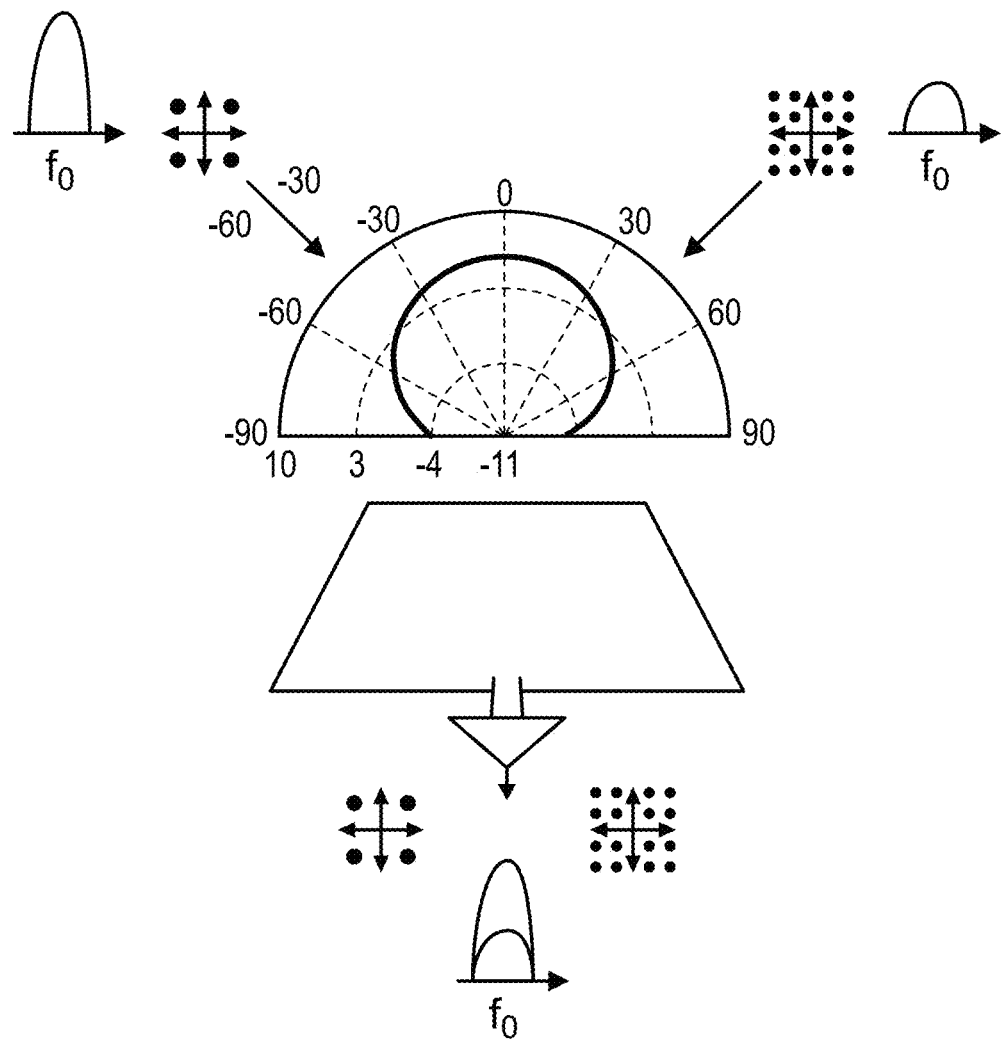
FIG. 6(a) depicts a patch antenna and its half power beamwidth (HPBW) which determines the scan range of the array according to an embodiment of the present invention.
Figure 6B:
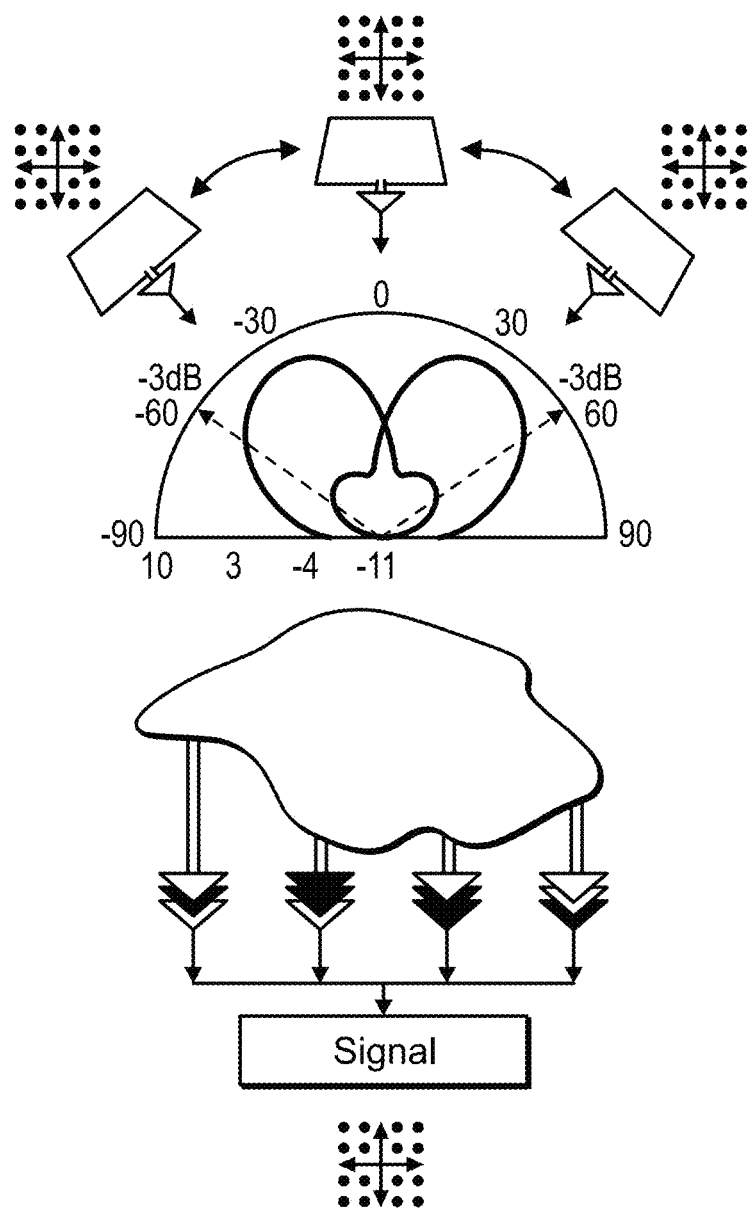
FIG. 6(b) depicts a multi-port antenna-Rx interface increasing scan range according to an embodiment of the present invention.
Figure 6C:
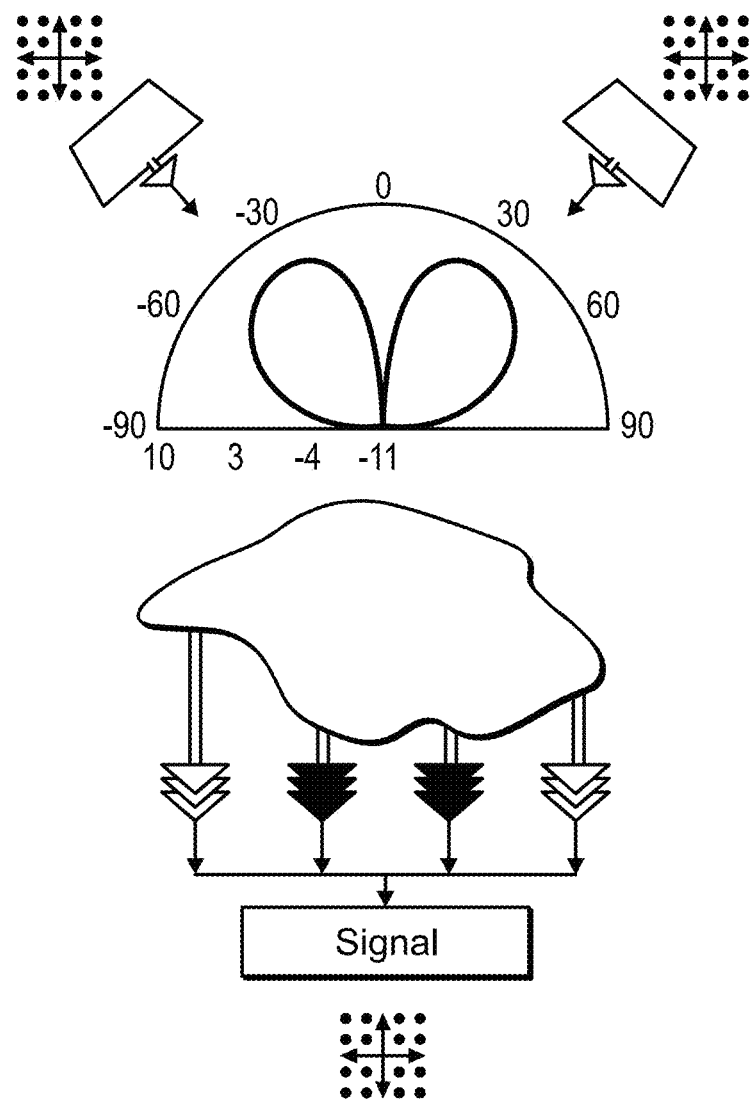
FIG. 6(c) depicts a multi-port antenna-Rx interface establishing dual beams for wide angles of departure in a single antenna according to an embodiment of the present invention.
Figure 6D:
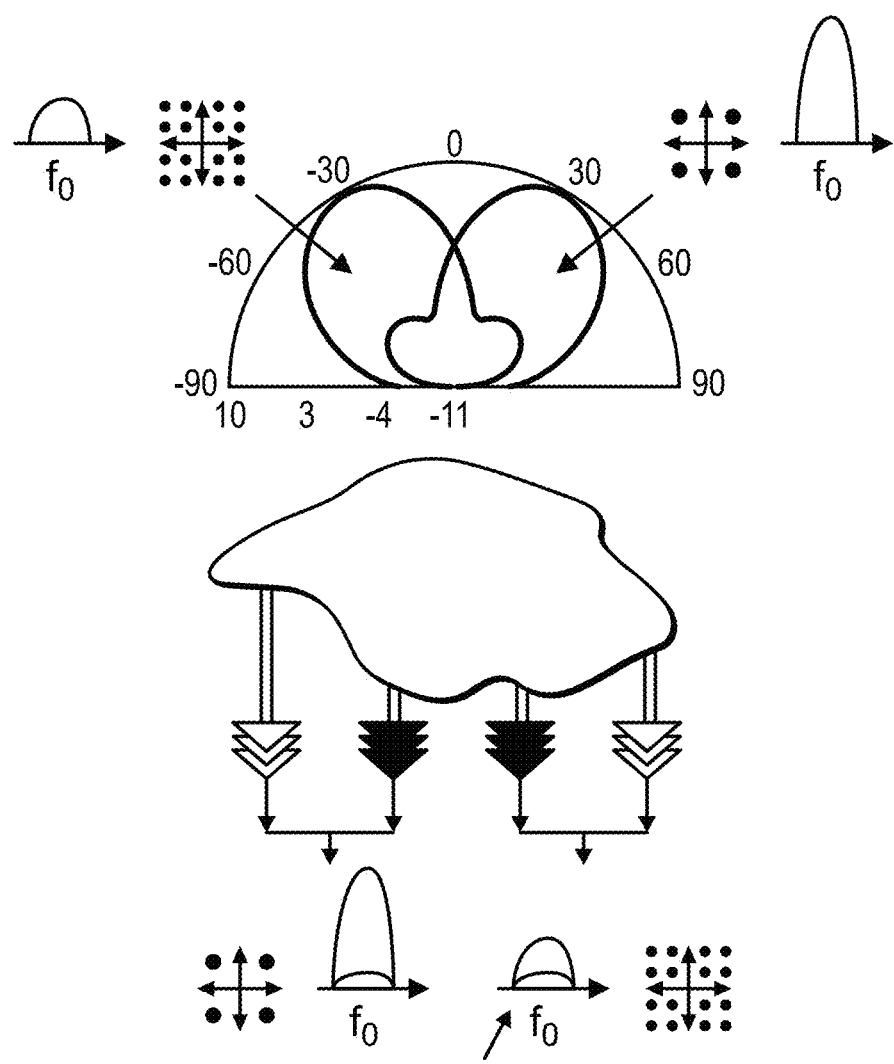
FIG. 6(d) depicts a multi-port antenna-Rx interface showing interference suppression at the antenna surface and processing multiple independent beams.

More importantly, the ability of each port to 'listen' to a different region in space allows the architecture to preselect the signal capture angle (i.e. spatially filter before the beamformer) depending on the angle of arrivals of the desired signal and the interferers. This is distinct from classical arrays where the element pattern captures all signals within the beamwidth in a fixed fashion independent of the direction of the signals, multi-path components and interferers (as shown in FIG. 6(a)). While each element has a low directivity pattern, the ratio between the pattern maxima and notch can be substantial. Therefore, control of the element maxima and the minima can allow pre-processing of the signal at the antenna. This property also gives each antenna the capability of emulating the behavior of a set of distinct antennas allowing spatial diversity in a manner similar to antenna selection.

Figure 7A:
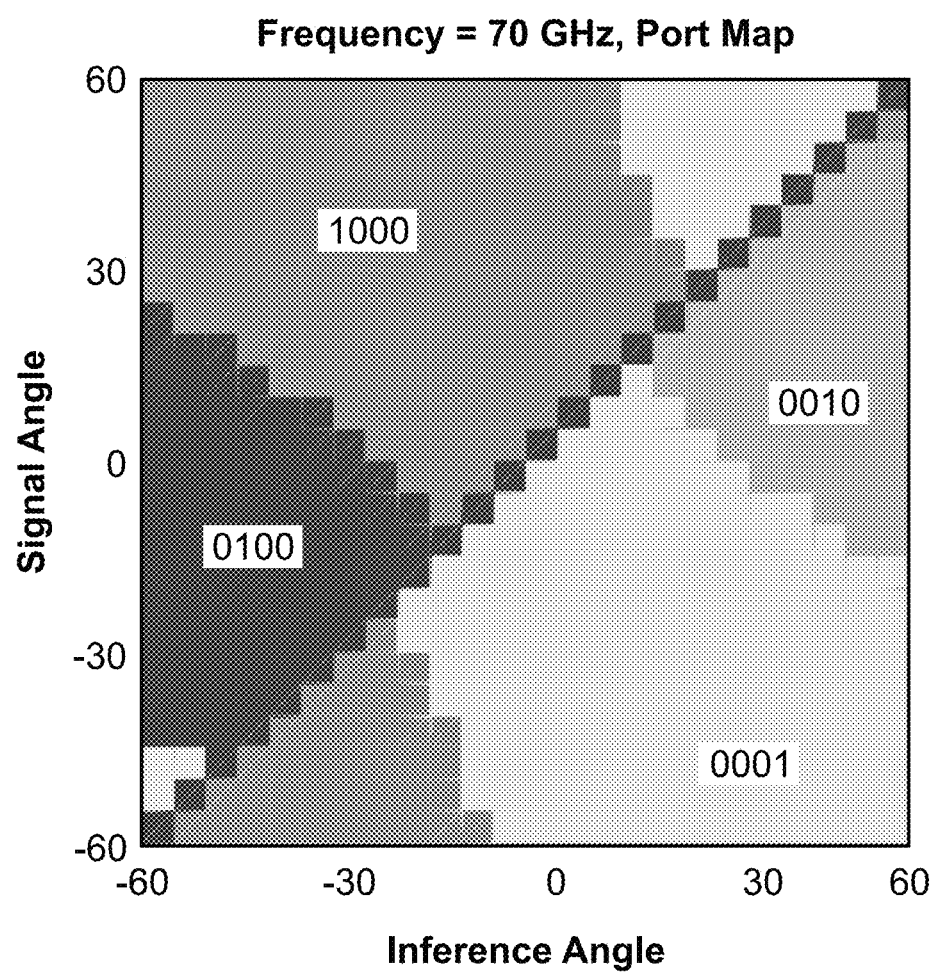
FIG. 7(a) depicts the achievable signal-to-interference (SIR) ratio across the various directions of the signal and interference angle according to an embodiment of the present invention.
Figure 7B:
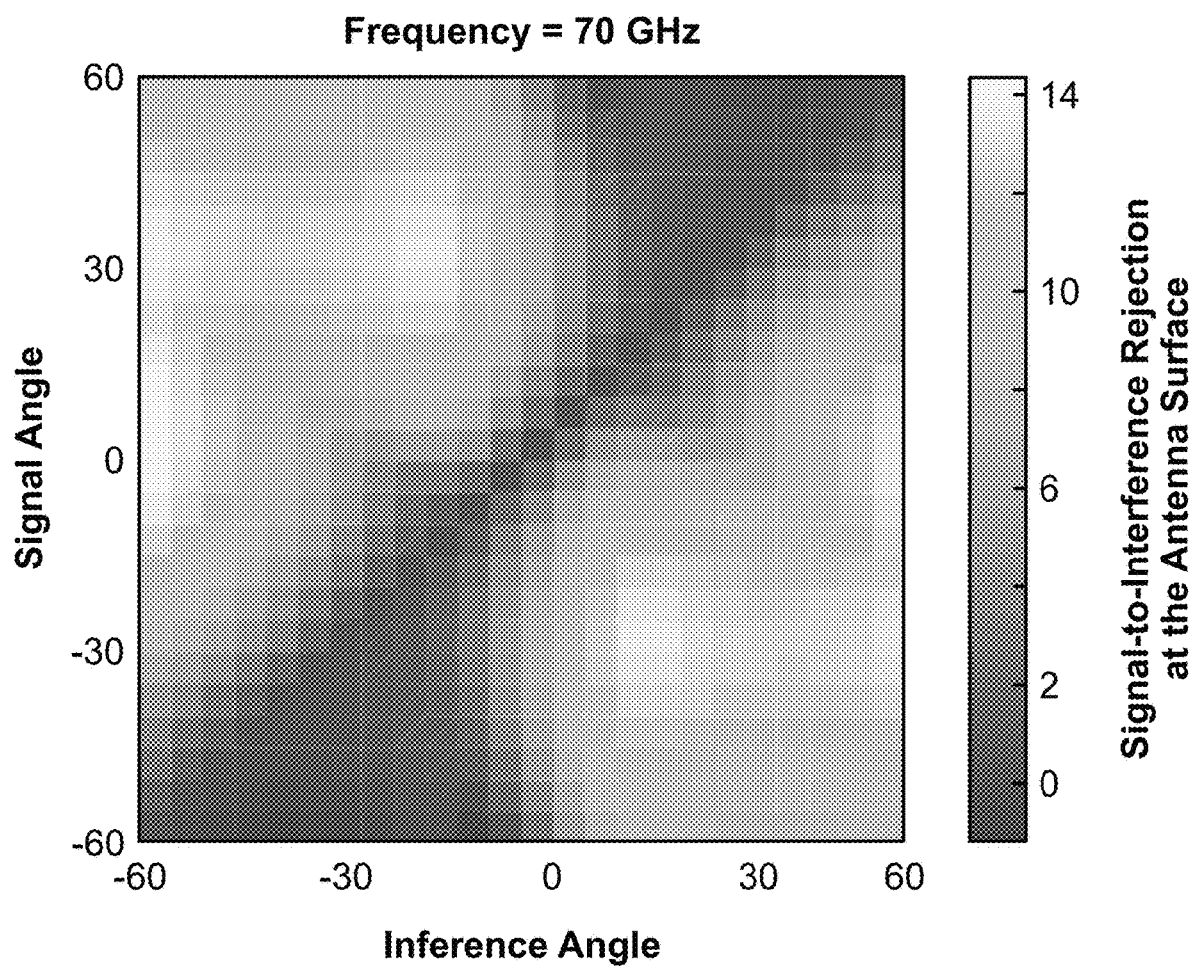
FIG. 7(b) depicts the achievable SIR ratio across the various directions of the signal and interference angle according to an embodiment of the present invention.

This suppression of the interferer can be enhanced through array beamforming, but the rejection at the element antenna surface allows reduction of the linearity requirement and power dissipation of the Rx element. The effectiveness of element level interferer rejection is shown in FIGS. 7(a)-(b). As a nonlimiting example, considered here is a one-signal, one-interferer with equal signal strength and one of the 4-ports is selected to optimize the signal-to-interferer (SIR) ratio. By choosing the element pattern that produces largest difference in its directivity between the signal and the interferer incident angles, the average SIR improvement for this particular antenna and its patterns is simulated to be 6.42 dB. This, of course, depends on the design of the antenna and the port structure. In certain directions, the improvement can be as high as 10 dB which roughly reflects the ratio of the maxima of one port pattern to the minima of another port pattern in the same azimuth. The choice of the element pattern or the port is straightforward knowing the direction of the signal and the interferer. This information can be known in a MIMO scenario and is utilized to determine the pre-coding, beamforming, and array notch shaping at the system level.

As an extension, similar to the Tx, the Rx radiating surface can process more than one spatial beams simultaneously by de-multiplexing them at the radiator into the various ports. This also allows the system to channelize an unwanted interferer into a port and extract the desired signal from another port.

Architecture and Implemented Antenna Interface

Since the radiating properties are determined by the subwavelength excitations and the boundary conditions, the antenna needs to be co-designed with the Tx/Rx interface. As shown in FIG. 3, a log-periodic tooth antenna 12 which is split in the center into a symmetrical structure and connected with 4-ports, is chosen as the multi-port EM interface for both Tx/Rx. The size of the modified radiator varies between $0.45\lambda$ to $0.9\lambda$ in the dielectric across 37-73 GHz. The design is compatible with the fabrication process and no DRC rules were violated in the design. The arcs were discretized with 1 µm square blocks.

Multi-Port Antenna and Transmitter Interface

Figure 8A:
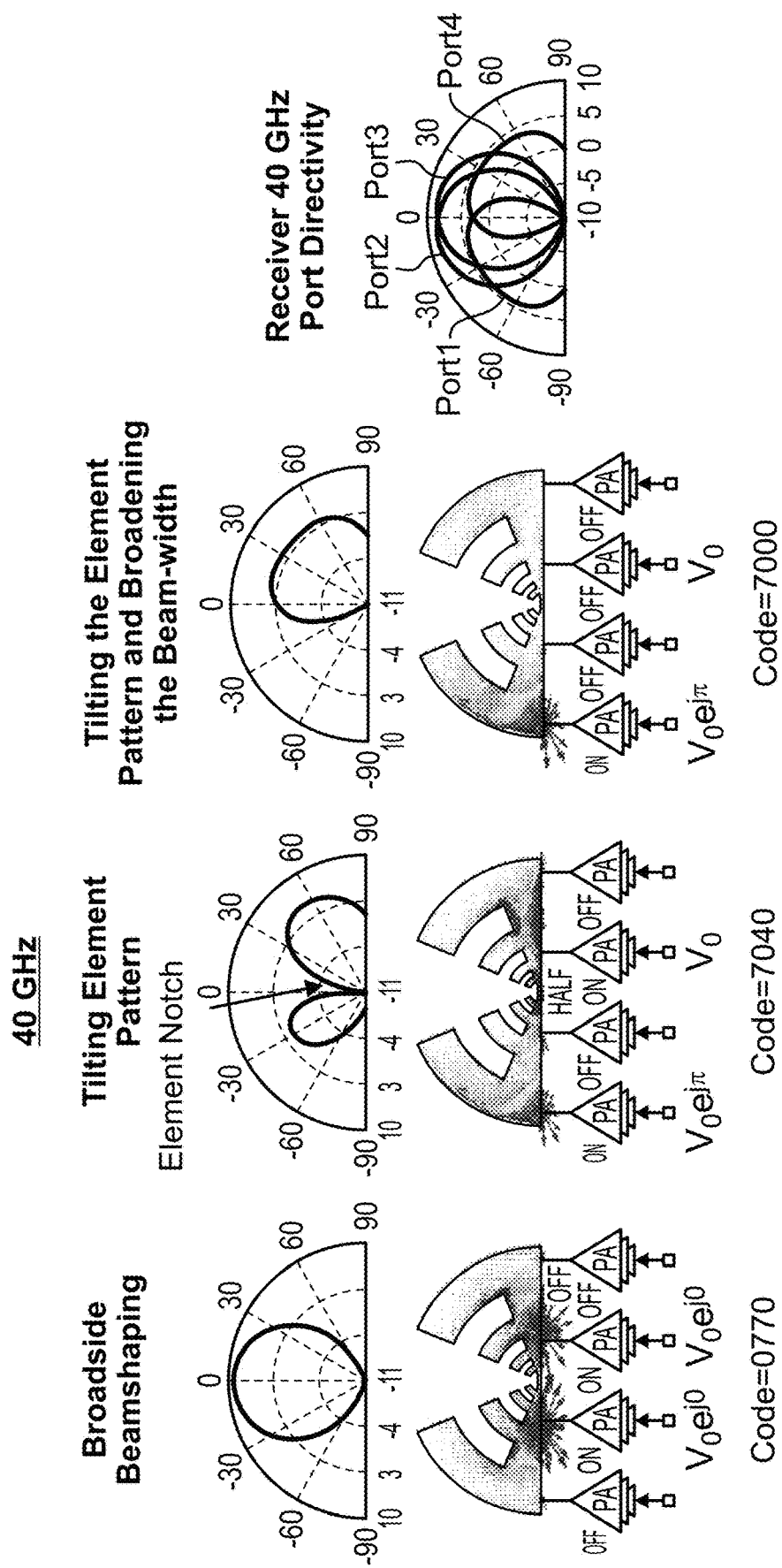
FIG. 8(a) depicts examples of transmitter patterns with a silicon lens under different port excitations at 40 GHz according to an embodiment of the present invention.
Figure 8B:
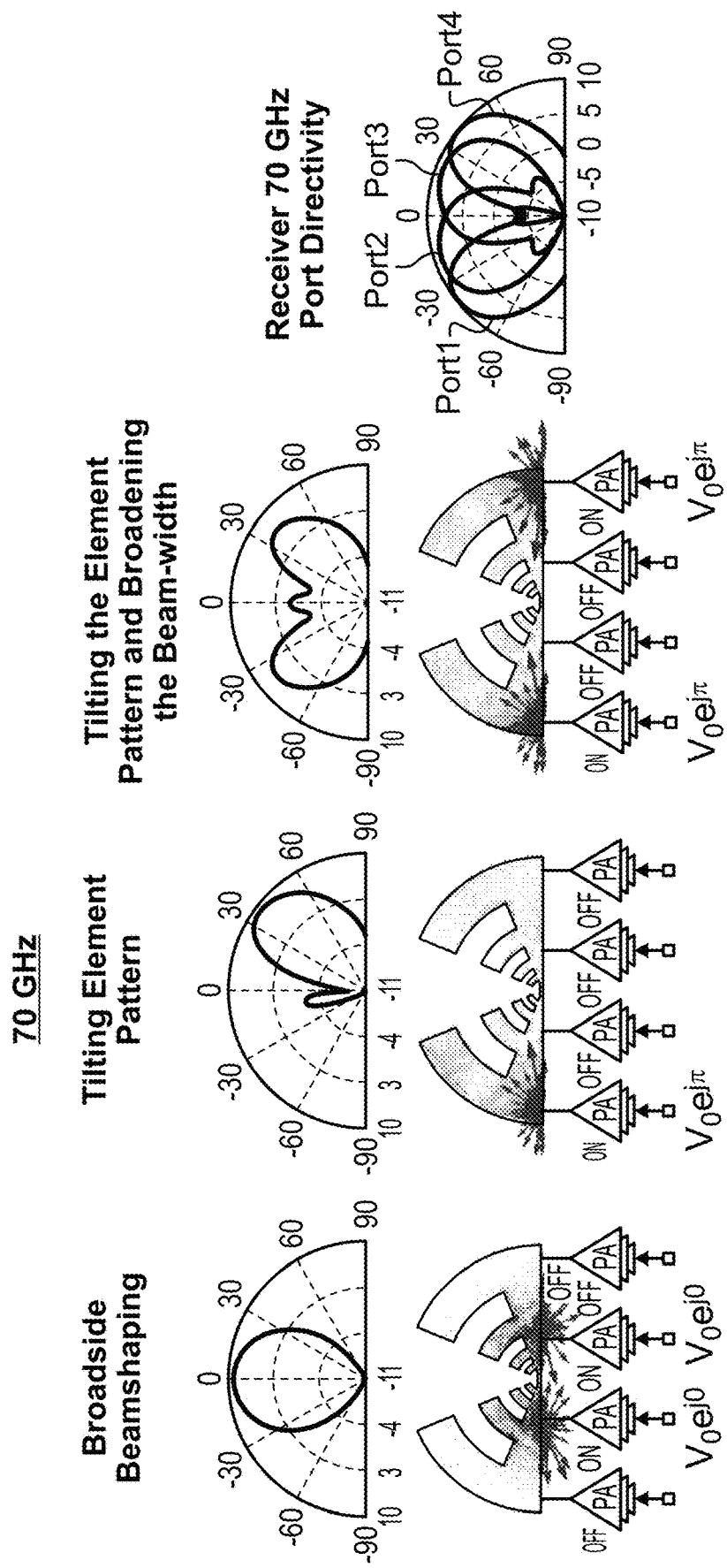
FIG. 8(b) depicts examples of transmitter patterns with a silicon lens under different port excitations at 70 GHz according to an embodiment of the present invention.

FIGS. 8(a)-(c) show a subset of the simulated radiation patterns for the 4-port Tx structure at the two ends of the spectrum at 40 GHz (FIG. 8(a)) and 70 GHz (FIG. 8(b)) with a silicon lens (FIG. 8(c)). A combination of amplitude and phase drive conditions at the four PAs can allow a large set of element field synthesis. However, here for the sake of illustration, the amplitude drives are quantized with mm-Wave DAC cells that can enable efficient implementation of the right set of patterns with the most desirable properties. It has been shown that signal combination from PAs driven optimally at different amplitudes and phases can result in simultaneously broadband performance and high back-off efficiency. Here, similar mutual interactions are exploited in a radiating surface to synthesize the optimal impedances for broadband operation and the desired beam patterns simultaneously. The edge ports are driven in phase at 0°, while the center ports are driven coherently at −180°. Each port is driven by a 3-bit mm-Wave DAC which allows a possible set of $2^{12}-1=4095$ set of element patterns through sub-wavelength actuation in the multi-port system. However, only a subset of element patterns can allow substantial control of the total pattern for frequency agility and antenna-level signal processing as shown in prior figures. These can serve as the canonical codes and optimal impedance matching is ensured for these sets of patterns.

The amplitude codes for the combining 3-bit DACs to synthesize various patterns are frequency dependent, as shown in FIGS. 8(a)-(c). A broadside beam is synthesized with coherent in-phase excitation at the center ports corresponding to DAC code '0770'. To tilt the beam by +45°, different code combinations can be enabled depending on the frequency of operation. At the lower end of the spectrum near 40 GHz, a combination of the edge and center ports (DAC code: '7070') creates a current distribution that tilts the main beam and the notch by 45°. As a result of the two PAs driven nearly out of phase across the two ports, a phase and amplitude gradient is formed on the surface that turns the beam by 45°. Evidently, this effect is frequency dependent. A similar beam pattern is achieved with single edge port excitation (DAC code: '7000') at 70 GHz. Therefore, dual excitation at the edge ports can create either a dual beam for wide departure angles or two independent spatial beams near 70 GHz.

Figure 9:
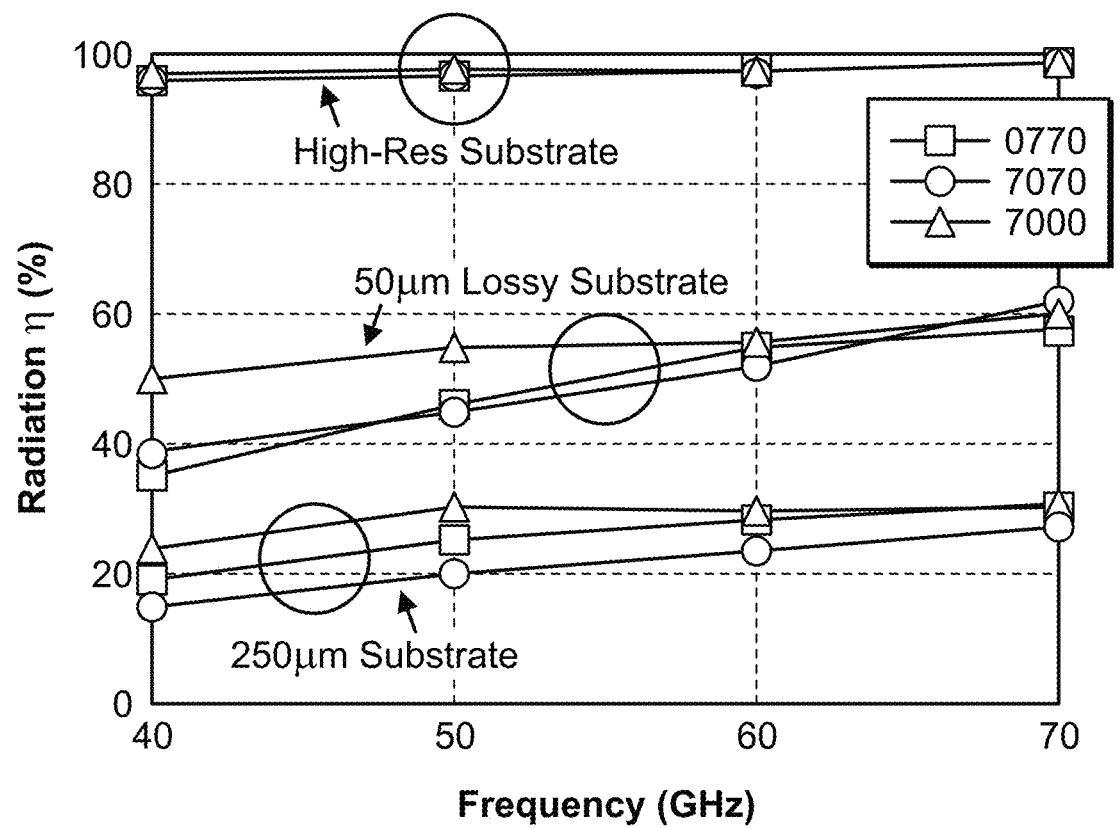
FIG. 9 depicts radiation efficiency corresponding to the canonical element patterns according to an embodiment of the present invention.

FIG. 9 shows that for an unthinned 250 µm lossy substrate with $\sigma_{sub}\sim13.5$ Ω-cm, the radiation efficiency varies between 25-40% across the spectrum for the various codes. The efficiency exceeds 90% for a high-resistivity SOI substrate ($\sigma_{sub}\sim1$ kΩ-cm) which demonstrates the feasibility of high efficiency antennas on chip at mmWave frequencies. In summary, the frequency-dependent codebook across the DAC mm-Wave cells can create a wide array of element patterns including rotating the maxima and notch, creating dual beams for wide angles of departure, as well as multiple independent spatially separated information beams.

Multi-Port Antenna and Receiver Interface

Figure 10A:
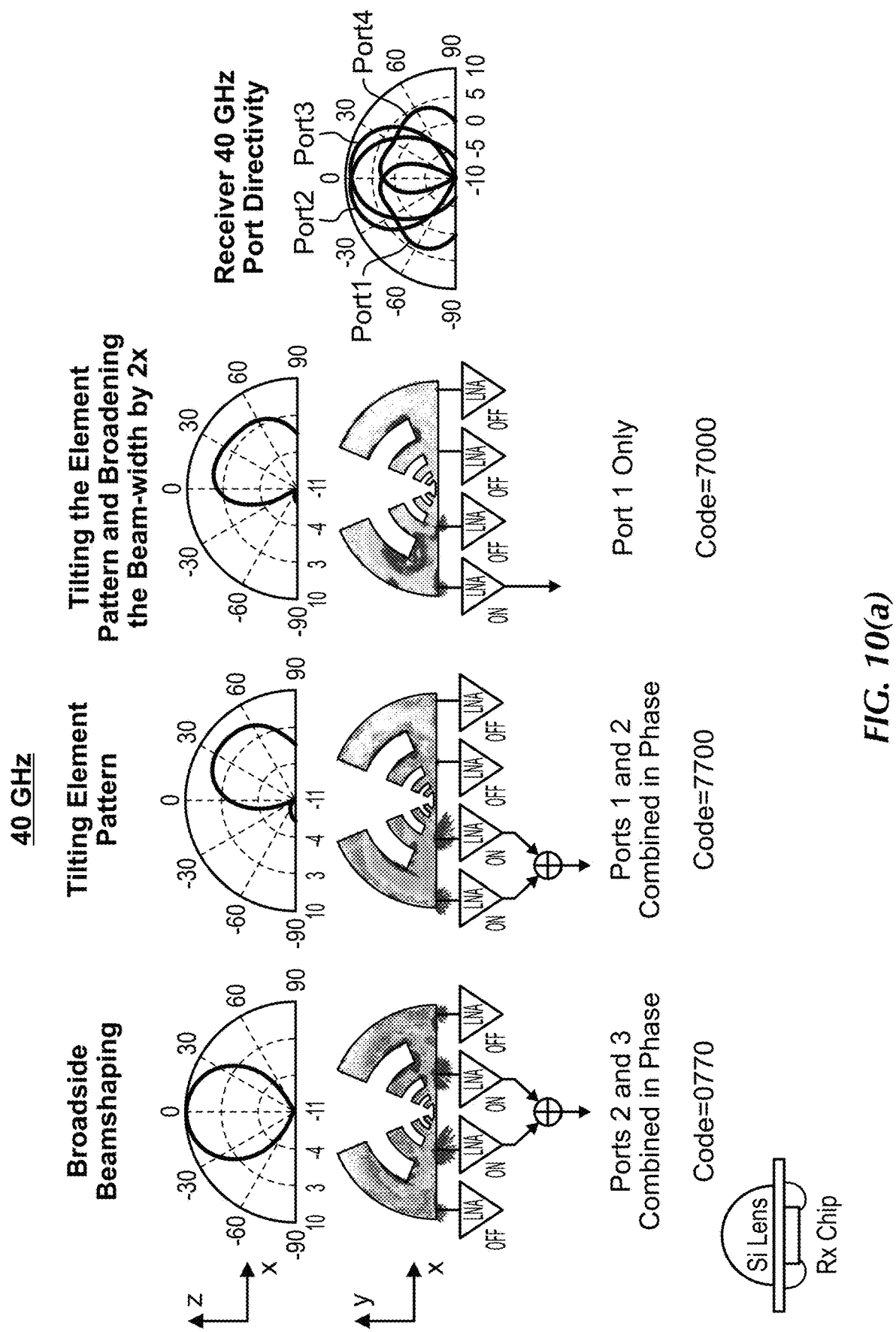
FIG. 10(a) depicts examples of receiver patterns with a silicon lens under various combinations of the port outputs at 40 GHz according to an embodiment of the present invention.
Figure 10B:
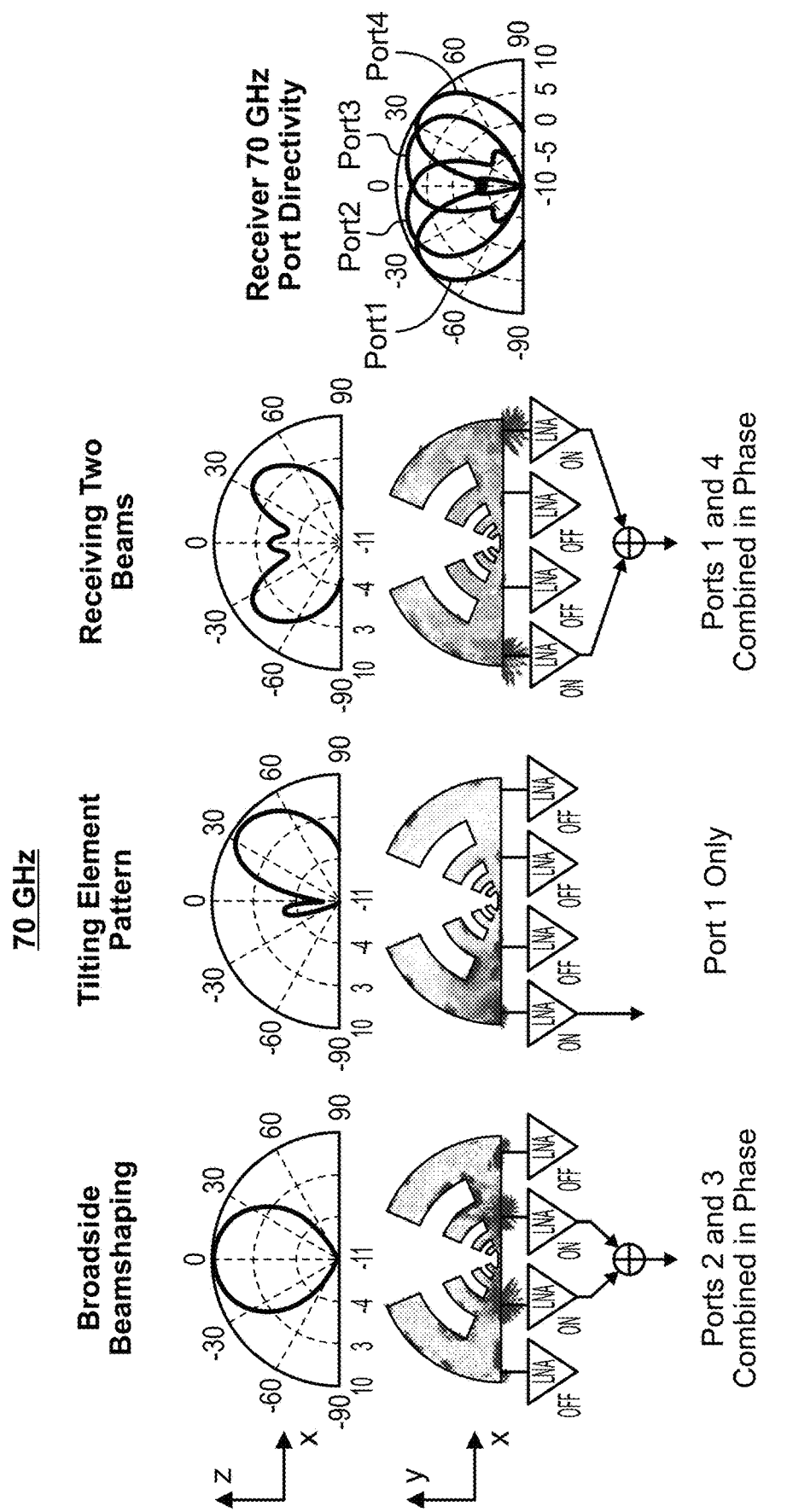
FIG. 10(b) examples of receiver patterns with a silicon lens under various combinations of the port outputs at 70 GHz according to an embodiment of the present invention.

In the receiver case, the reception beam can be shaped with dynamical programming of the sub-wavelength receiver ports. The distribution of the incidence signal across the various ports is represented in FIG. 10(a)-(b). A broadside excitation across 40-70 GHz channelizes the signal into two identical signals into the two center ports with equal amplitude and equal phase. The shape of the radiating surface and the loading conditions of the center ports allow the signal to flow naturally into the center ports. The loading of edge ports has minimal effect at higher frequencies, as shown in FIGS. 10(a)-(b). An incident signal at +45°, on the other hand, is channelized into the edge and the center ports in a frequency-dependent fashion. Towards the higher end of the spectrum, the edge port is the dominant receiving port.

The four ports emulate four element antennas pointing at different directions. Processing one of the signals is tantamount to choosing an antenna out of a set of distinct antennas with a switchable network. The port pattern sets create a basic reconfigurable spatial filtering at the antenna-level before any beamforming. Combining these port signals effectively creates an element level beamforming as shown in the radiation patterns with two port combinations in FIGS. 10(a)-(b). In addition to element pattern synthesis, the multi-port structure also allows spatial diversity, as will be discussed later in relation to measurements. The edge ports also have cross-polarization components which can facilitate partial polarization diversity when the incident field is rotated.

Tx/Rx Architecture with Integrated Antenna and Constituent Circuits

Tx Architecture and Multi-Port Antenna

Figure 11B:
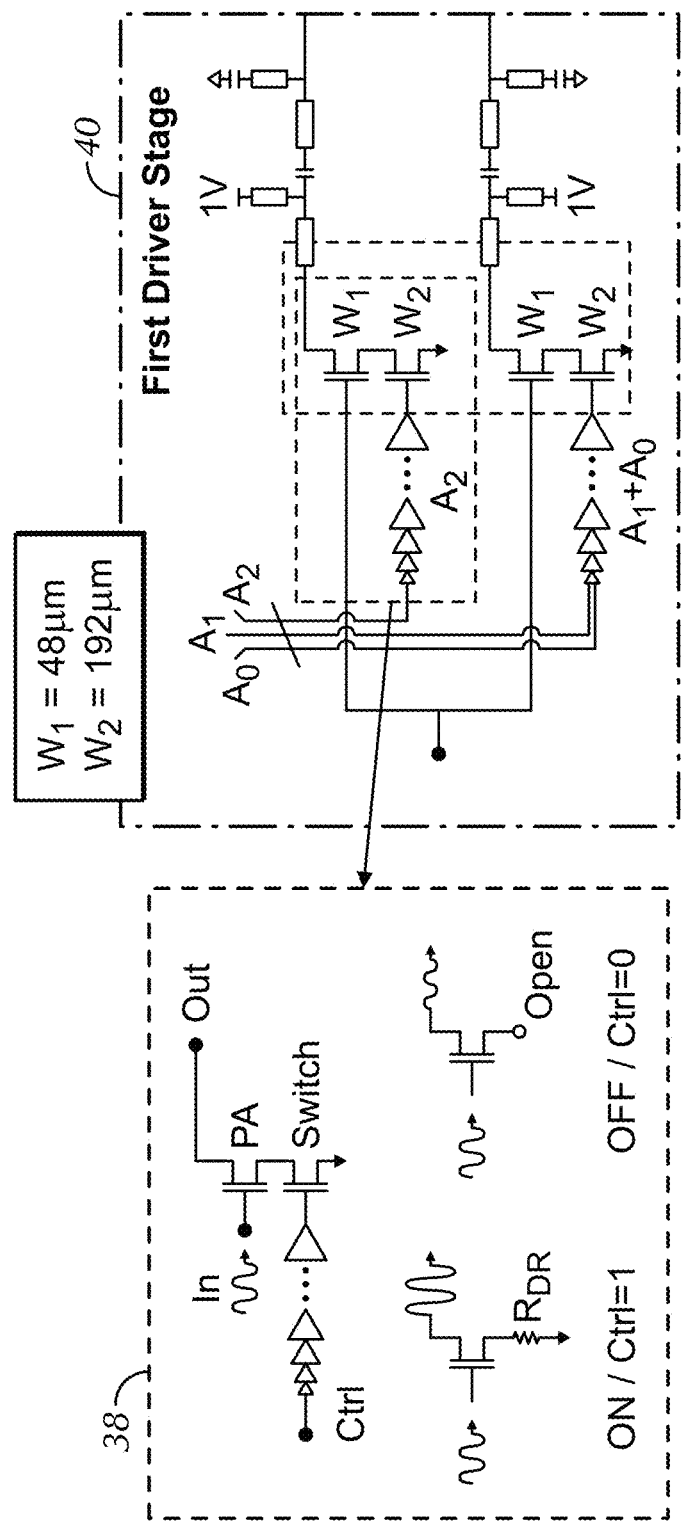
Figure 11D:
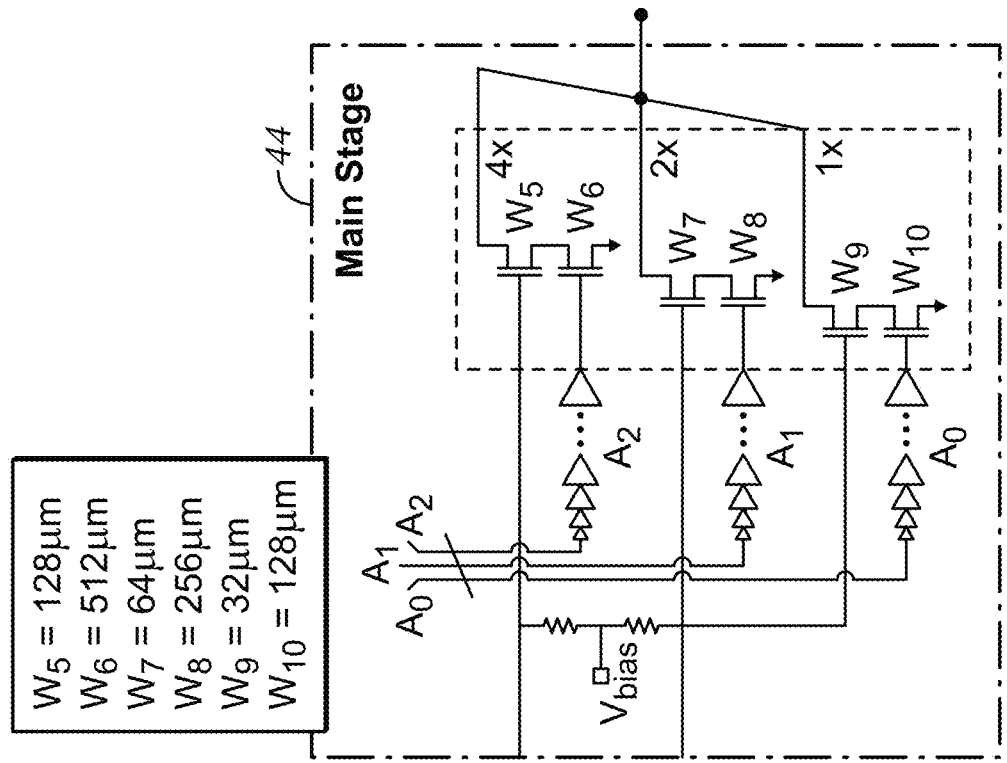
Figure 11C:
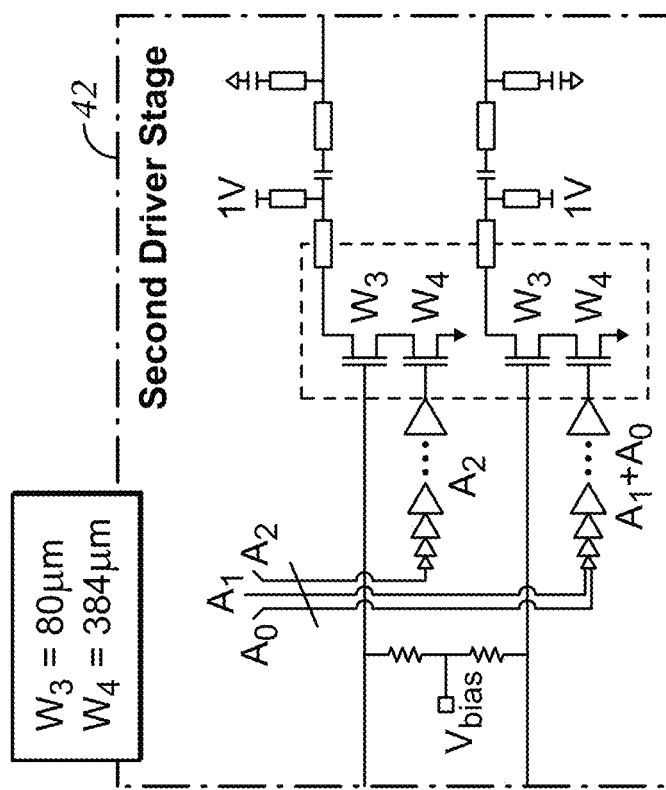
Figure 11E:
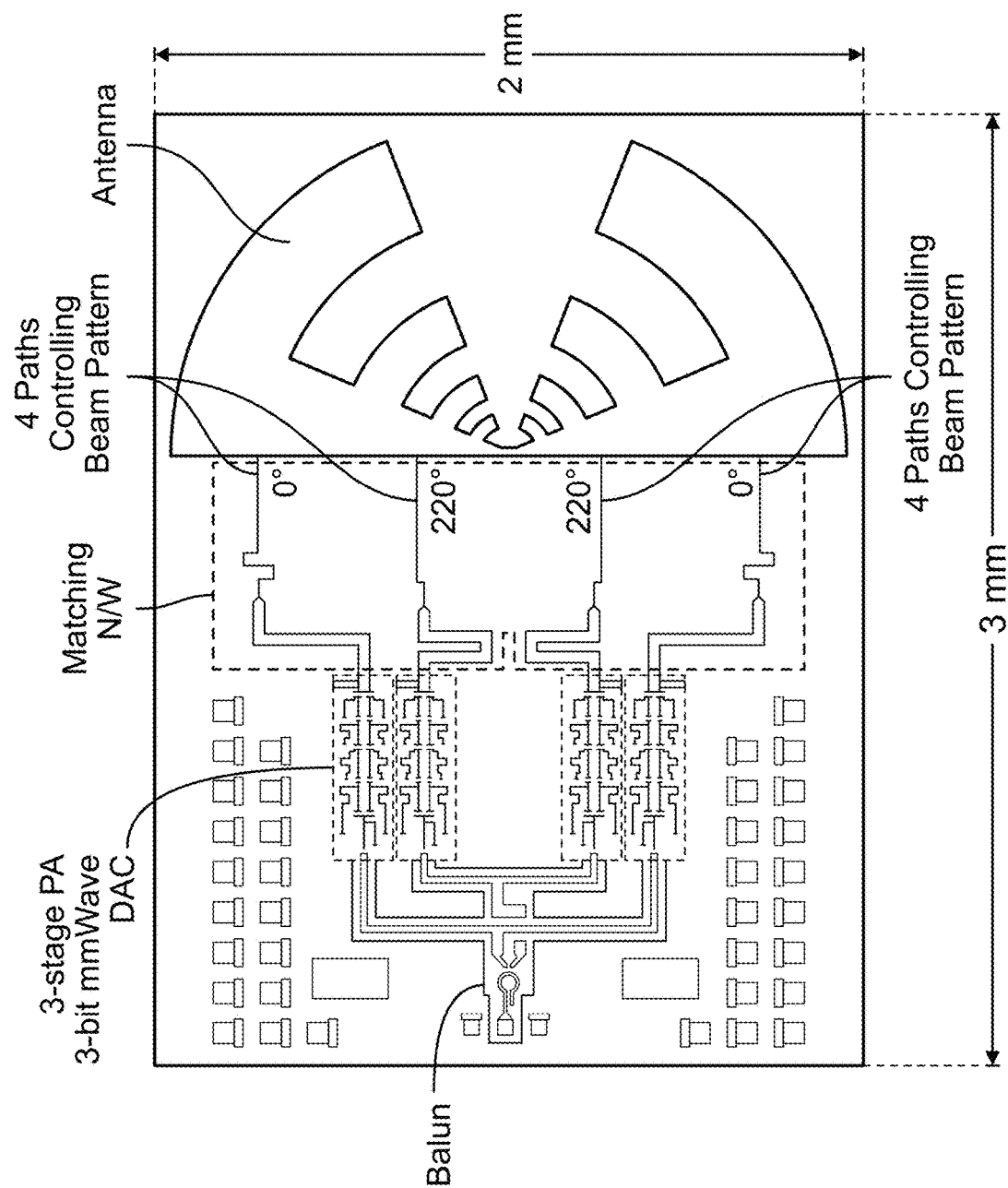

The Tx/Rx architecture is co-designed with the radiator interface in a 65-nm bulk CMOS process. The Tx architecture 22 and the die photo are shown in FIGS. 11(a) and 11(e), respectively. The mm-Wave signal is fed to GSG pad structure 24 on chip through short wirebond 26 from a PCB 28, which in turn is fed through a 1.85 mm connector 30. An on-chip balun 32 following the pad structure creates the necessary phase components for the multiport radiator. The 3-stage power amplifier (PA) 34 is split into 4 paths and then connected to a 4-port radiating structure 36. Each output stage is a 3-bit binary weighted mm-Wave DAC cell with a common-source stage. All the PA and the driver cells operate from a 1 V supply.

1) Constituent circuits: The transistor level schematic 38 of the drivers and the PA cells are also shown in FIGS. 11(b)-(d). When the control bit is on, the source of the PA cell is nearly shorted to ground through the switch, which behaves like a common-source PA. When the control bit is off, the source is disconnected and the PA turns off. FIGS. 11(b)-(d) also show individual transistor sizes optimized for maximum power transfer through load-pull matching, illustrated in a first driver stage 40, second driver stage 42, and main stage 44. The pre-drivers and drivers are 2-bit thermometer-coded (A2 and A1+A0) which drive the corresponding output cells. This allows for shutting off half of the driver stages when half of the output cells are switched off as well. The input stages and all the inter-stage matching networks are designed to be wideband to cover the 37-73 GHz frequency range.

Figure 12A:
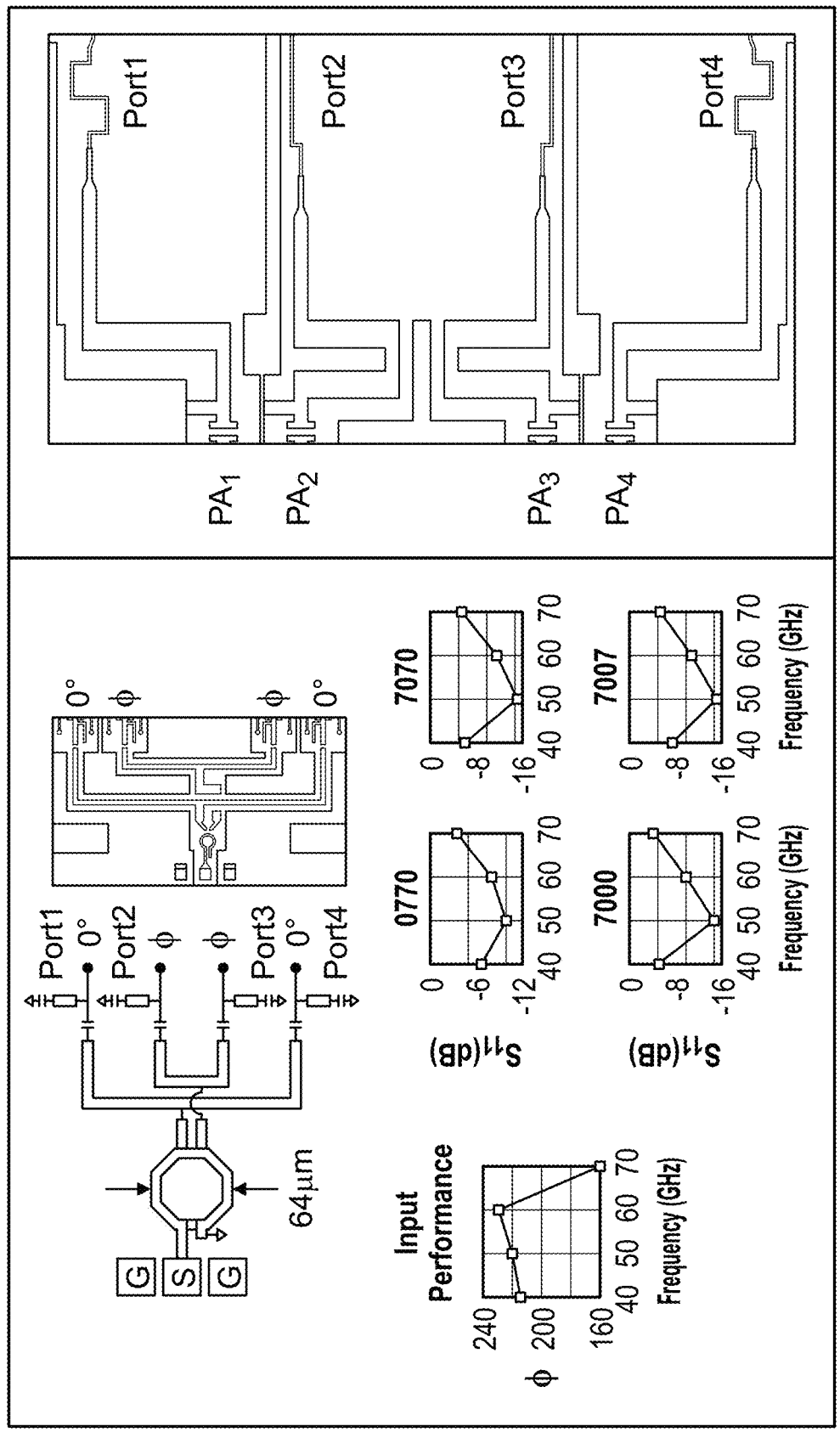
FIGS. 12(a)-(b) depict input balun, distribution network, and simulated input matching across 40-70 GHz for various configurations according to an embodiment of the present invention.
Figure 12B:
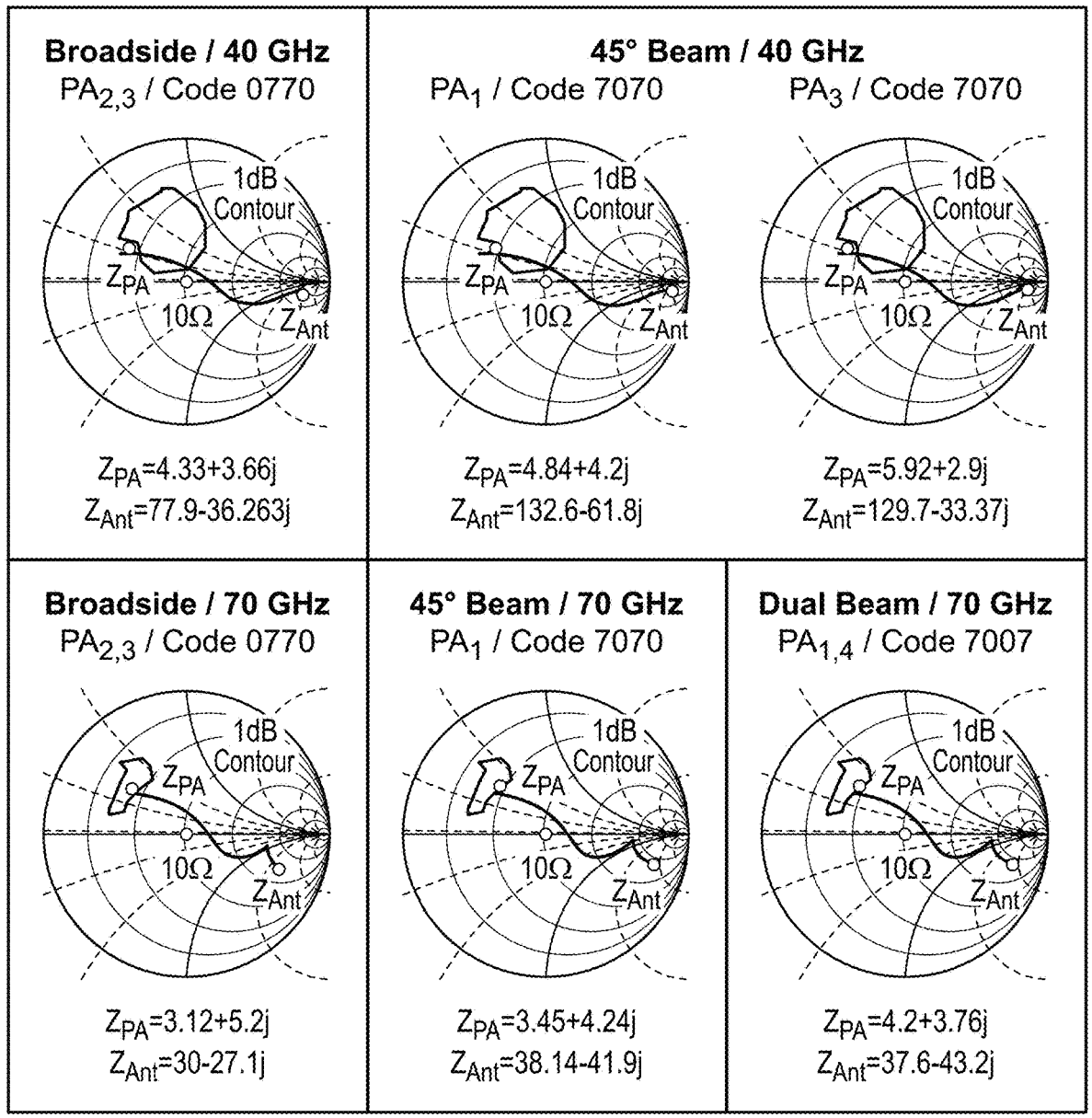

2) Input balun, 4-port input matching, and distribution network: The required phases of the signals across the four ports of the radiator to allow beamshaping are generated with a low-loss balun 32 implemented to provide constant amplitude and the desired phase shift over a wide frequency band. FIG. 12(a) shows the implemented balun 32 along with the simulated phase generation and matching conditions. The top aluminum layer (AP) and top copper layer (M9) are used to implement the transformer balun 32 with M6-M7 layer combined as the ground plane. The input matching is also designed to be fairly wideband across the frequency range and across various EM synthesis codes as shown in the simulated S11 for all configurations in FIG. 12.

Figure 13:
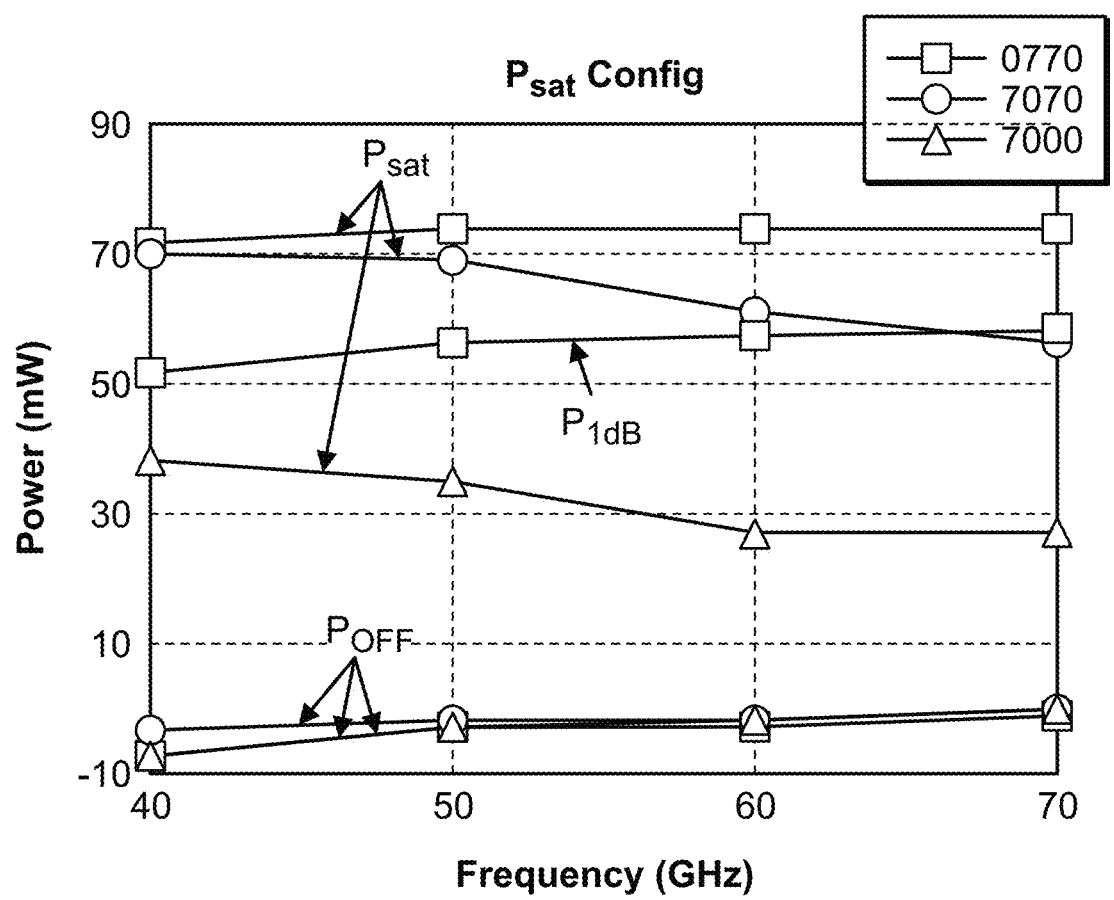
FIG. 13 depicts simulated $P_{sat}$ and $P_{1dB}$ across frequency and codes demonstrating near-optimal matching is achieved across frequency and element patterns according to an embodiment of the present invention.

3) 4-port output matching: The 4-port antenna 36 is used simultaneously for signal combining and beam-steering. Therefore, the matching network is co-designed with the EM interface to enable both wideband efficient power generation and pattern synthesis across the various codes. The network synthesis method is configured to enable broadband and back-off matching in a multi-port architecture through mutual interactions. As can be seen from FIG. 12(b), the impedance presented across frequency and the various EM synthesis codes are near optimal, allowing efficient power generation across 40-70 GHz and pattern synthesis at the same time. FIG. 13 shows that the $P_{sat}$ across 40-70 GHz reaches upwards of 18 dBm for broadside (code='0770') and titled patterns (code='7070'). The edge port excitation of one PA delivers around half the power as expected for optimal matching. $P_{1dB}$ for the broadside direction is in excess of 17 dBm across the frequency range. The Tx provides a gain of 16-19 dB across the frequency range.

Rx Architecture with Multi-Port Antenna

Figure 14B:
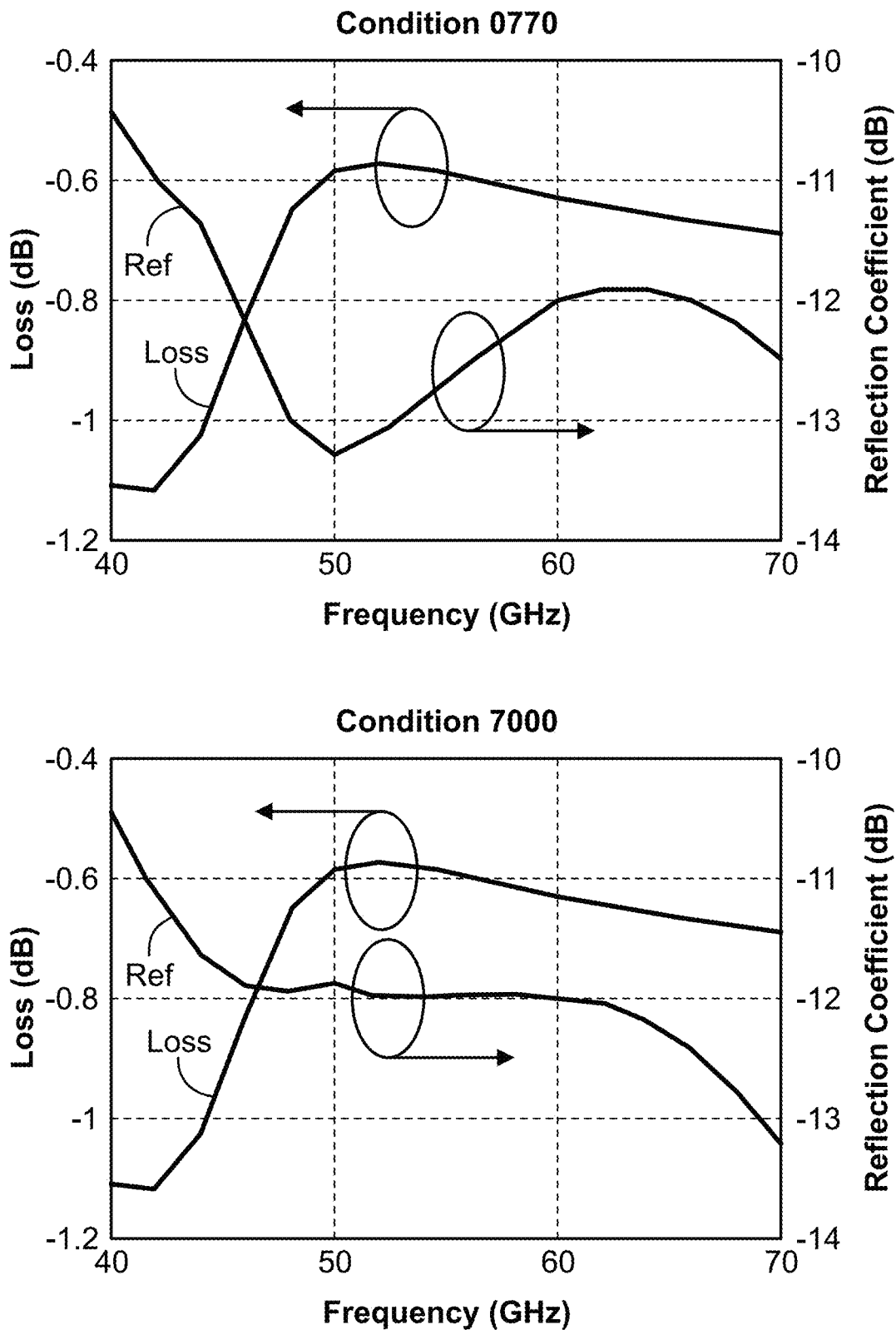
FIG. 14(b) depicts effectiveness of input matching across frequency and two configurations to receive broadside and beams at ±45° according to an embodiment of the present invention.

1) Constituent circuits: The receiver architecture 46 is shown in FIG. 14(a-1). The receiver 46 operates in a reciprocal fashion comparable to transmitter, where the collected signal from the radiating surface is split into four paths across the four ports of a multi-port antenna 48. The terminating port impedances can be reconfigured by suitable switching combinations of the LNA ports that can shape the Rx beam patterns. Each sub-wavelength receiver 50 includes a 3-stage broadband LNA feeding to a differential single-balanced active mixer and a broadband IF amplifier. The LO signal (40-70 GHz) is fed directly into the chip through a short wirebond 52 connected through a matched transmission line (t-line) trace on a PCB 54 to a 1.85 mm connector 56. Similar to the Tx, the differential LO is distributed through a balun 58 and a matched t-line distribution network 60. The angle and frequency dependent signal at each sub-wavelength port is amplified, down-converted, and amplified again to drive the off-chip digitizer to be analyzed. FIG. 14(b) shows the antenna combining losses and the reflection coefficients in the multi-port EM-Rx interface. The losses vary between 0.6-1.1 dB across the range along with near optimal power transfer from the incident fields across the various codes.

The LNA chain is a three-stage topology where first stage is designed to be a common gate LNA using a 32 μm/60 nm NFET, as shown in FIG. 15. The transistor biasing is co-optimized for optimal matching conditions with the multi-port antenna and noise performance across 40-70 GHz. The following two stages of LNAs are cascade stages with 32 μm/60 nm NFETs and t-line/inductor based inter-stage matching to increase the bandwidth. The gains of the three stages are designed to peak at 40 GHz, 50 GHz, and 70 GHz, respectively, so that the combined gain of the LNA chain has a flat response across 40-70 GHz, as show in FIG. 15(b).

Figure 15A:
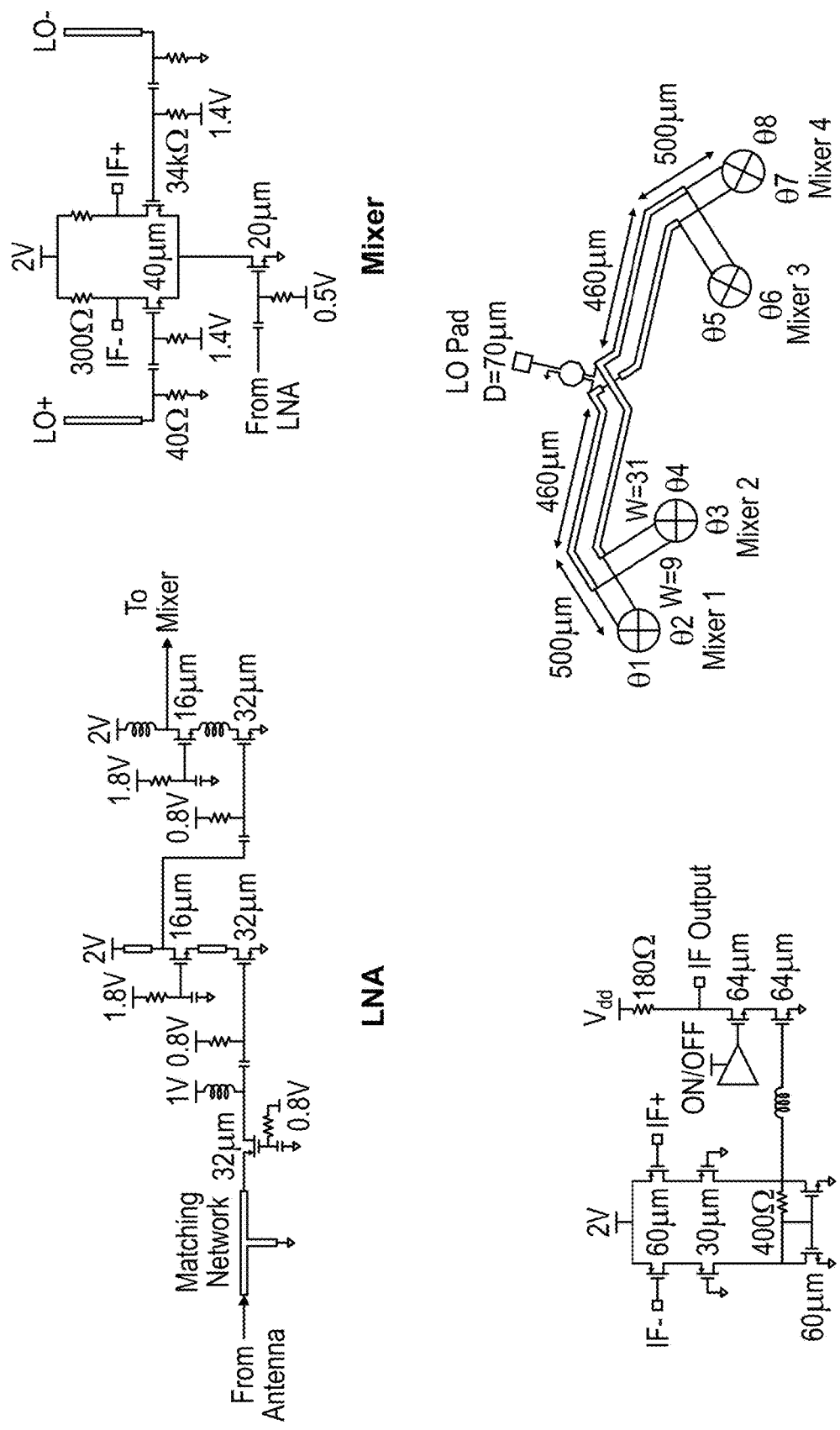

The mixers are implemented as single-balanced cells driven by a common LO through a distribution network. The LO distribution network is shown in FIG. 15(a). An on-chip transformer converts the LO signal into a differential signal and is distributed through-out the chip with on-chip t-lines to drive the mixers. T-lines of impedances $Z_0=20\Omega$ and $Z_0=40\Omega$ are used in the design. The amplitude and phase relations across the ports in FIG. 15(b) demonstrate good matching conditions across the spectrum from 35-75 GHz. The total loss in the distribution network varies between 1.5-2 dB across the frequency range. The mixer and the IF amplifier are co-designed to have a bandwidth of 4 GHz. A series peaking inductor of 1.6 nH is used to boost the bandwidth.

2) 4-port Matching Network: A multi-port antenna with a multi-port load in the receiving mode can be represented as shown in FIG. 29. The antenna and the load can be characterized by their N-port Z-matrix, ZANT and the effect of the incident field on the multi-port antenna can be replaced by a set of open circuit voltages ($V_k$, k=1, 2, . . . , N) at the terminals of the N-port network. The open circuit voltages can be simulated in a 3D finite-element-method (FEM) simulation tool, such as Ansys HFSS, which captures the scattering properties of the antenna under an incident field. The matching network is designed to enable optimal power transfer from the incident field to the 'ON' receivers across frequency and angles of incidence. To demonstrate this, two examples of broadside incidence at 70 GHz and 45° incidence at 40 GHz are taken for the four-port antenna in FIGS. 16(a) and (b), respectively.

Figure 16A:
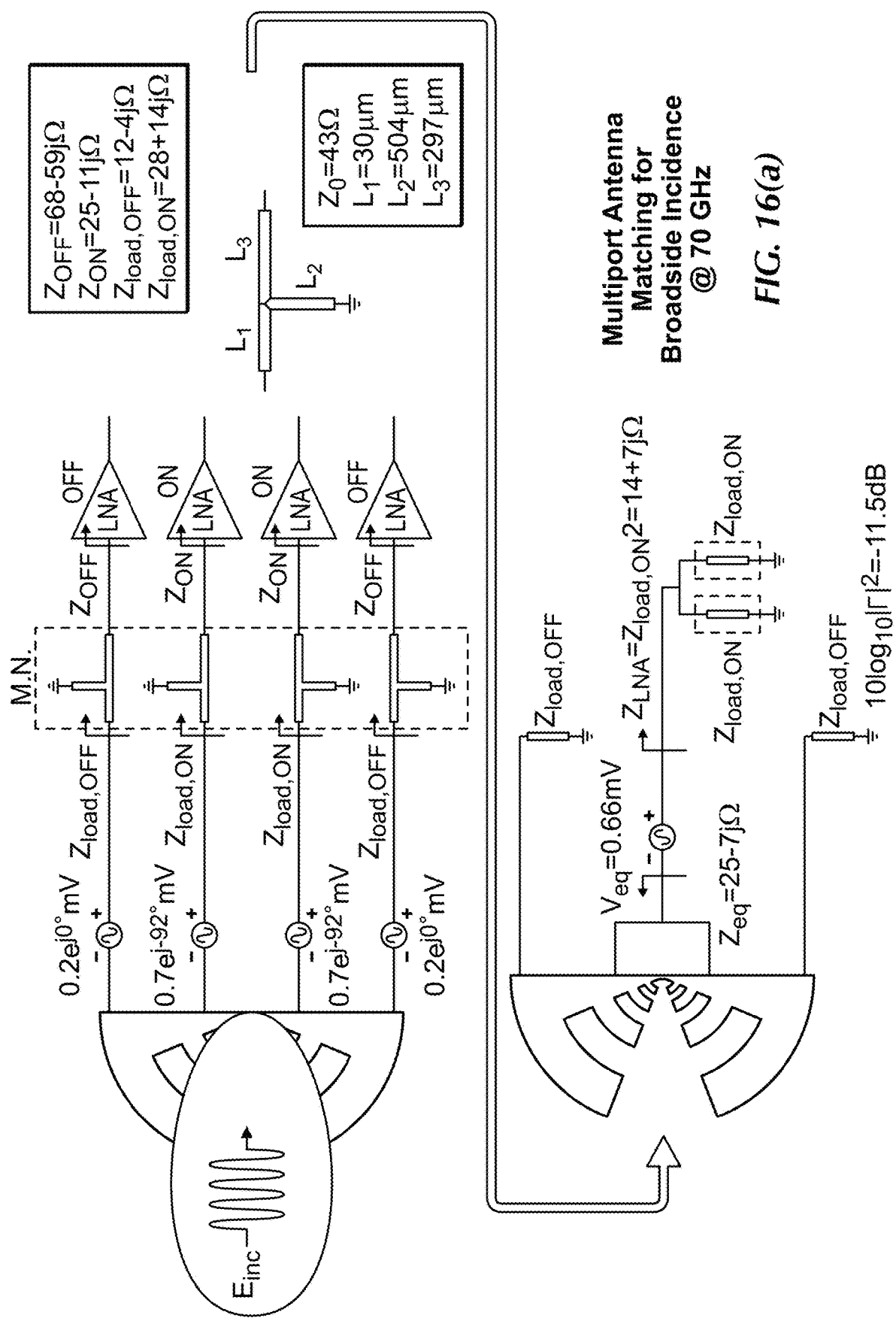
FIG. 16(a) depicts multi-port impedance matching against broadside incidence at 70 GHz according to an embodiment of the present invention.
Figure 16B:
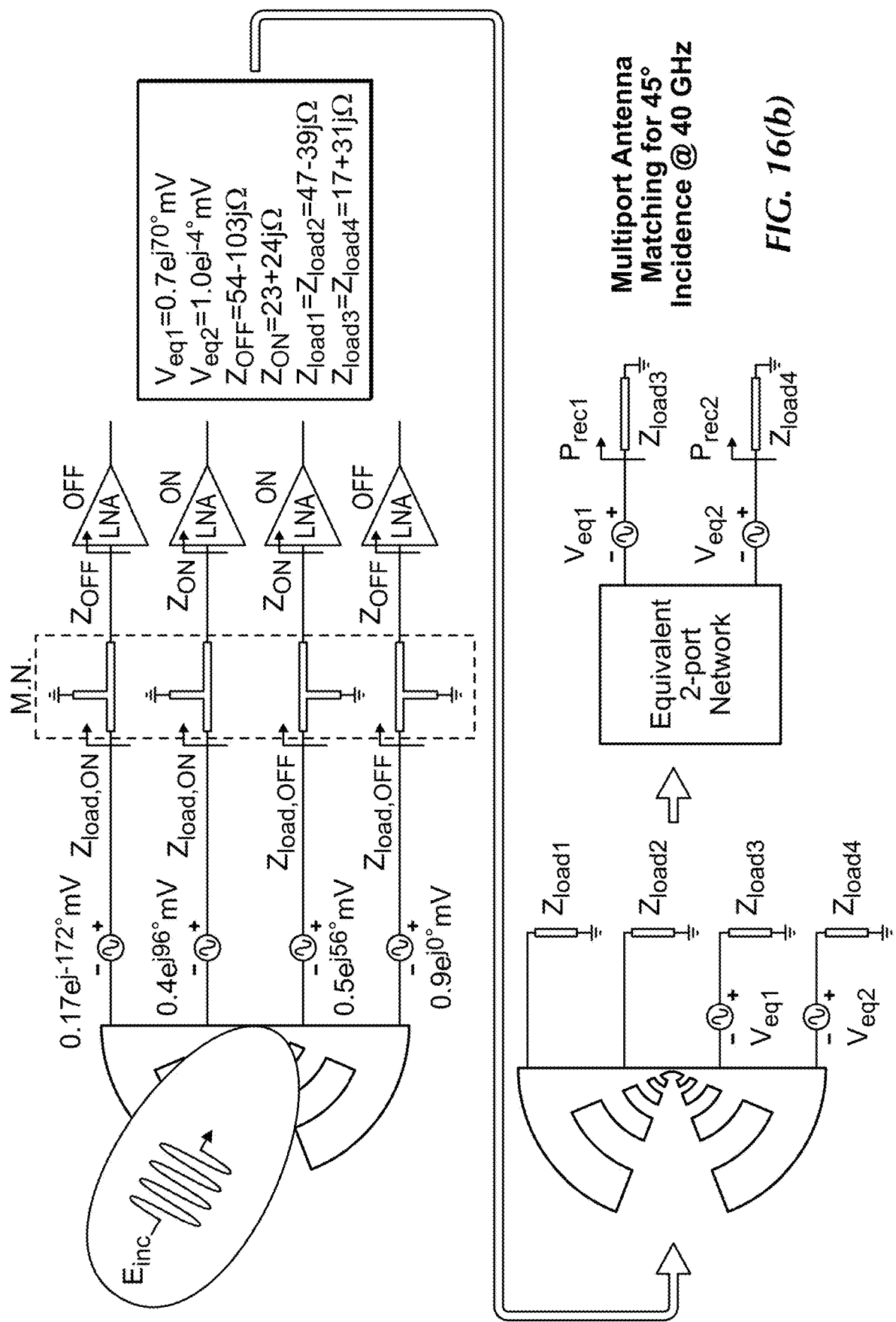
FIG. 16(b) depicts multi-port impedance matching against 45° incidence at 40 GHz according to an embodiment of the present invention.

As shown in FIG. 16(a), a broadside incidence causes symmetric excitation of the ports. This allows for simplifying the multi-port network into a 2-port network. The matching network is designed to allow near conjugate matching under broadside incidence across frequency. As shown in FIG. 16(a), the matching achieves a reflection coefficient of −11.5 dB under this condition. When a plane wave is incident at an angle of 45° at 40 GHz (FIG. 16(b)), the symmetry does not apply anymore. However, similar to the previous case, the power transfer to the 'ON' ports can be analyzed by a 2-port network excited by the open circuit voltages under the incident wave. This model can be further simplified by considering the power going into the two loads separately.

Figure 17A:
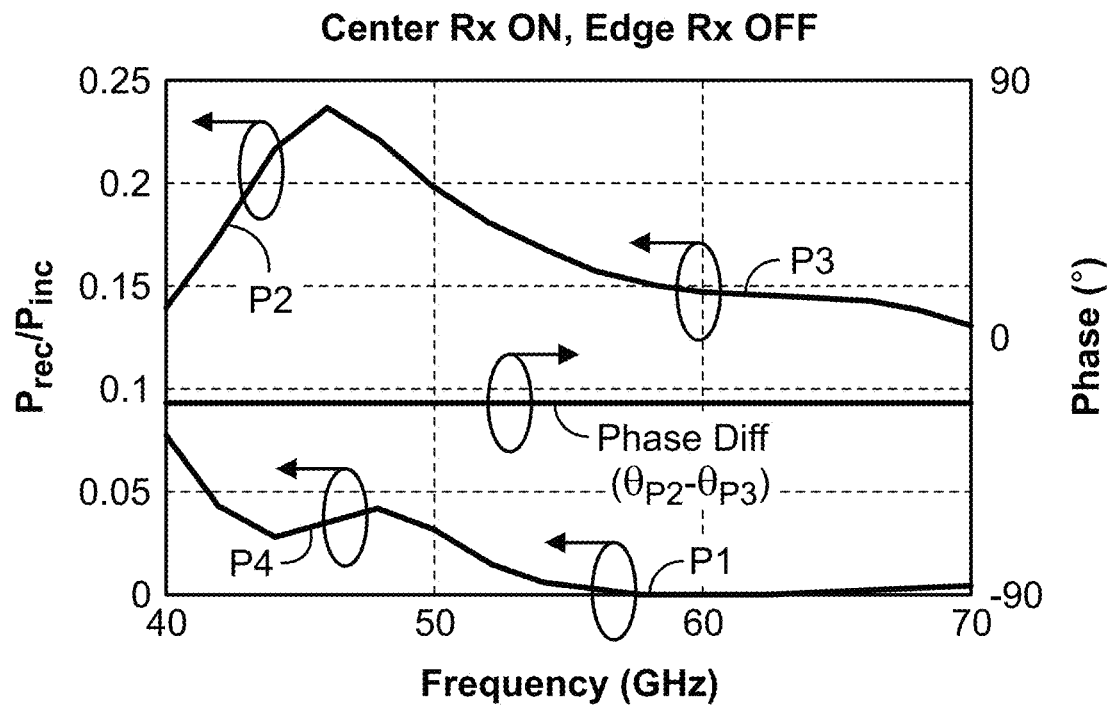
FIG. 17(a) depicts distribution of the incident signal at the various ports across frequency and incidence angles for the various port configurations according to an embodiment of the present invention.
Figure 17B:
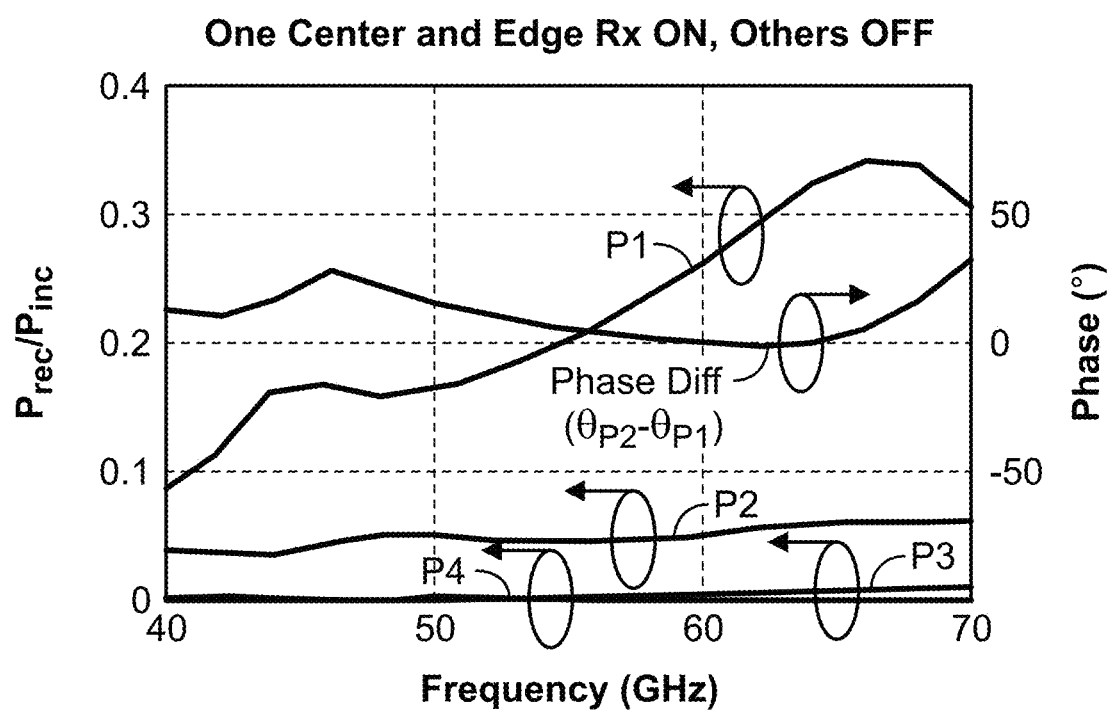
FIG. 17(b) depicts distribution of the incident signal at the various ports across frequency and incidence angles for the various port configurations according to an embodiment of the present invention.

The distribution of the incident signal into the various ports across incidence angle and Rx code settings is shown in FIGS. 17(a)-(b). It can be noted that even though the center and edge ports are separated by λ/6, the phase difference of the coupled signals into them stays within ±20° at ±45° incidence. This can be easily compensated either at RF or *IF*. This also illustrates that the mutual effect of the port coupling through the radiating surface cannot be simply described as a delay element between them like in a classical array. The integration of a T/R switch for TDD operation sharing one interface for the transceiver can be accommodated within the 4-port matching network. The capability of integrated T/R switch with slight noise penalty and large signal handling capability has been shown, though not implemented in the example embodiments.

The efficiencies of power transfer for various angles of incidence and across frequency in this multi-port system are shown in FIG. 14(b). Considering all board losses and mismatches, the simulated conversion gain of the 4-port Rx system ($P_{IF}/P_{inc}$) under broadside incidence varies between 24-27 dB cross 40-80 GHz.

Figure 18A:
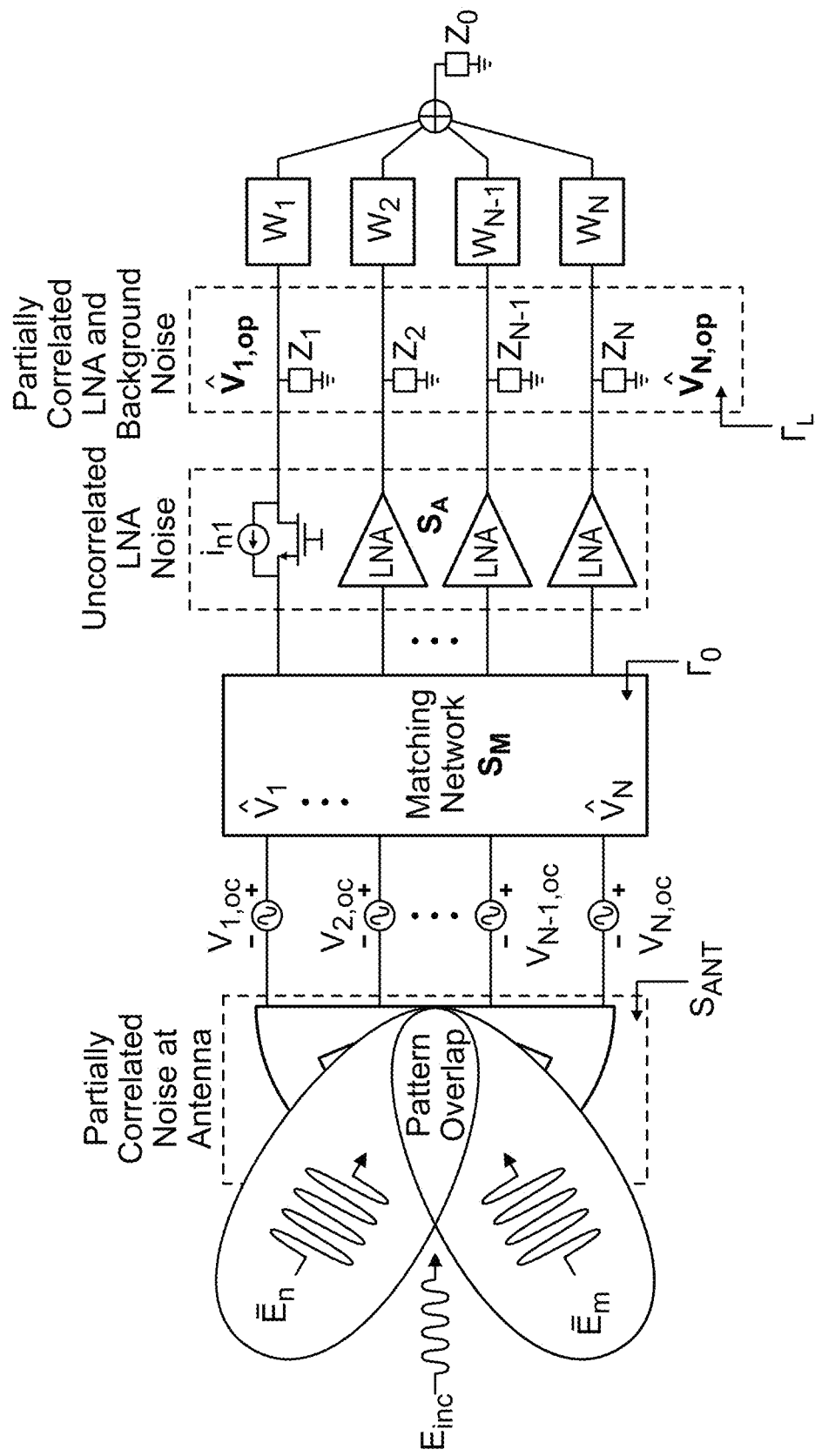
FIG. 18(a) depicts a noise model of the system showing noise correlations at the IF ports due to the coupled radiator and multi-port network according to an embodiment of the present invention.
Figure 18B:
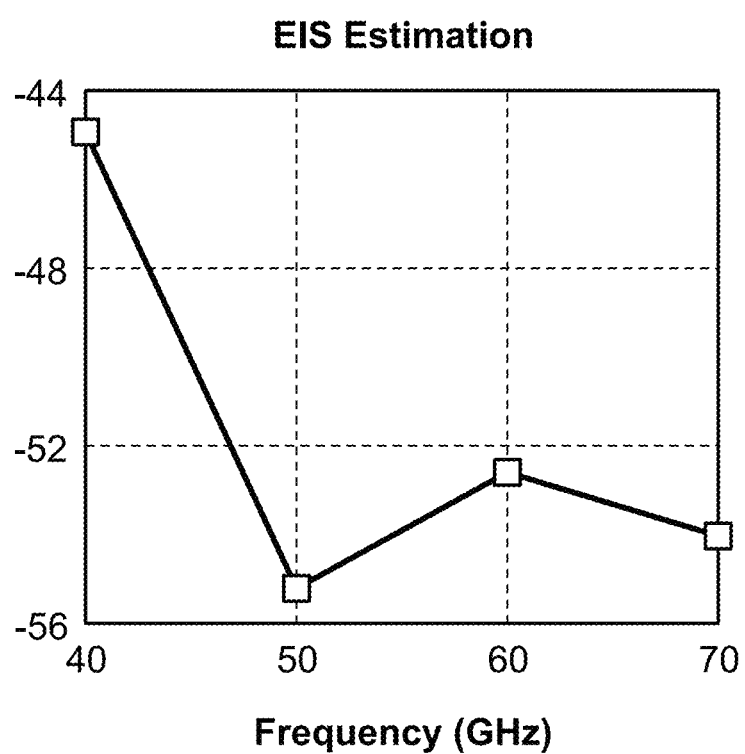
FIG. 18(b) depicts simulated effective-isotropic-sensitivity (EIS) according to an embodiment of the present invention.
Figure 19A:
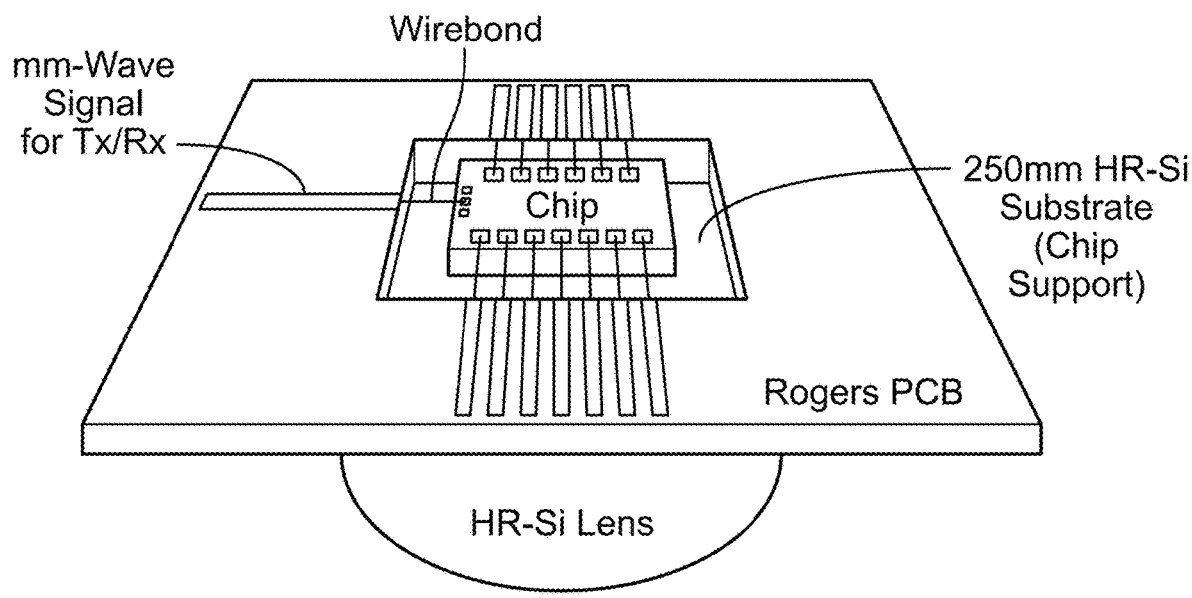
FIG. 19(a) depicts Tx/Rx IC on PCB with high resistivity silicon lens at the backside, showing the path for the LO/Tx signal delivery between 37-73 GHz according to an embodiment of the present invention.
Figure 19B:
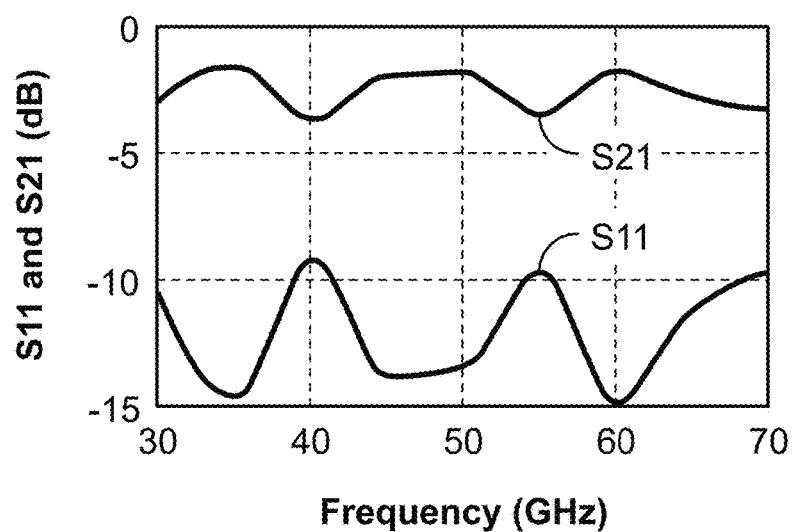
FIG. 19(b) depicts simulated performance of the wire-bond and t-line path for feeding the mm-Wave signal into both the Tx and Rx ICs according to an embodiment of the present invention.
Figure 19C:
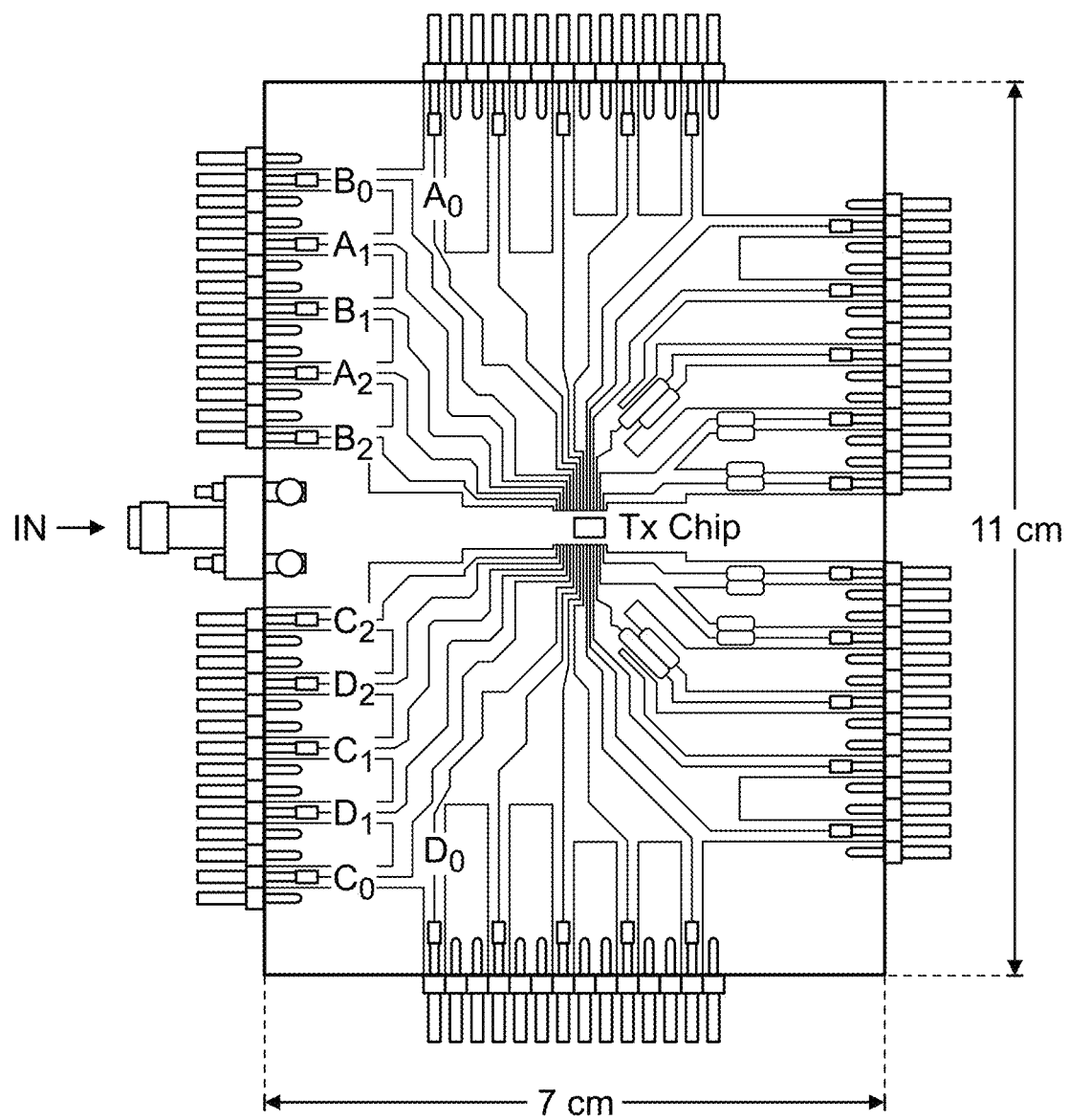
FIG. 19(c) depicts PCB of Tx IC with the integrated multi-port radiator according to an embodiment of the present invention.
Figure 19D:
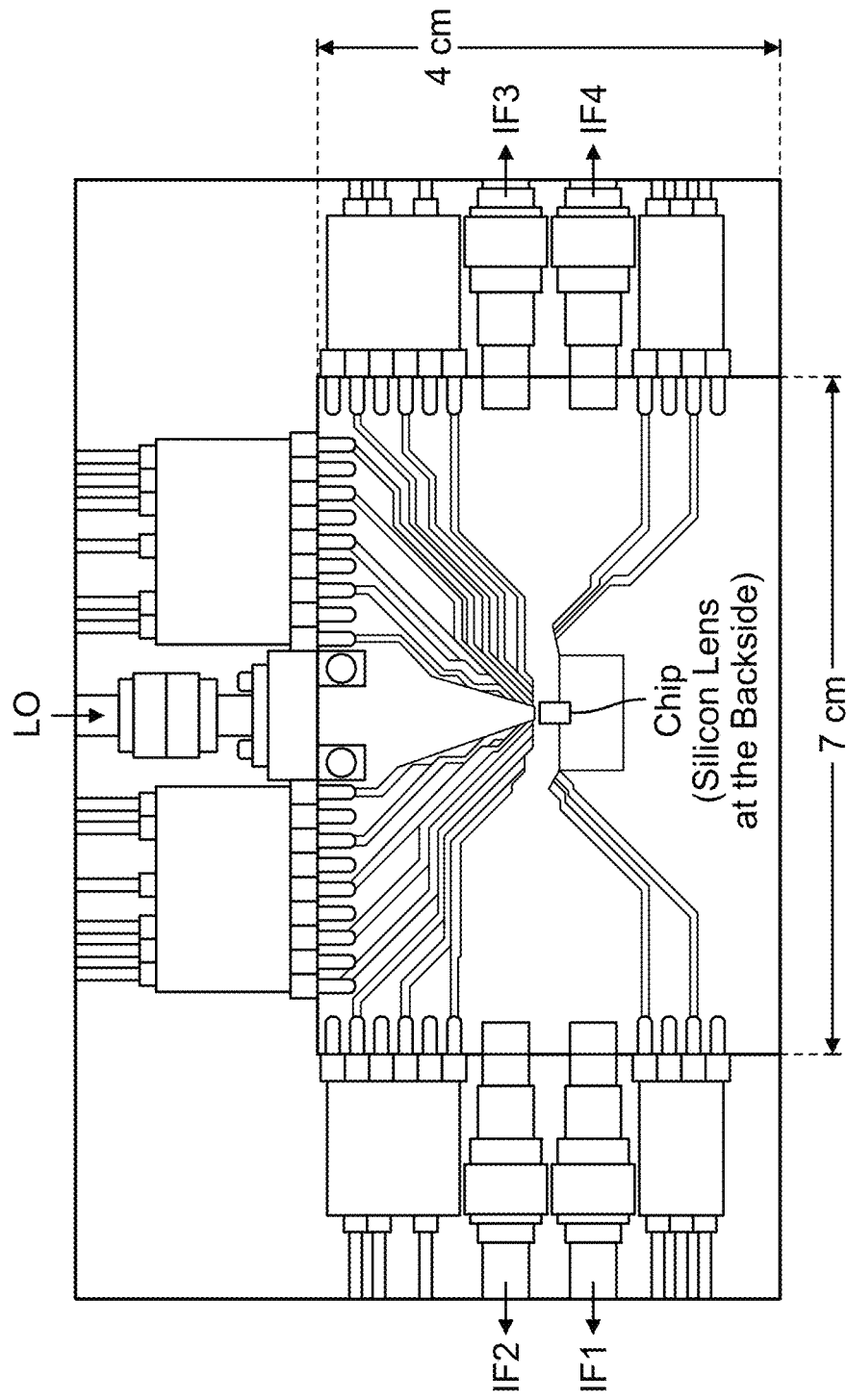
FIG. 19(d) depicts PCB of Rx IC with the integrated multi-port radiator according to an embodiment of the present invention.

3) Noise and Rx Sensitivity: Analysis of noise and receiver sensitivity for this coupled sub-wavelength antenna-Rx system has to take noise correlations at the four IF ports into account. This is due to the antenna and multi-port network which couples the background and the circuit noise across all the ports. The simulation result and the noise model are demonstrated in FIGS. 18(a)-(b). Since this is a radiative system, effective-isotropic-sensitivity (EIS) is used to define the sensitivity for the Rx. The EIS represents the power level captured by an ideal isotropic antenna under the flux density that will satisfy the sensitivity requirements of the current system. The simulated EIS for a 25 dB SNR and 1 GHz bandwidth is shown in FIGS. 18(a)-(b) and reaches a minimum around −56 dBm at 50 GHz.

Packaging, Measurement Setup, and Results

Packaging

Figure 20A:
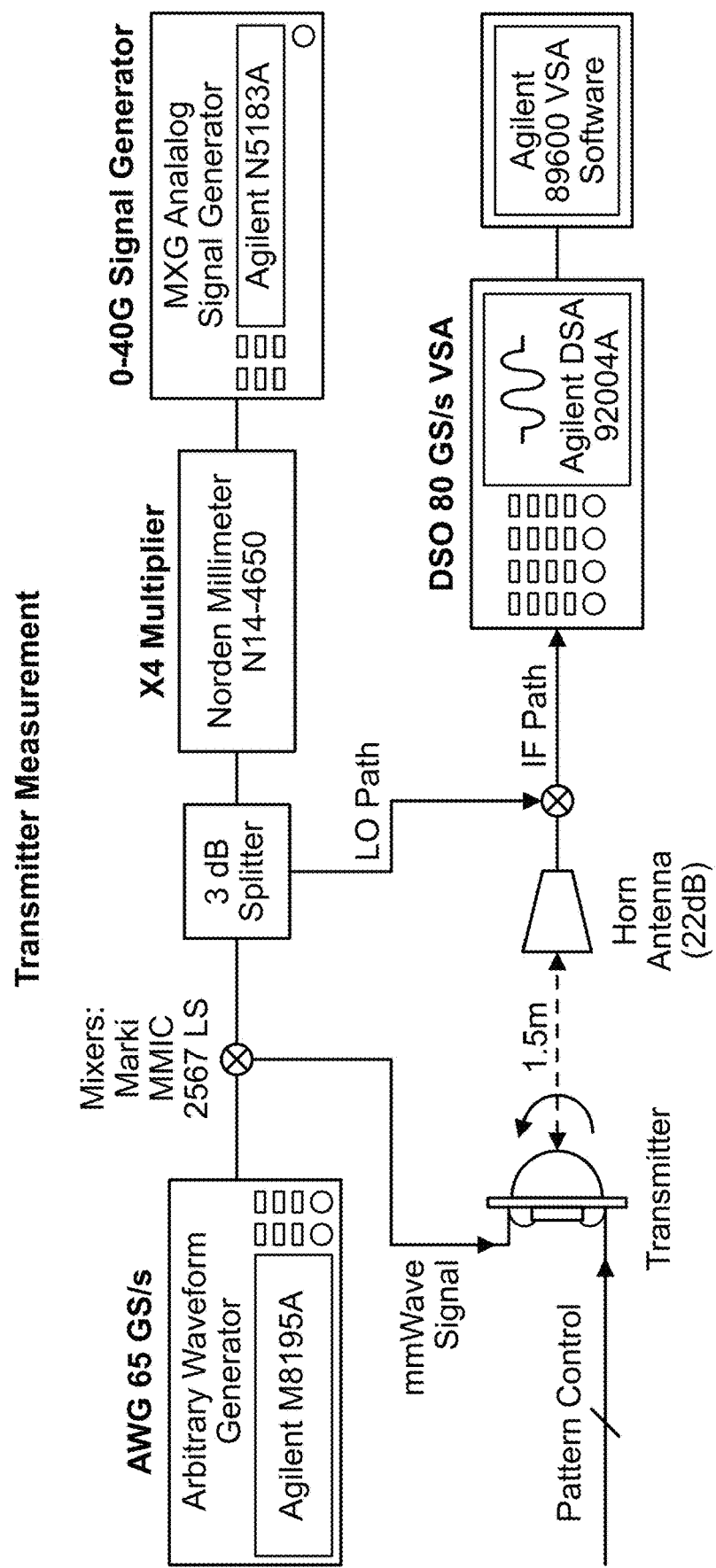
FIG. 20(a) depicts measurement setup for characterizing the far-field characteristics for a transmitter according to an embodiment of the present invention.
Figure 20B:
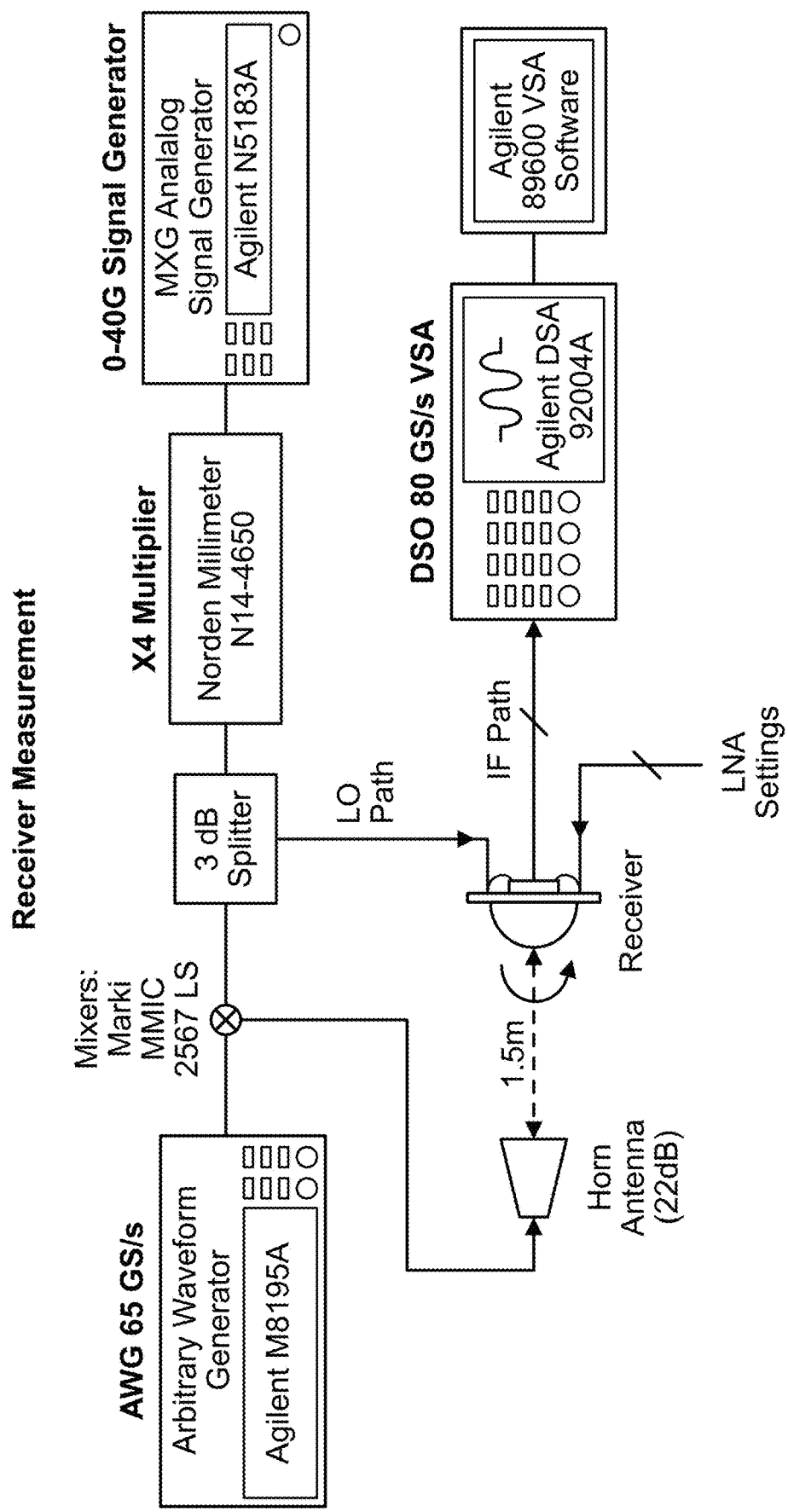
FIG. 20(b) depicts measurement setup for characterizing the far-field characteristics for a receiver according to an embodiment of the present invention.

The chips are fabricated in 65 nm bulk GP-CMOS process and occupy ≈2×3 mm$^2$ each (FIG. 11(e) and FIG. 14(a-2)). The substrate is lossy ($\sigma_{sub}$~13.5 Ω-cm) and not thinned (250 μm). The chips are packaged with silicon lens to radiate from the backside for proof-of-concept. All measurements are done with far-field radiated signals and the signals delivered by the chip are measured at the board level. Therefore, the measurements encompass all losses at the antenna, substrate, impedance mismatches and t-lines on the PCB, as shown in FIGS. 19(a)-(d). The measurement setup is shown in FIGS. 20(a)-(b). Packaging is described here as an example and not intended to be limiting.

Tx Performance

Figure 21A:
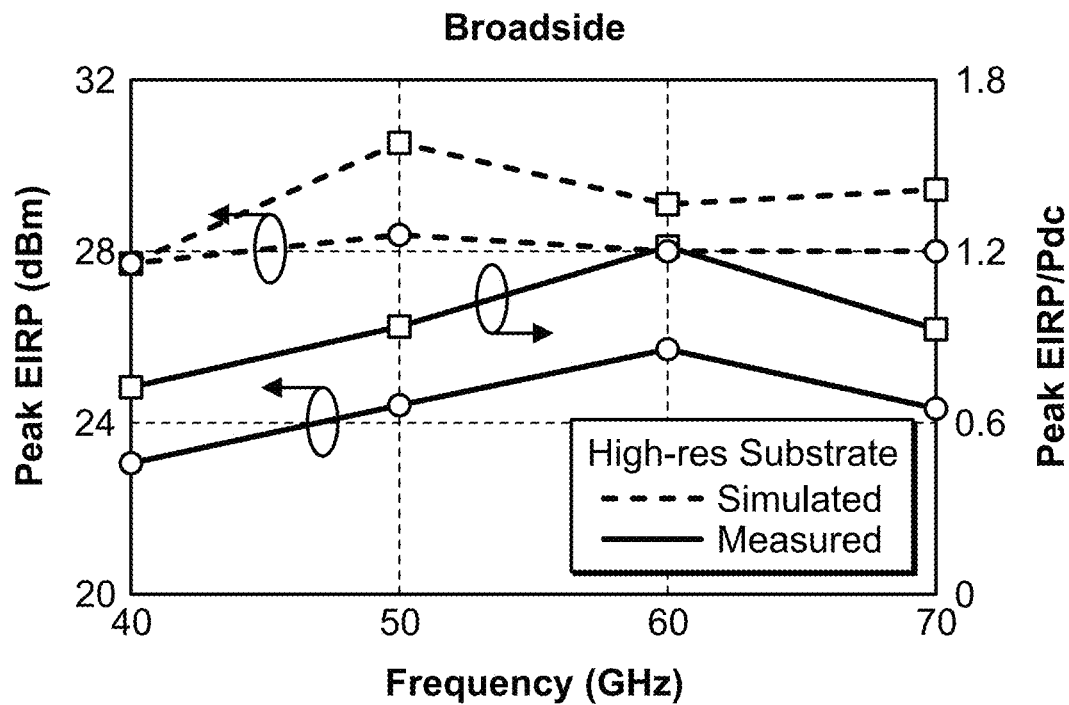
FIG. 21(a) depicts measured and simulated EIRP at broadside with frequency dependent codes according to an embodiment of the present invention.
Figure 21B:
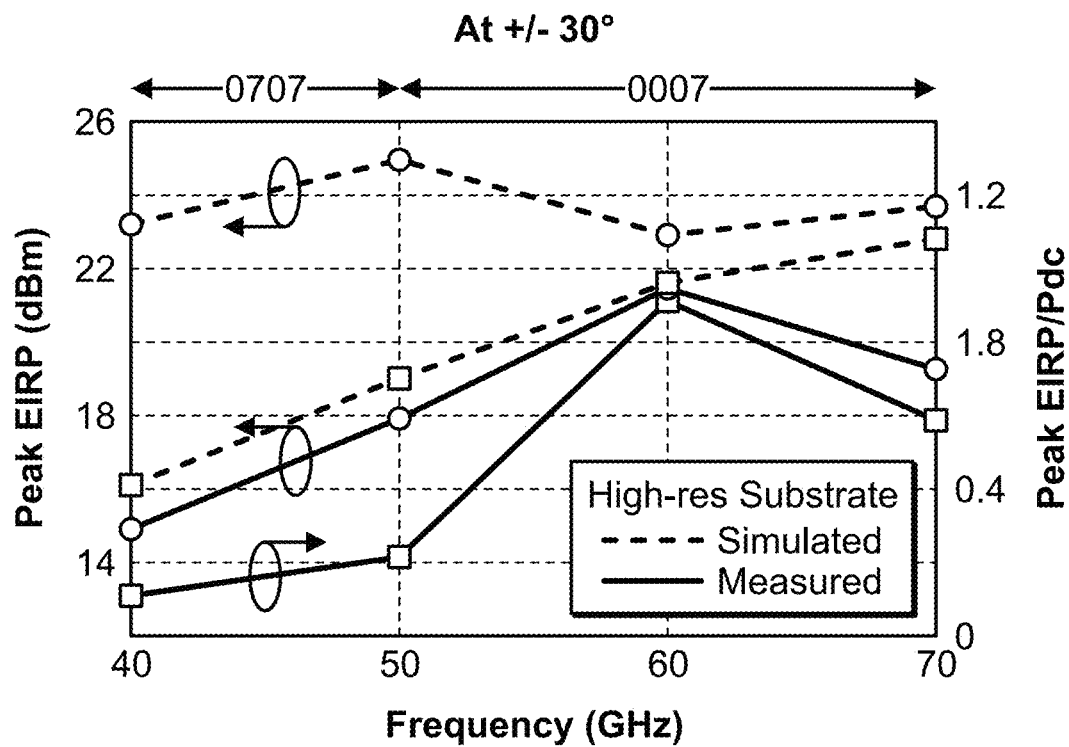
FIG. 21(b) depicts measured and simulated EIRP at an angle of ±30° with frequency dependent codes according to an embodiment of the present invention.

1) Large Signal Measurements: The Tx far-field and large signal measurements are captured with a calibrated custom receiver setup in FIGS. 20(a)-(b). As shown in FIG. 21(a), the Tx achieves a peak broadside EIRP up to 25.6 dBm at 60 GHz with a 3-dB bandwidth of 37-73 GHz. The measured EIRP for the other codes to shape the radiation patterns at off-broadside angles are also shown in FIGS. 21(a)-(b). Consistent with simulations, the highly lossy substrate creates angle-dependent losses that affect the EIRP of the off-broadside beams severely. These losses are expected to be negligible for high-resistivity substrates as shown in FIG. 21(b). In a silicon lens environment with around 9.5 dB peak directivity at the center frequency, simulations suggest that antenna gain enhancements ranging from 5-8 dB are achievable with pattern reconfiguration.

The measured Tx radiation profiles for various codes are illustrated in FIGS. 22(a-1)-(b). The code '0770' allows broadside pattern synthesis and efficient EIRP generation across 37-73 GHz. The Tx also has the ability to tilt the beam by ±30° with frequency-dependent codes as shown in FIGS. 22(a-1)-(b). While simulations suggested higher beam-angles of 45°, the measurements demonstrate the ability to shape the element pattern. As described previously, the excitation at edge ports of the multi-port radiator (code: '7007') suppresses broadside radiations and creates coherent dual beams for wide angles of departures suitable for NLOS channels.

Figure 22B:
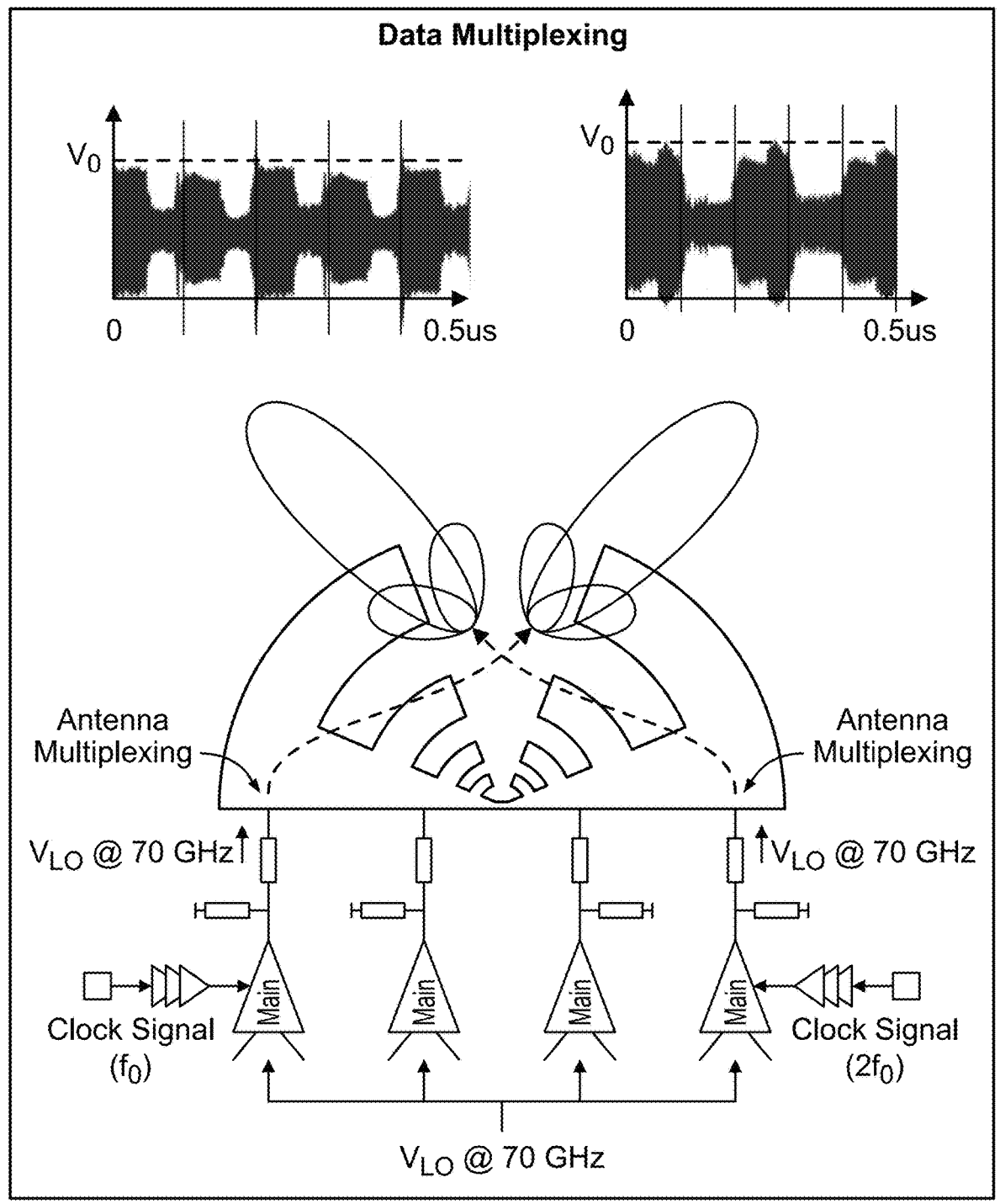
FIGS. 22(*a*-1)-(*a*-2) depict transmitter beam patterns and EM field synthesis across 40 GHz-70 GHz according to an embodiment of the present invention.

2) Data Multiplexing: As shown in FIGS. 22(a)-(b), the edge ports create two beams with minimal overlap allowing transmission of two independent data streams in a single radiator. In the implemented Tx architecture, the mm-Wave signal is shared across all the Tx ports. To demonstrate this ability to transmit independent information in two directions, a C.W. LO signal at 70 GHz is fed to all the ports and the edge DAC cells are modulated independently with two clock waveforms ($f_0$ and $2f_0$). As shown, the far-field received waveforms at ±30° from the broadside shows minimal overlap. This illustrates that the port beams at the edge ports in the Tx can transmit two independent information beams. While the speed of the OOK is limited by the PA code data path, the Tx can be re-designed to enable independent amplitude and phase modulation at the edge ports. However, this illustrates a method of turning a single port radiator into a multi-port reconfigurable radiating surface with finer control of element patterns.

Rx Performance

Figure 23A:
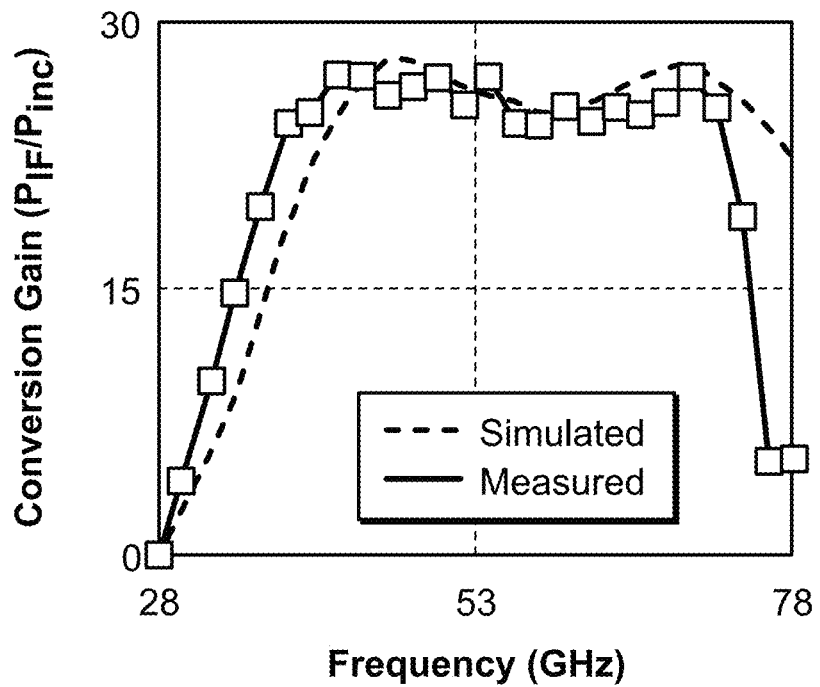
FIG. 23(*a*) depicts measured conversion gain ($P_{IF}/P_{inc}$) of the Rx IC with broadside radiation according to an embodiment of the present invention.
Figure 23B:
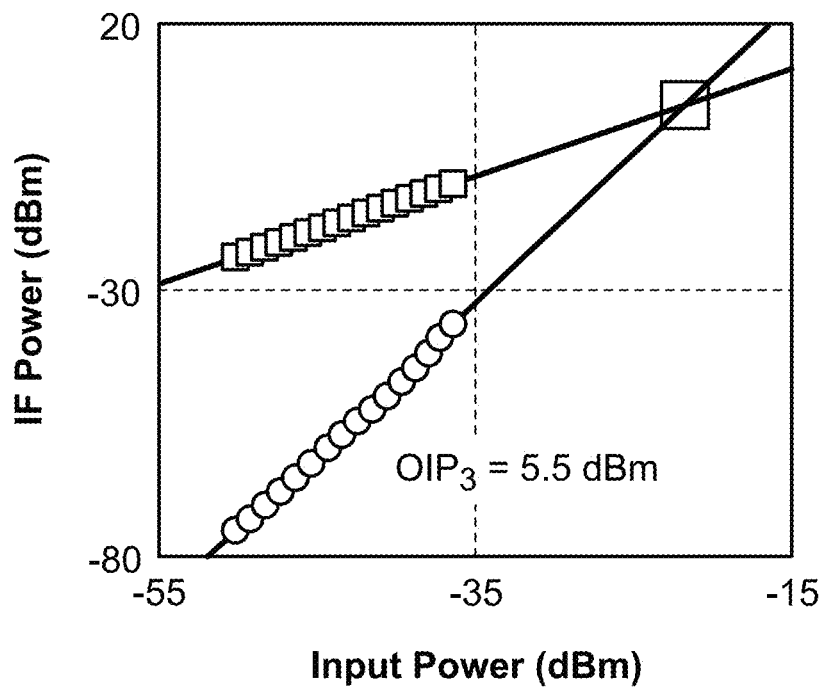
Figure 24:
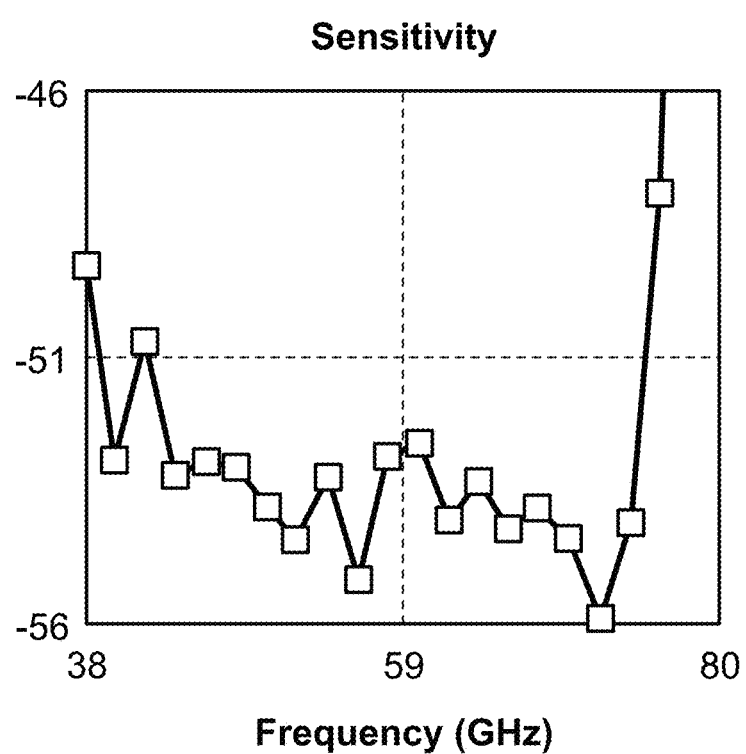
FIG. 24 depicts measured effective-isotropic-sensitivity (EIS) of the Rx IC under broadside incidence according to an embodiment of the present invention.

1) Gain, Sensitivity and OIP3: The gain of the Rx stage calibrated with far-field broadside incident power on the chip to the IF signal at the board is shown in FIGS. 23(a)-(b). When operated with broadside incidence and the center two ports are tapped (code: 0770), the Rx demonstrates a gain ($P_{IF}/P_{Inc}$) of 26 dB with a 3-dB bandwidth extending between 37-73 GHz. The OIP3 for this configuration is measured to be 5.5 dBm at 49 GHz with 100 MHz offset signals, as shown in FIG. 23(b). The IF bandwidth of 4 GHz can sustain a data rate of 12 Gb/s with 64-QAM. The minimum effective-isotropic-sensitivity (EIS) for this configuration is measured to be −56 dBm at 72 GHz for a SNR of 25 dB with 1 GHz bandwidth (FIG. 24).

Figure 25A:
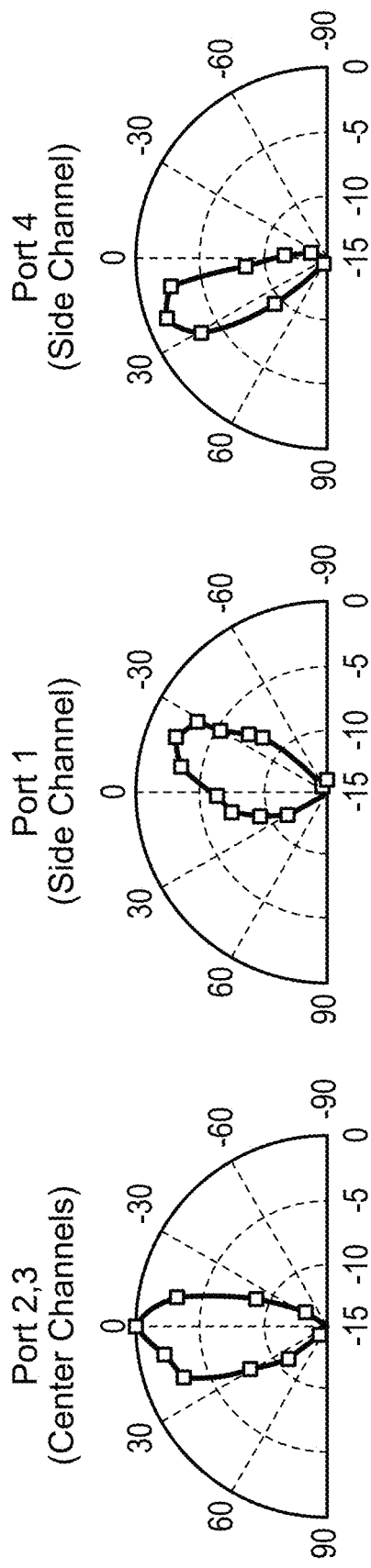
FIG. 25(*a*) depicts measured individual port patterns in the Rx illustrating that each port can pre-filter the incident signal spatially before beamforming according to an embodiment of the present invention.
Figure 25B:
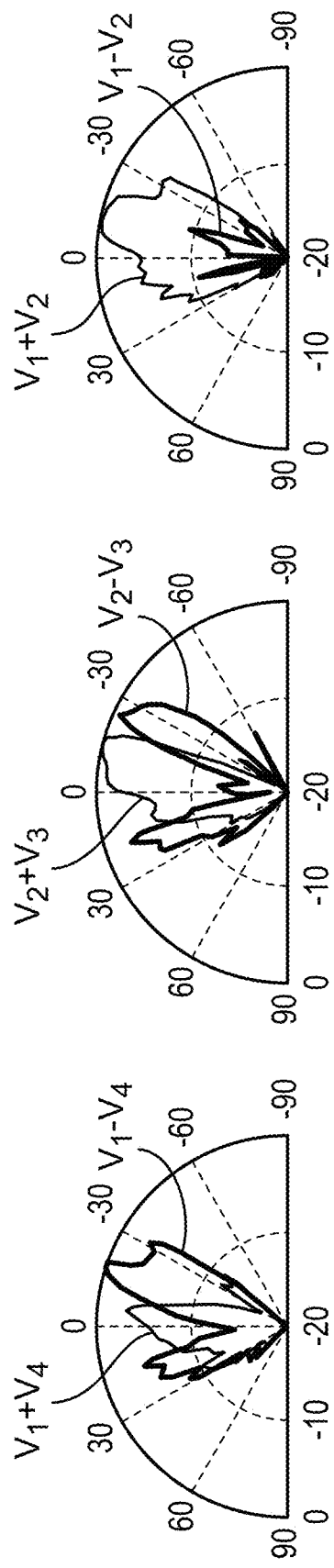

The receiver individual port patterns at 64 GHz are shown in FIG. 25(a)-(c). As can be seen, the edge ports show beam directions at +25° with nearly 15 dB suppression at the angle of maxima of the other port. This creates the orthogonality condition between the edge ports for simultaneous data processing of two spatial signals. These can be considered as fundamental patterns which can be utilized as basis vectors to create element patterns after the port combinations. A subset of these element patterns at 64 GHz as shown in FIGS. 25 (a)-(b) shows the receiver's ability to specifically detect or create maxima and notches at multiple angles, that can be enhanced if combined in an array. Far-field link measurements at 38, 50 and 72.4 GHz with 64-QAM at 12 Gb/s are shown in FIG. 25(c). The spectrum of the measured signals is also shown.

Figure 26A:
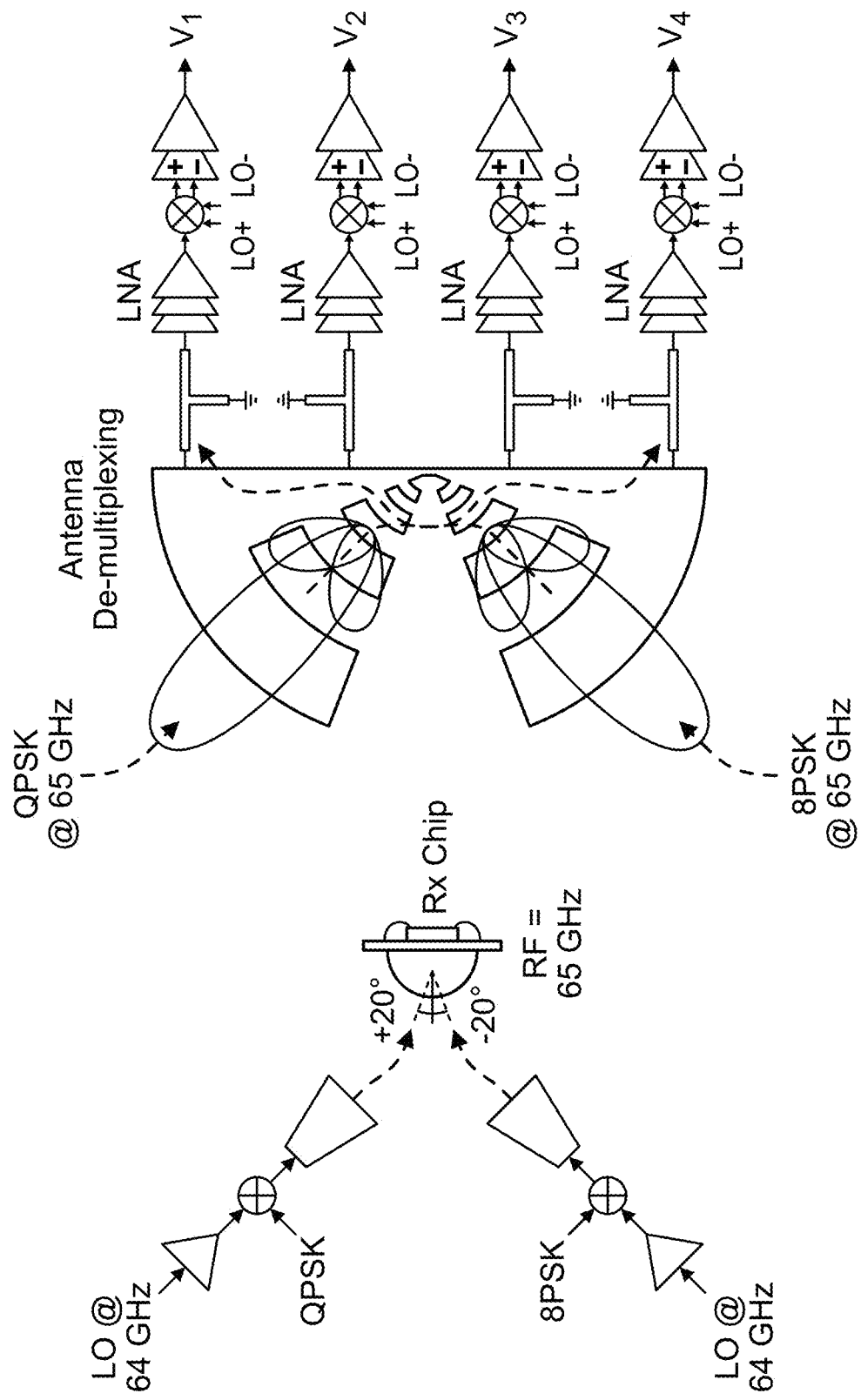
FIG. 26(*a*) depicts spatial multiplexing measurement setup according to an embodiment of the present invention.
Figure 26B:
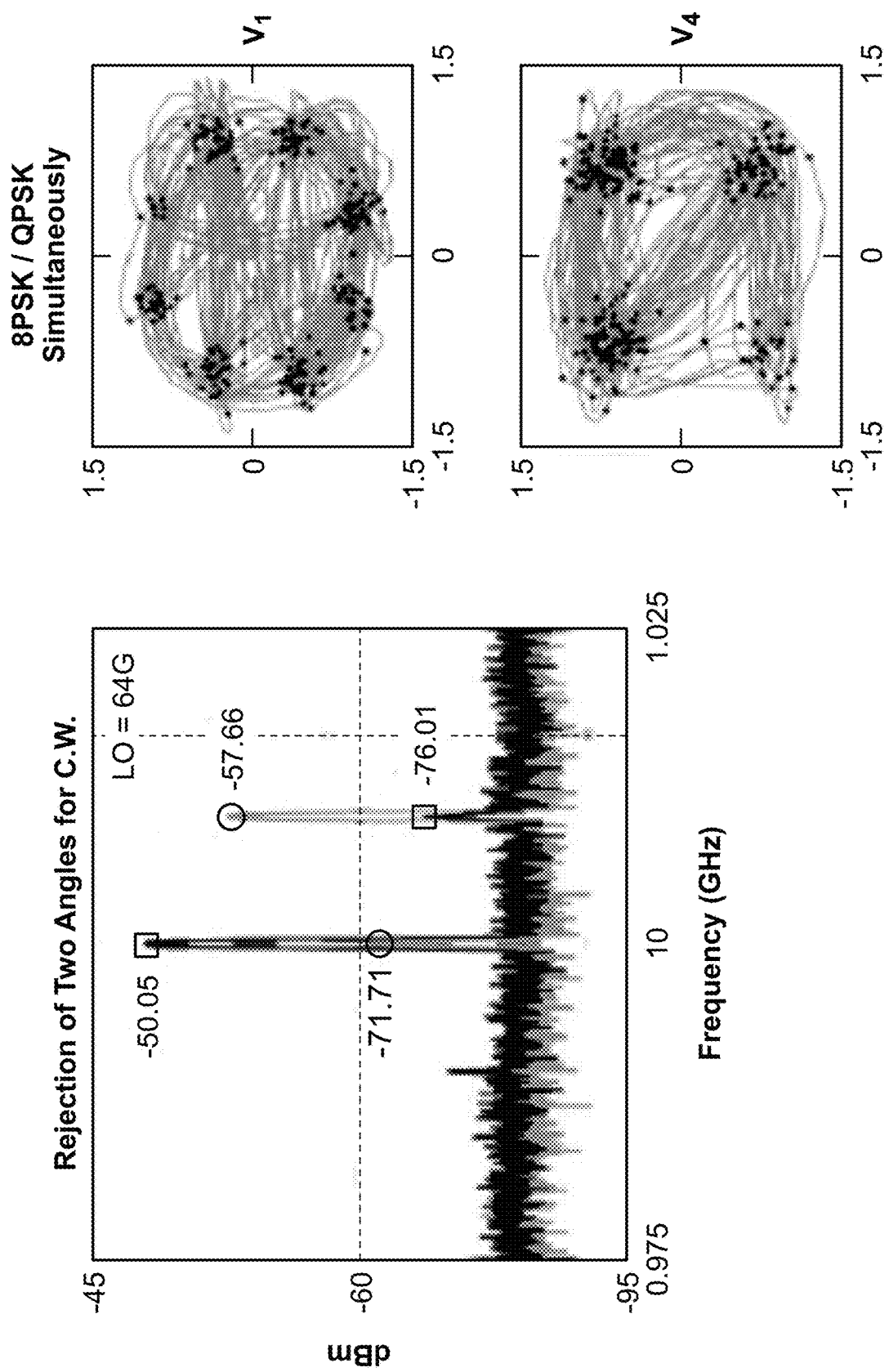

2) Antenna-level Multiplexing and Interference Suppression: The ability of the ports to 'listen' to different angular sectors allows spatial multiplexing exploiting the minimal overlap of the edge port patterns. In this experiment, two independently modulated signals (PSK and 8-PSK) at the same frequency at 65 GHz are incident at +25° on the receiver as shown in FIGS. 26(a)-(b). The incident signals get spatially de-multiplexed at the receiver and channelize to the edge ports with minimal overlap. The measured suppression at the antenna edge ports for the corresponding angles of incidence ranges between 14-26 dB. The mismatch in the suppression of both the ports is due to the slight misalignment between the lens and the chip. This ability to filter an interferer at the antenna level reduces the linearity requirement of the succeeding receiver chains and can be seen by EVM measurement against an increasing interference power.

Figure 26C:
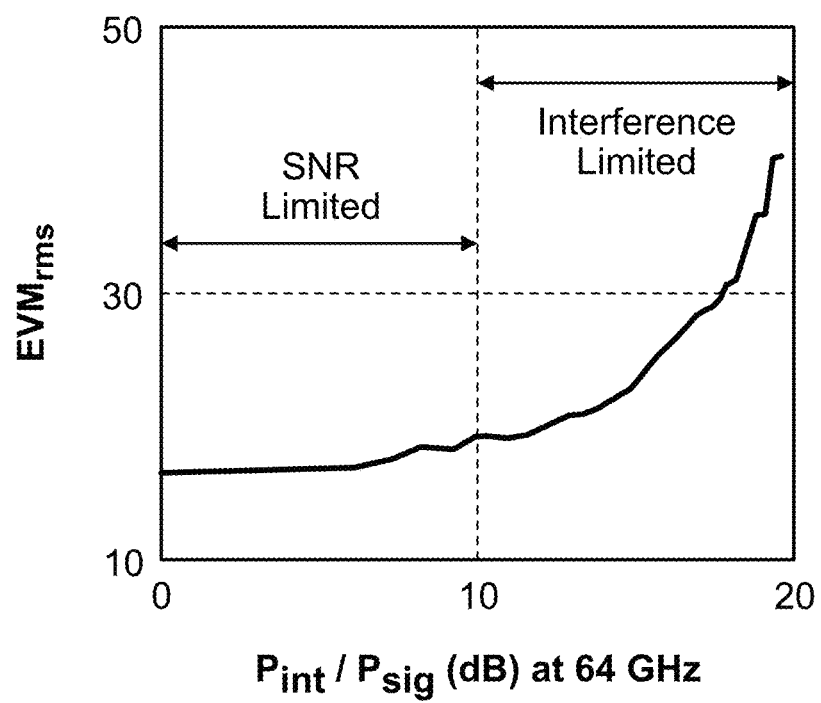

As shown FIG. 26(c), the EVM is dominated by SNR till the interference power ($P_{int}$) exceeds the signal power ($P_{sig}$) by 10 dB after which the effect of interferer starts to show up. FIG. 26(c) also shows the raw unequalized data recovered at the edge receiver IF outputs due to the simultaneous incidence of the modulated signals at the Rx showing the de-multiplexing at the antenna. This ability to these distinct port patterns in a single antenna to allow simultaneous spatial data processing, de-multiplexing, and suppression of an interferer or a signal with large delay spread, makes this architecture distinct from the traditional arrays with fixed patterns.

Figure 27A:
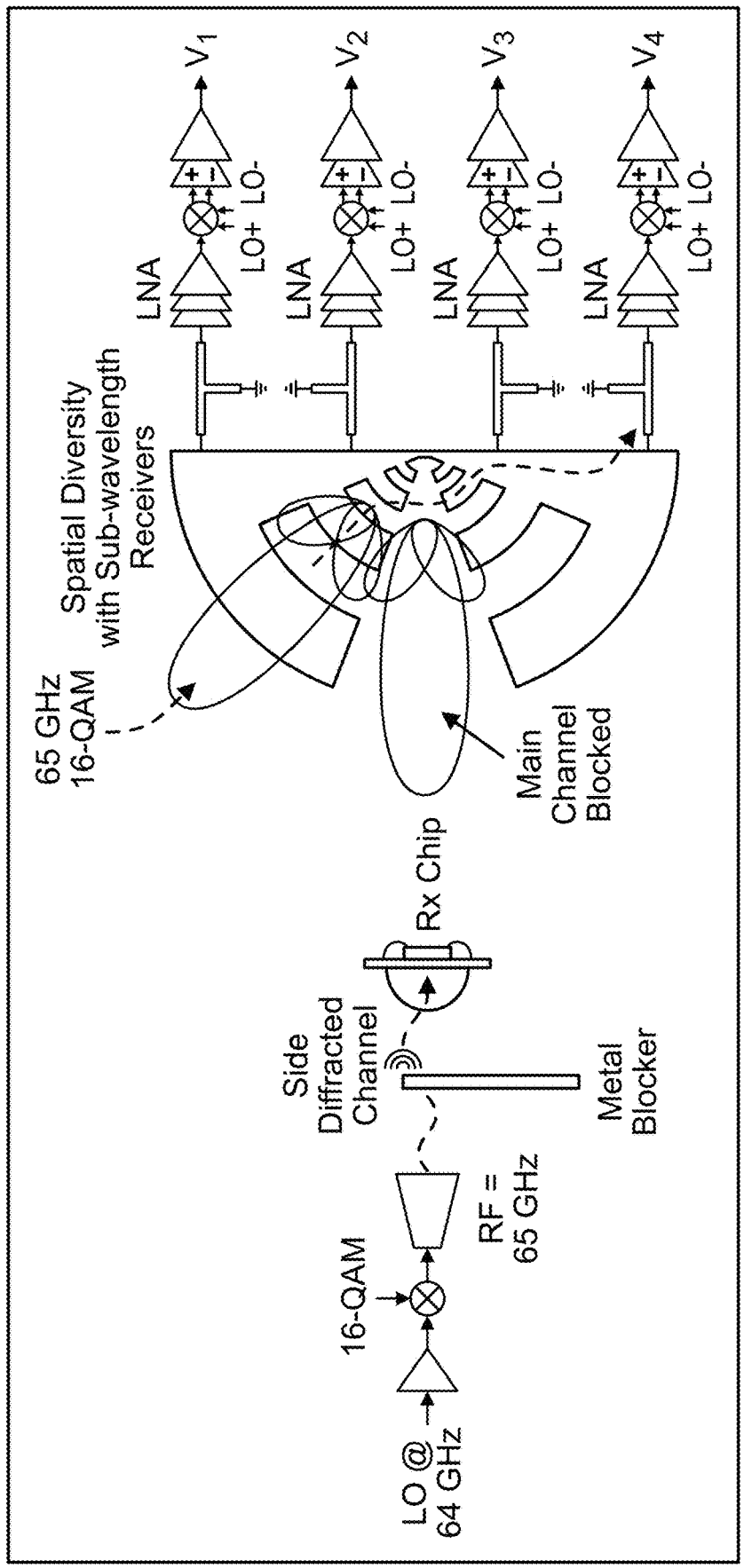
FIGS. 27(*a*)-(*b*) depict spatial diversity where the line-of-sight path is blocked by a metal plate which blocks the center ports of the Rx IC from reception so an edge port picks up the diffracted signals after reflection and establishes a link according to an embodiment of the present invention.
Figure 27B:
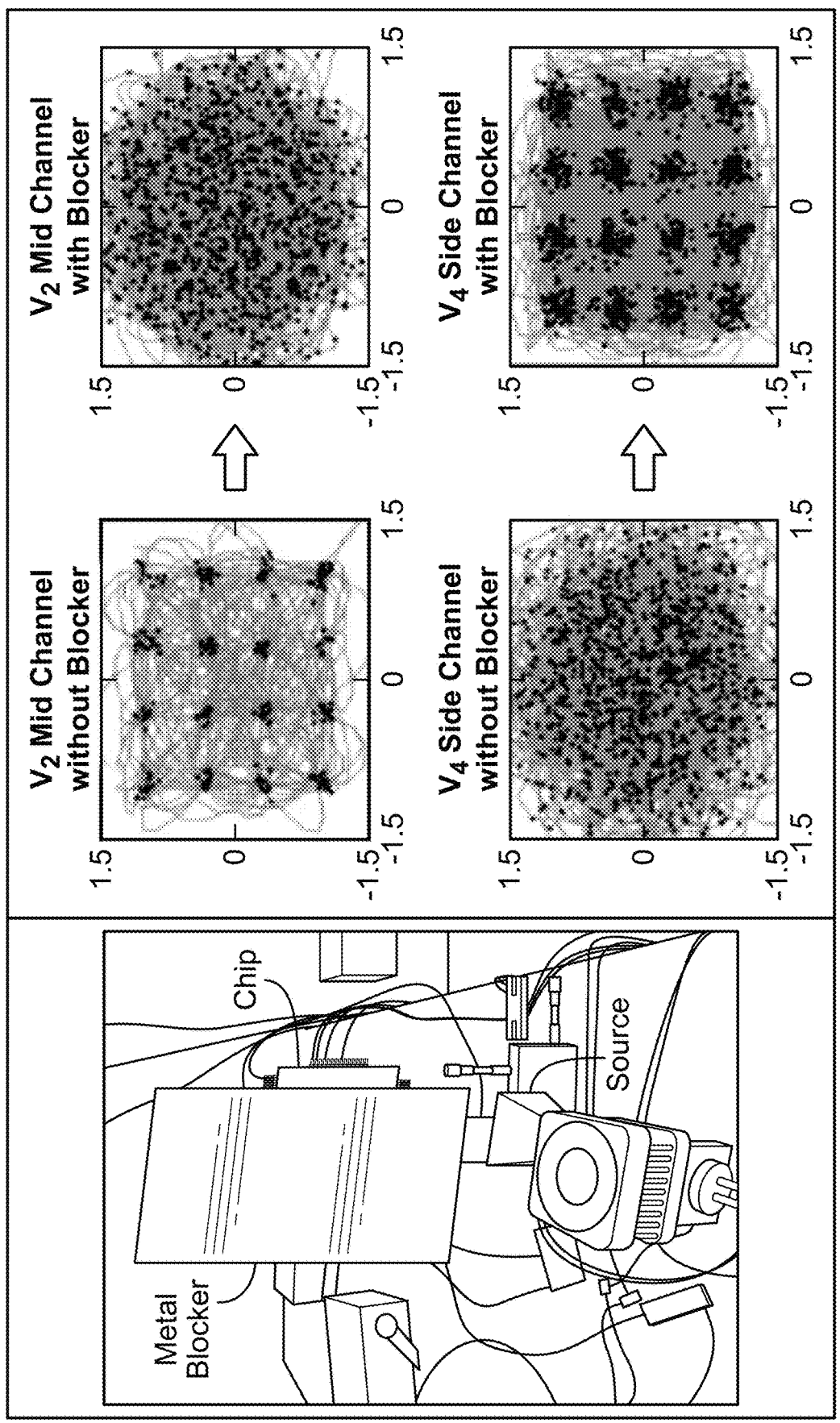

3) Spatial Diversity: The sub-wavelength ports with their distinct reception angles enable the Rx chip to receive statistically distinguishable channels particularly for wide angles of arrivals. This is particularly useful where one port can establish a link when the other port is affected in presence of blockage. While an exact demonstration of this will require statistical measurements under various scattering conditions, FIG. 27(a) illustrates an example where a LOS channel is blocked by a metal plate. In the absence of the blocker, as expected, the center 2-ports establish a wireless link which gets cutoff in the presence of blocker. However, the knife-edge of the plate can create a secondary Huygens' source which after reflection results in another path which is picked by the edge port. FIG. 27(b) shows link measurement of one center and one side channels before and after introducing the blockage.

Figure 28:
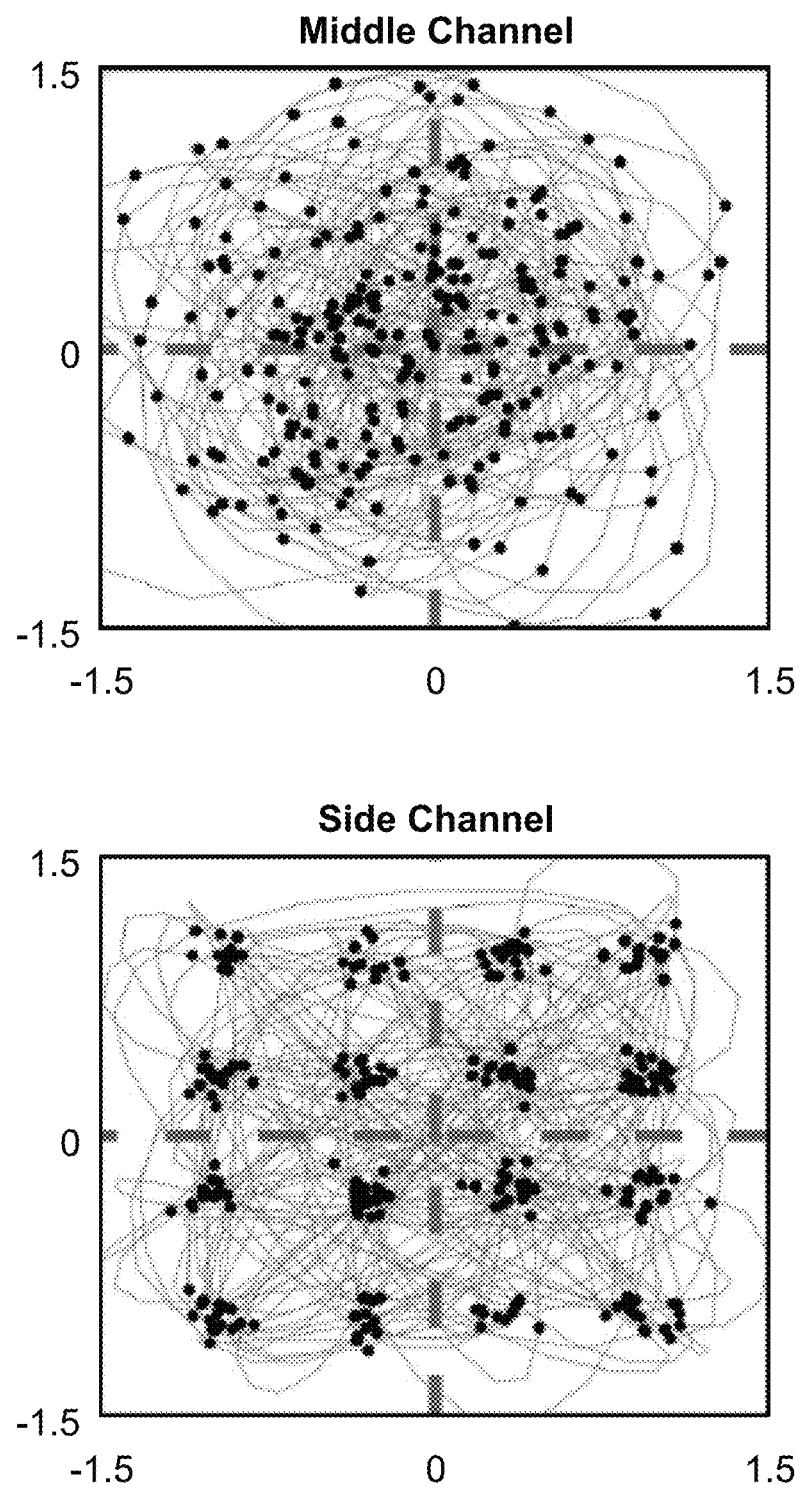
FIG. 28 depicts polarization diversity according to an embodiment of the present invention.

4) Polarization Diversity: The edge ports also enable transmission and reception of the cross-polarization due to the curvature of the radiating surface. This is demonstrated with a linearly polarized broadside mm-Wave source whose antenna is rotated to launch the cross-polarization component. As expected, the center 2-port channel link drops, but the edge port can still establish the wireless link due to its ability to process the cross-polarization component as shown in FIG. 28. This allows the chip to have partial polarization diversity which can be enhanced with an optimized radiating surface and port design.

In summary, the multi-port sub-wavelength radiator-Tx/Rx systems allows broadband performance and programmable synthesis of element patterns and EM field response with distinct properties. This can serve as a scalable element for MIMO arrays with frequency, pattern, spatial, and polarization diversities. The comparison with the state-of-art mm-Wave transceivers and arrays are shown in FIG. 30.

Multi-Port Dual Polarized Antenna Coupled Mm-Wave CMOS Receiver with Element-Level Pattern and Notch Programmability and Passive Interferer Rejection Capability Future mm-Wave wireless devices for cellular communication, sensing, and other applications will need to handle complex mm-Wave electromagnetic environments, particularly at the user equipment, as the antenna patterns can be highly sensitive to near-field boundary conditions (~15-25 dB) including packaging, the presence of hands, and other blockages. When the element patterns are affected, beam-forming techniques based upon identical element pattern conditions can become sub-optimal. Additionally, in low-power applications with short-range mm-Wave wireless links, the power budget may not accommodate a phased array with multiple elements.

Figure 31:
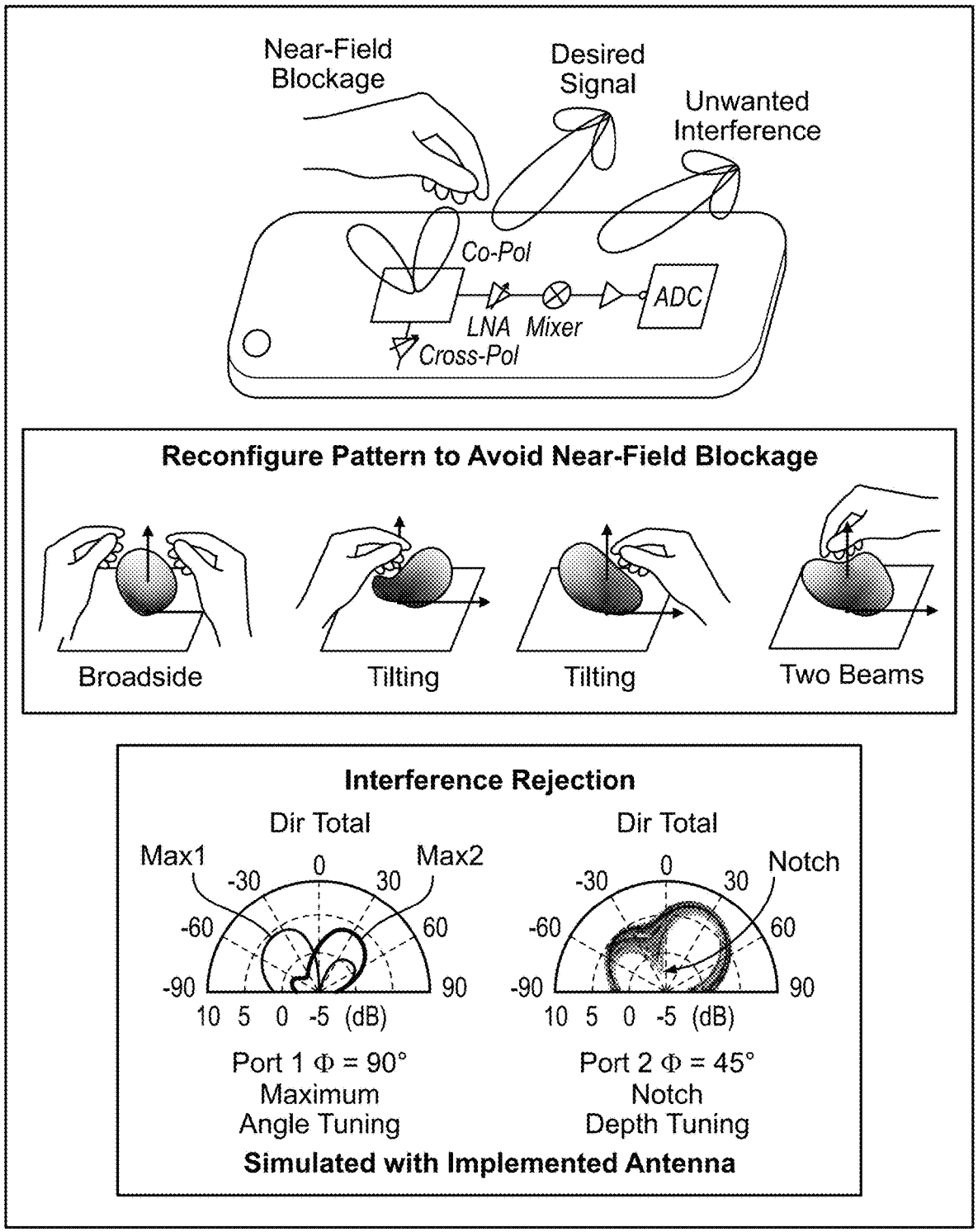
FIG. 31 depicts a multi-port reconfigurable antenna-receiver system with beam reconfiguration capability to overcome near-field perturbations and allow passive rejections of the interferers at the antenna surface according to an embodiment of the present invention.

Element-level pattern synthesis that can dynamically reconfigure to optimal patterns in the presence of near-field interferers can be very powerful. This enables each element to shape its pattern in ways including rotating the main beam, creating dual beams when the broadside path is blocked, and creating a whole array of patterns that are non-typical in a clean near-field electromagnetic environment (as illustrated in the bottom left of FIG. 31). In addition, element-level notch control can allow rejection of interferers directly at the antenna before beamforming relaxing linearity requirements of the succeeding receivers (as illustrated by the bottom right of FIG. 31).

Presented in this section is a multi-port antenna and receiver co-design approach that allows direct control of the antenna surface currents to dynamically program the radiation patterns. Such reconfigurability is demonstrated with a 70 GHz dual-polarized 6-port-antenna-receiver architecture in a 65-nm CMOS process with element maxima and notch tuning capability of more than 90° with minimized effects of impedance mismatches and power losses. It is demonstrated for the first time direct rejection of interferes at the antenna surface through element-level notch control that has the tracking capability within an incidence angle range.

Multi-Port Reconfigurable Antenna-Receiver Design

Reconfigurable antenna in the UHF band have been investigated, including pixelated antennas with switchable metal patterns. In this work, an integrated radiating interface with both radiation patterns reconfigurability and receiver port selectivity facilitates optimal boundary condition modification, while simultaneously minimizing power losses and impedance mismatches.

Figure 32A:
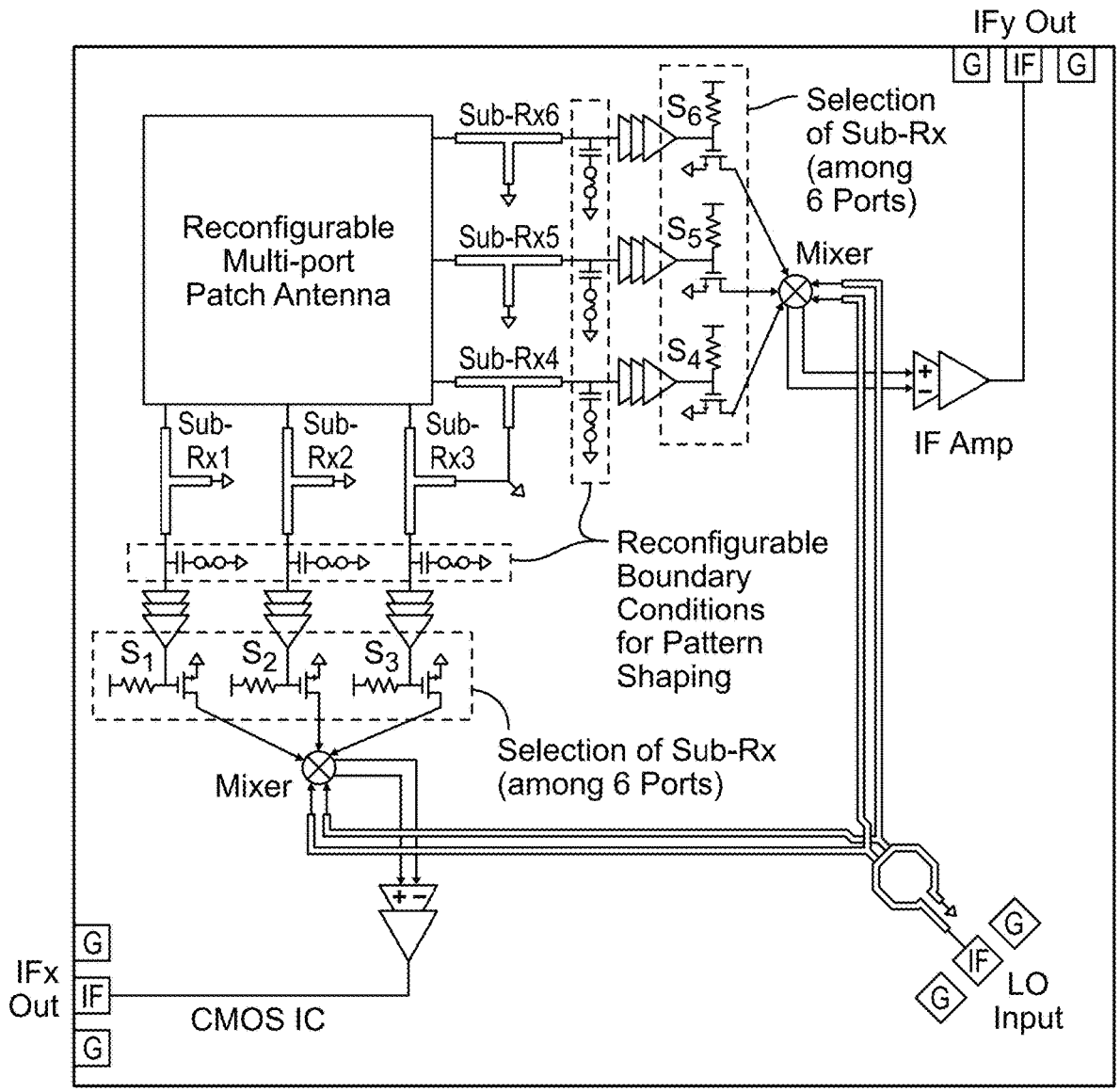
FIG. 32(*a*) depicts a multi-port antenna and multi-port receiver architecture for reconfigurable patterns, maxima, and notch control according to an embodiment of the present invention.

The architecture is shown in FIG. 32(a). To allow dual-polarized reception, a 6-port patch interface connects to a 6-port Rx architecture with a 6-port matching network. Each of the Rx ports are activated one at a time. While by tuning the switch capacitors ON/OFF at the end of the matching network, pattern reconfiguration is achievable. The design is optimized to minimize power losses and impedance mismatch through such reconfiguration while allowing a substantial change in the antenna patterns. Each Rx path includes a matching network with a 1-bit switchable MOM capacitor and a 3-stage LNA. The three Rx paths on each side of the antenna interface share a single Gilbert-cell mixer and $IF$ broadband amplifier with an 8-GHz bandwidth.

Figure 32C:
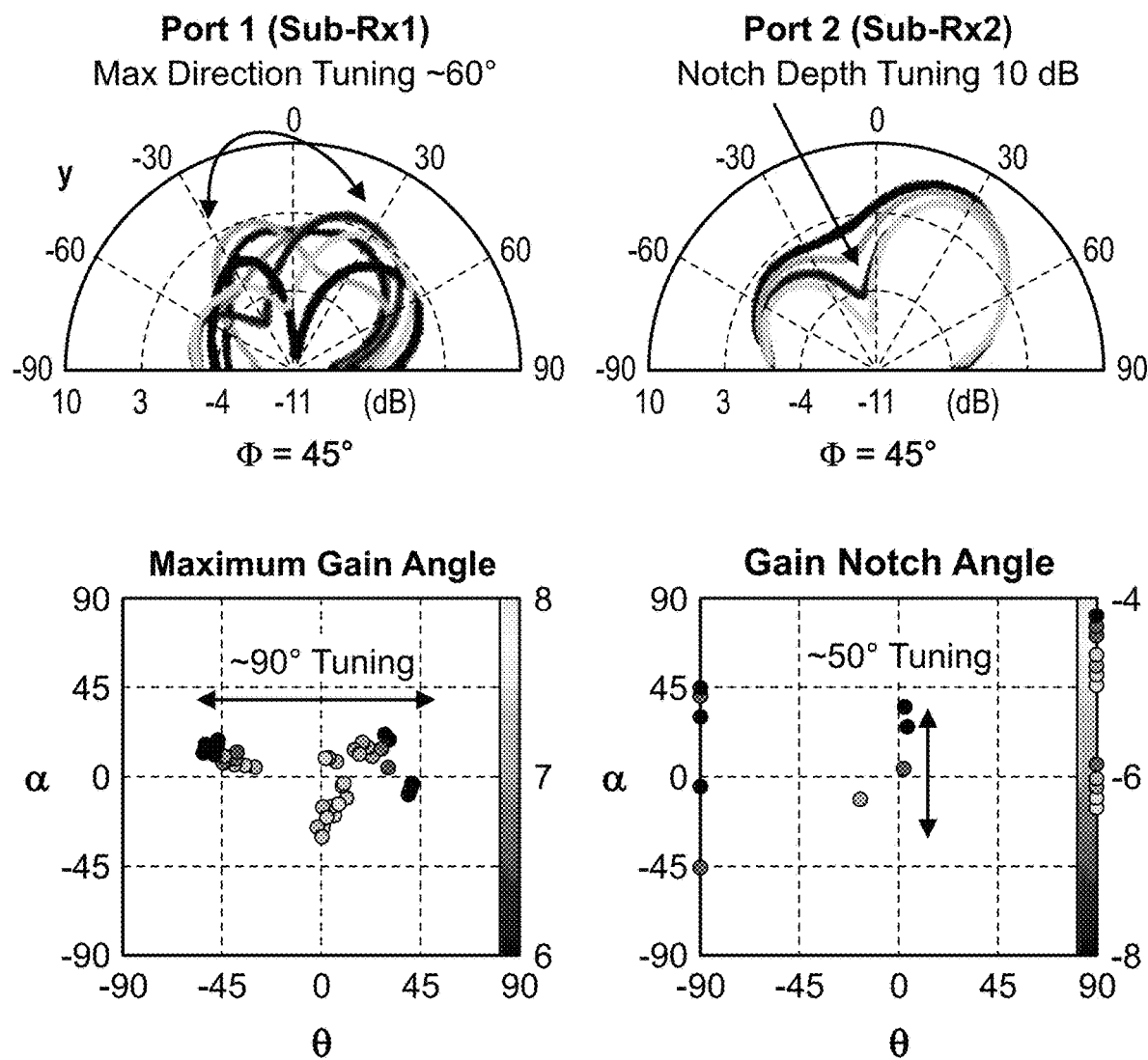
Figure 33A:
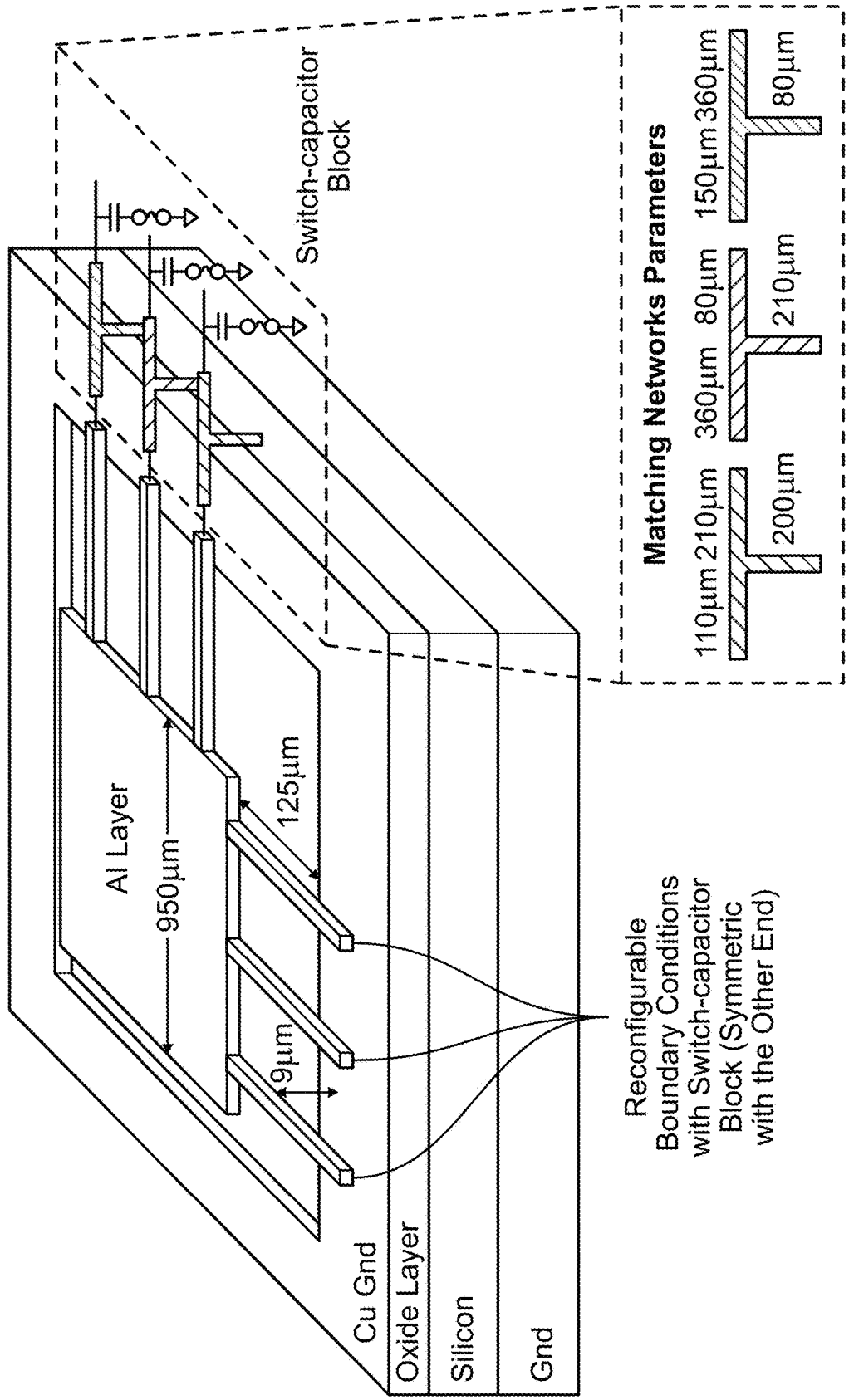
FIG. 33(*a*) depicts a dual polarized 6-port coupled antenna stack and the 6-port matching networks with a 1-bit switch capacitor for distributed reconfiguration according to an embodiment of the present invention.

The antenna stack with matching network is shown in FIG. 33(a). The antenna is implemented on-chip with a ground ring implemented in the lowest metal layer that is 125 μm spaced from the top patch to mitigate substrate modes. Reconfiguring the boundary conditions creates the ability to control sustained modes across both polarizations and thus their radiating properties. FIG. 32(c) shows the simulated reconfigurable patterns showing beam shaping, element maxima steering, and notch control. A subset of patterns for a single receiver (Sub-Rx1 connected to port 1) is shown in FIG. 32(b) when the boundary conditions at the other ports are varied. It can generate a two-beam pattern or single beam patterns pointing to −30° or +40° in the H plane. Port reconfigurations can also allow active control of the notch depth by nearly 10 dB. FIG. 32(c) shows the scatter plot of the programmable gain and notch angles showing more than 90° of maxima tuning and 50° of notch control. The interface between the antenna and the receiver is co-designed allowing us to achieve reconfigurability and the effectiveness of the matching network as well as minimizing the impedance mismatches caused by the impedance variations looking into the antenna ports over various settings (as shown by FIG. 33(b)). The matching network losses vary between 0.6-1.2 dB across all switch settings.

Receiver Architecture and Circuits

The constituent circuit block of the receiver is shown in FIG. 33(c-1). A three-stage LNA is implemented for each path. A single-balanced mixer is shared by three LNA paths. The down-converted signal is converted to single-ended and then amplified. The LO signal (65-72 GHz) is fed externally through a wirebond. The LO signal is converted from single ended to a differential signal with on-chip balun and distributed with matched on-chip transmission line across the dual polarization ports. The wirebond to which transmission on the PCB is matched ensures optimal LO signal transition from the PCB to the chip.

As shown in FIG. 32(a), a multiport patch antenna is connected with a three distinct feeding matching network in each polarization. A 1-bit switching capacitor is implemented after the matching network using 156f F MOM capacitor and 8 µm width switch transistor. A multi-dimensional optimization procedure over transistor sizes, capacitors, and matching networks is performed to achieve the desirable control of beam patterns while simultaneously minimizing impedance mismatches, power losses and power flow into the undesirable ports (as shown by FIG. 33(b)).

The LNA includes a common-gate input stage with tuned inductor load and two common source stages with inductor-based inter-stage matching networks. Common-gate LNA is implemented for its moderately large impedance variations over its ON ($Z_{on}$=52−8j Ω) and OFF states ($Z_{off}$=52 −103j Ω). As shown in FIG. 33(c-2), LNA has a simulated gain of 16.5 dB at 70 GHz and a Noise figure of 4.65 dB. The power dissipation of one chain of the entire receiver is 134 mW.

Measurement Setup and Results

Figure 34A:
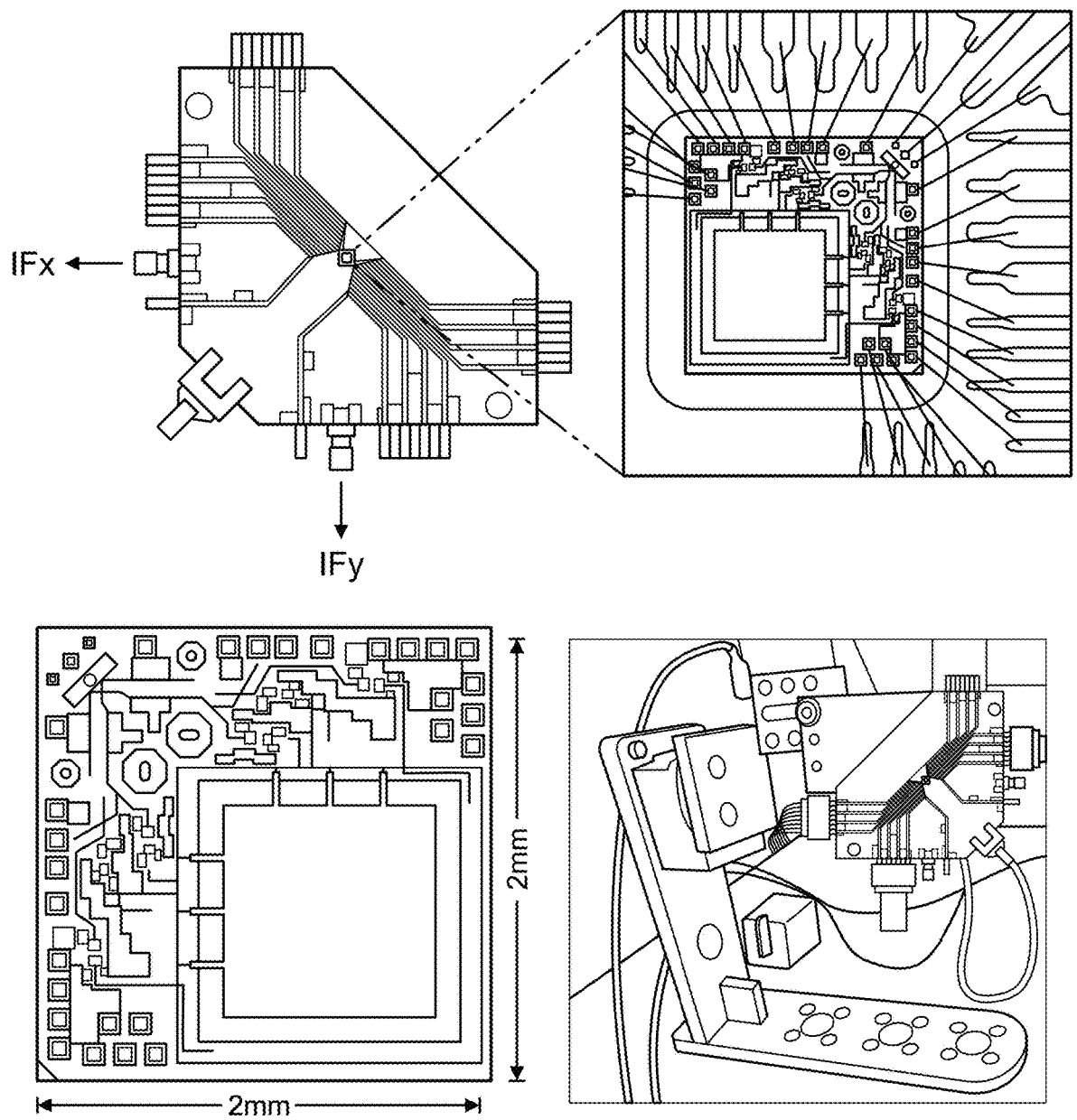
FIGS. 34(*a*)-(*c*) depict a chip photograph, board-level packaging, and measurement set up along with free-space radiated measurements including receiver gain, effective isotropic sensitivity, and an example link for a 400 Mbps 16-QAM transmission according to an embodiment of the present invention.
Figure 34B:
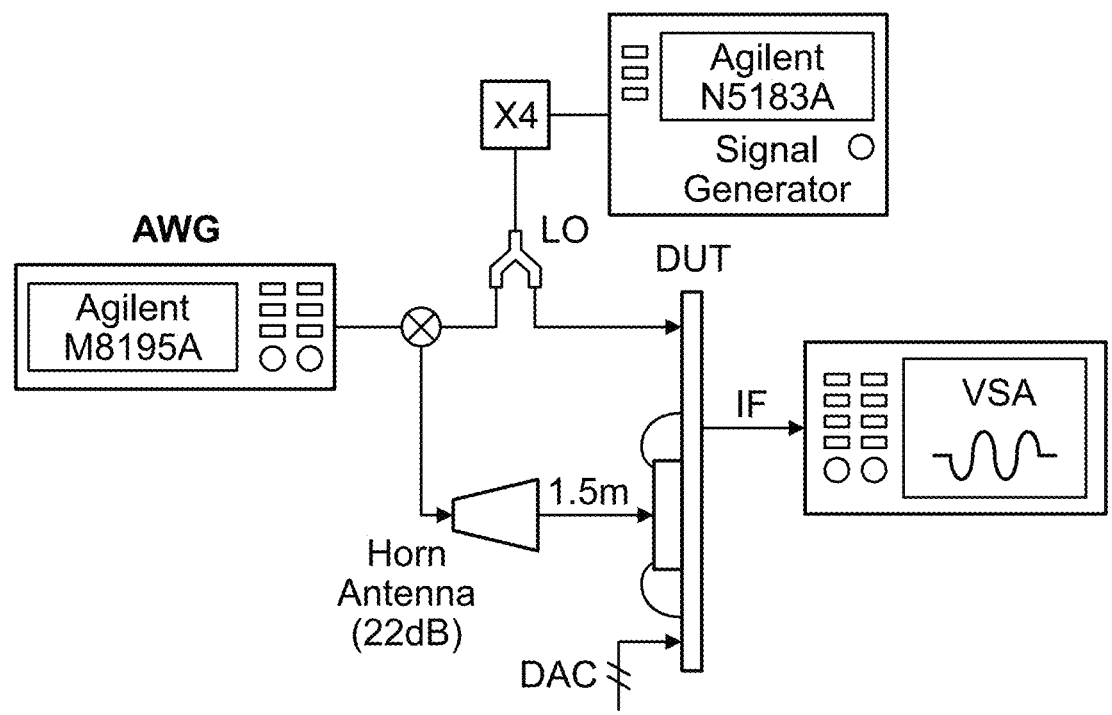

The chip is fabricated in a 65-nm bulk CMOS process and occupies an area of 2 mm×2 mm. The chip under test is bonded to a Rogers PCB where the LO power and IF is fed through PCB transmission lines into the chip through wire bonds. FIG. 34(a) shows the chip photo along with the setup photo. The measurement setup system is illustrated in FIG. 34(b). The IF signal generated by a 65GS/s arbitrary waveform generator is mixed with a 70 GHz LO, amplified by a power amplifier, and delivered to a 22 dB gain horn antenna. The PCB is placed on a 2-axis rotation stage 1.5 m from the horn antenna to characterize the pattern.

Figure 34C:
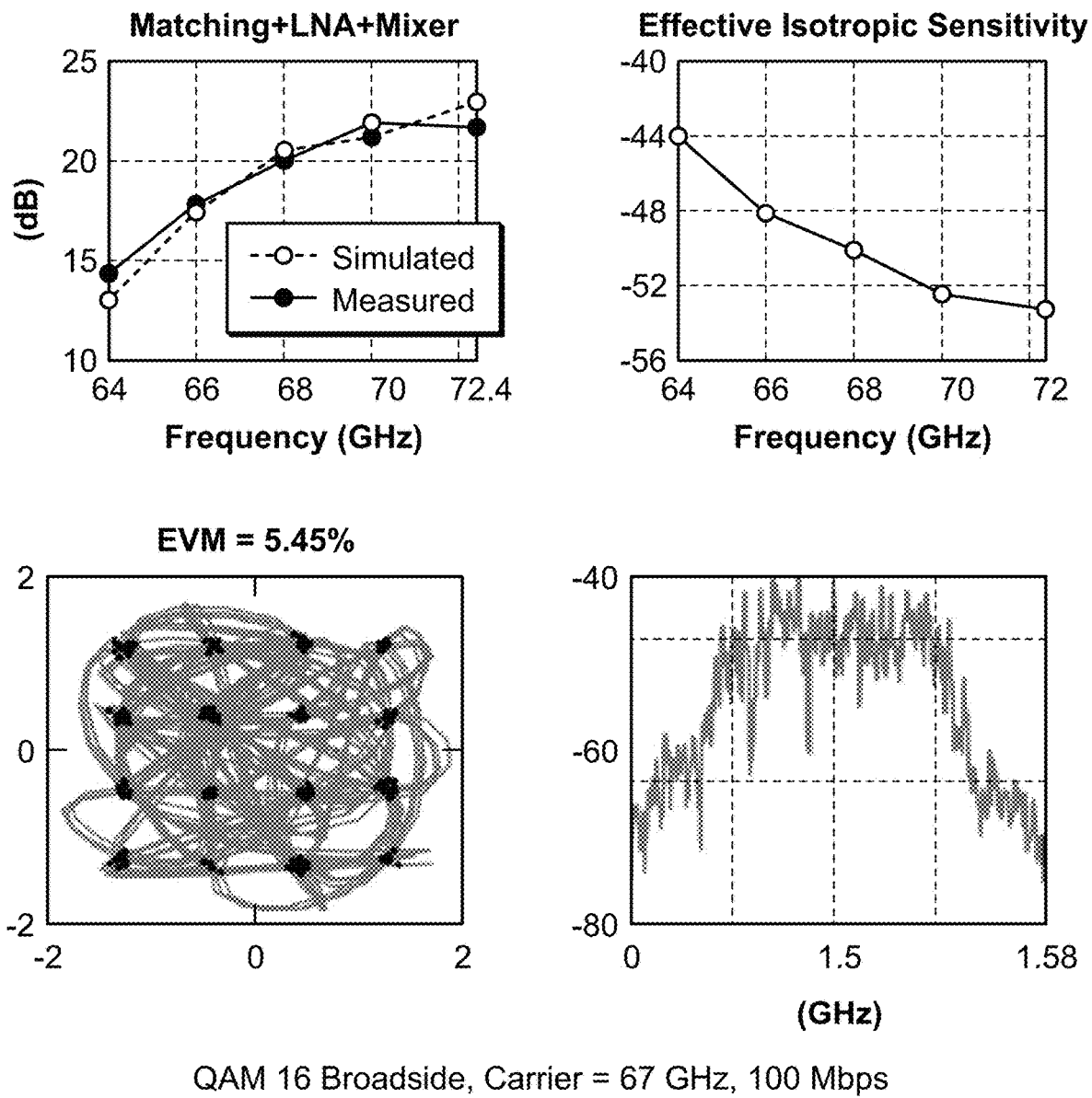

All measurements are carried out in free space and board losses are included in the measurements. The receiver chain achieves a peak gain of 23 dB at 72.4 GHz, as shown in FIG. 34(c). The lower 3 dB bandwidth is measured to be 65 GHz. The upper frequency could not be measured due to equipment limitations. The sensitivity of the receiver is measured in a wireless setup which can be characterized by effective isotropic sensitivity (EIS). The EIS is a standard measurement for sensitivity in free-space radiated setup and captures the minimum incident power impinging on the receiver with an isotropic antenna required for the given SNR and bandwidth. The measured EIS around frequency of 70 GHz, which is shown in FIG. 34(c), for a 25 dB SNR and a 500 MHz bandwidth is −52 dBm. A 100 Mbps 16-QAM link is demonstrated with EVM=5.45% with a carrier frequency of 67 GHz.

Figure 35:
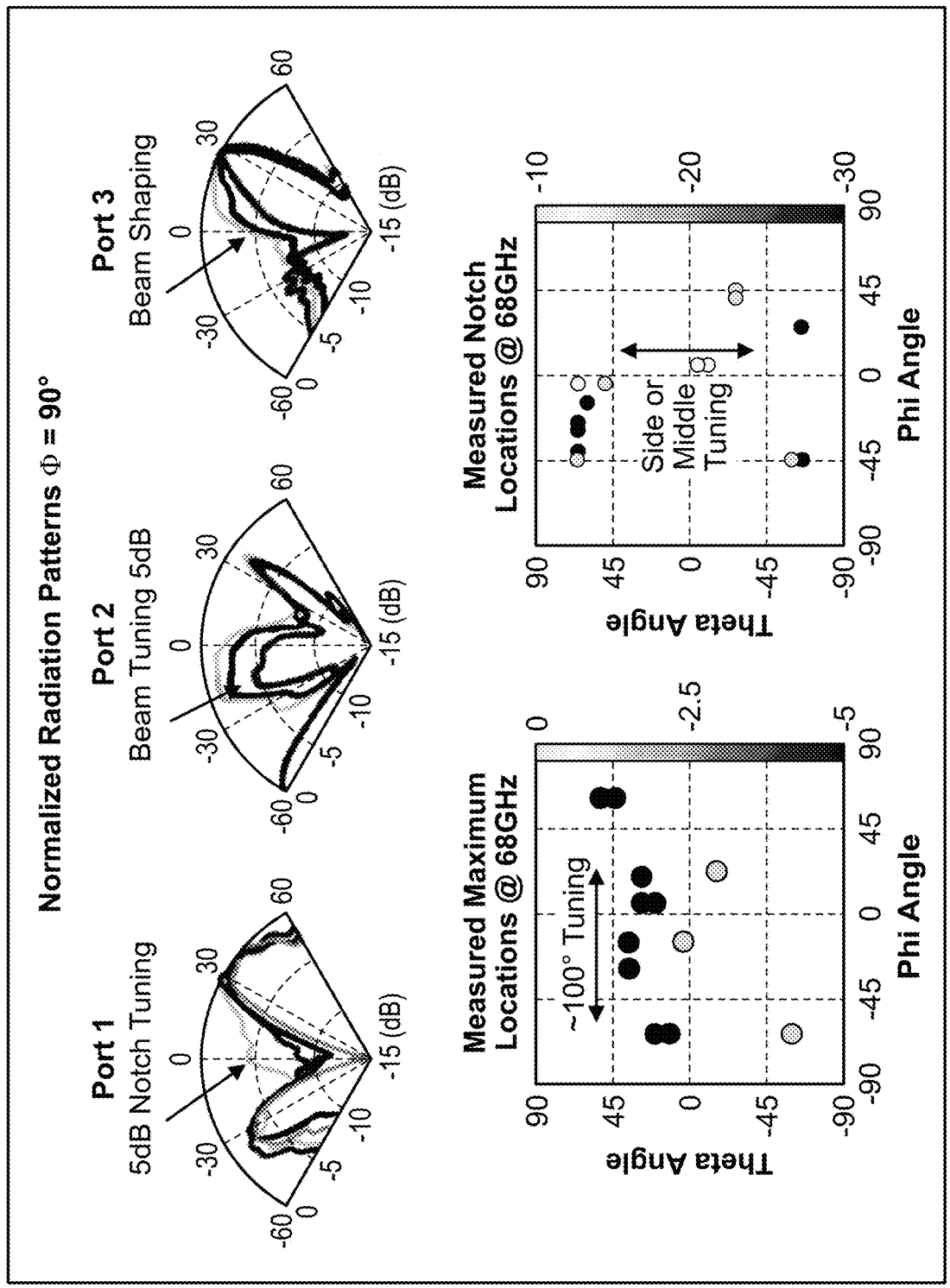
FIG. 35 depicts a selected Radiation pattern showing pattern tunability with substrate height of 360 μm at 64 GHz and substrate height of 290 μm at 72.4 GHz according to an embodiment of the present invention.

The receiver has 192 port patterns and FIG. 35 shows a subset of the measured patterns along the H-plane to demonstrate the key functionalities of beam steering. The location of the beam maxima can be varied by 100°, while the notch can be varied either at broadside or at a large angle. This creates a set of patterns that the Rx can assume under given near-field boundary conditions or under signal/interferer incidence. The measured subset of the patterns shows single and dual beam patterns as well as notch and beam shaping capabilities across the ports at 70 GHz. Beam patterns are digitally selected by changing the switching capacitors ON/OFF combination every 20 ms, and the received power is recorded at each incidence angle across the 2D incidence plane. Since the design is symmetrical in X and Y polarization, three ports on X-polarization are plotted here.

Figure 36A:
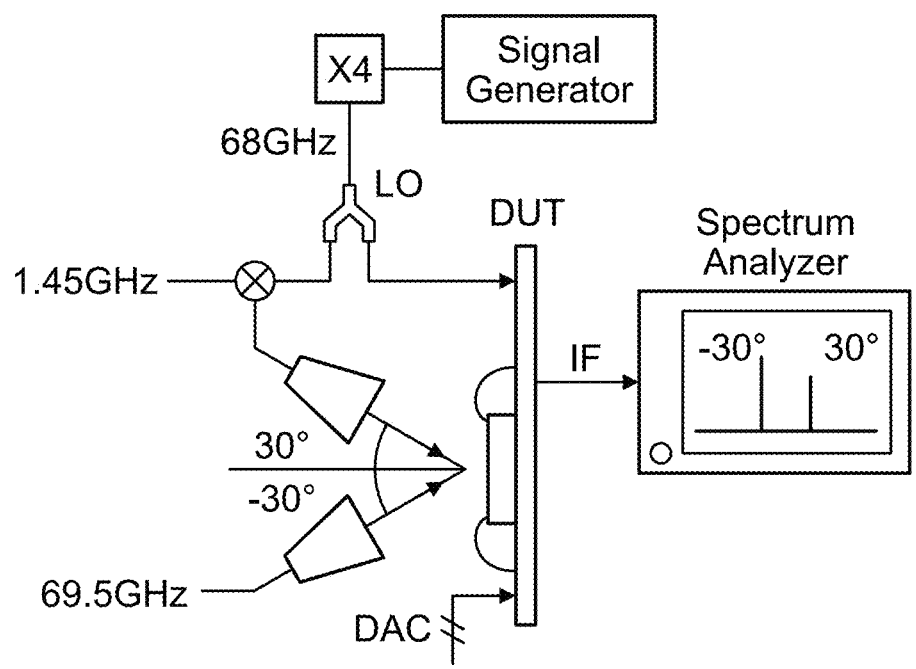
FIG. 36(*a*) depicts setup for interference rejection according to an embodiment of the present invention.
Figure 36B:
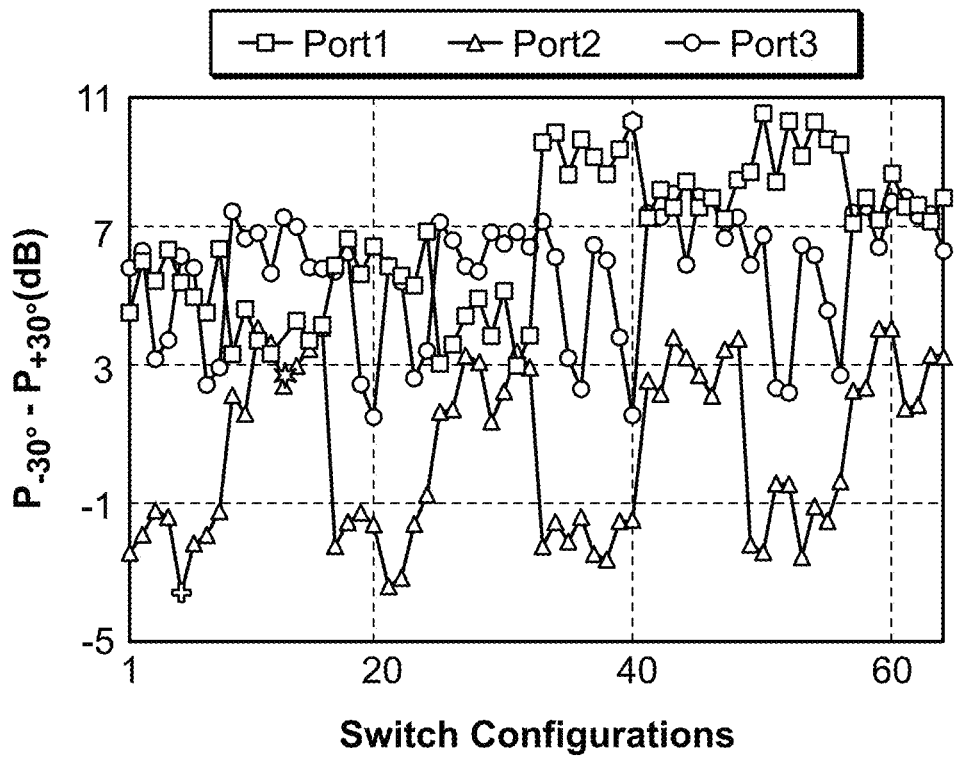
Figure 36C:
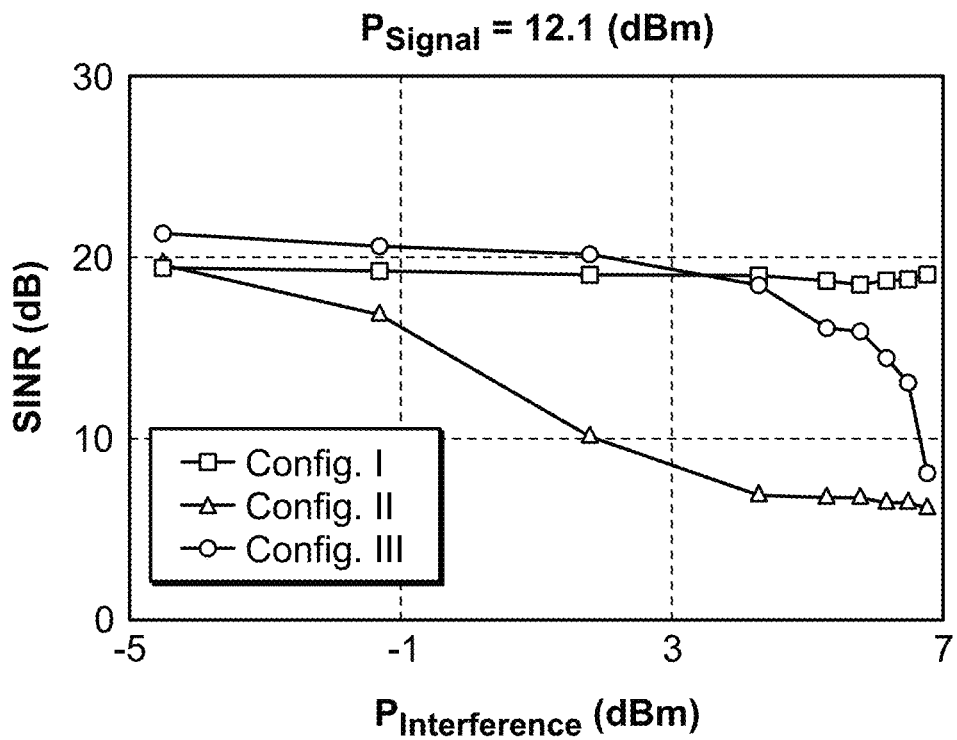
Figure 36D:
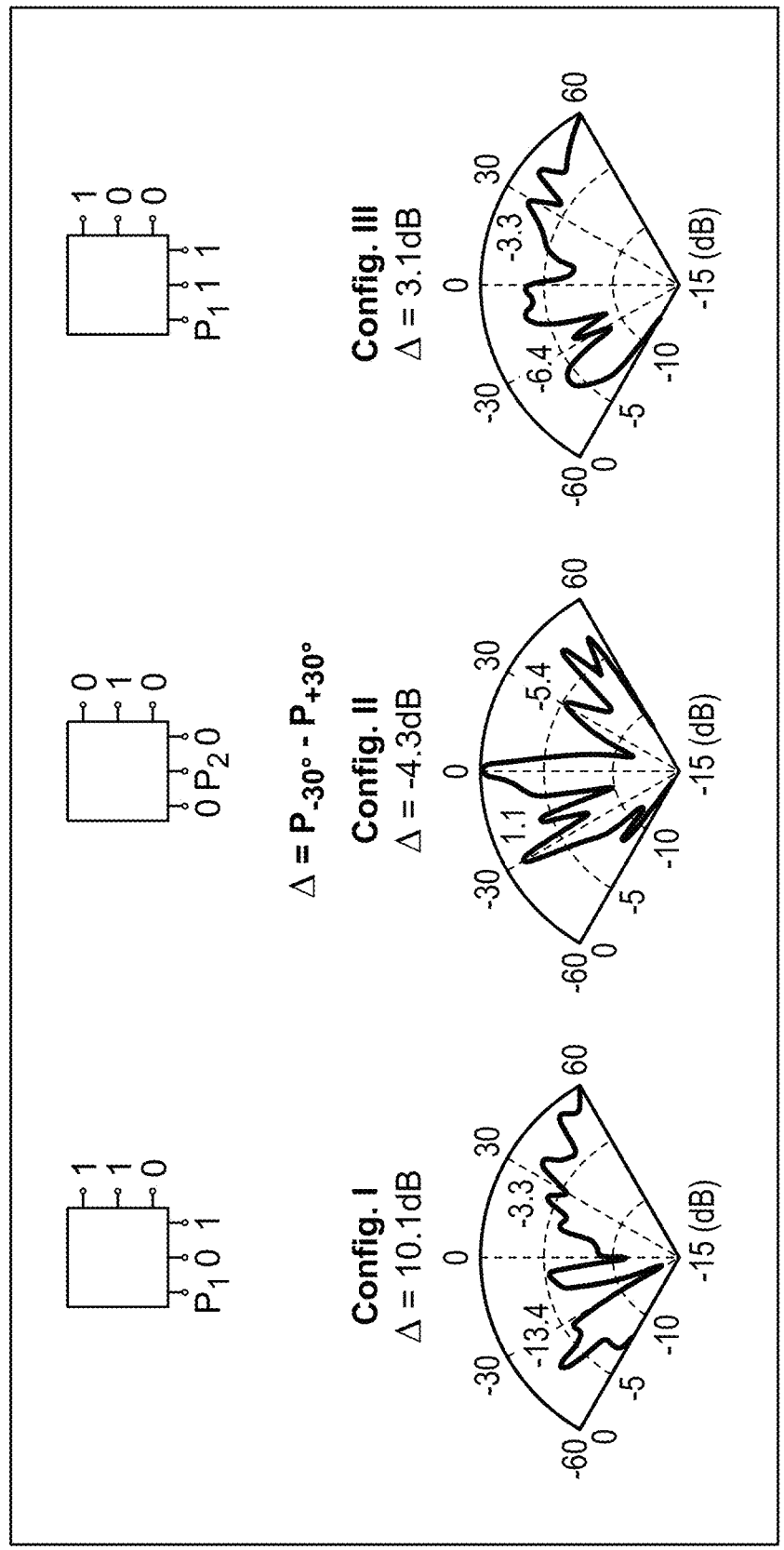

The interference rejection experiment is shown in FIG. 36(a)-(d). To characterize the spatial rejection under different driving conditions, two single tunes sources with carrier frequency 68 GHz and IF modulation frequency of 1.5 GHz and 1.45 GHz is placed at +30° and −30°. The measurement setup is shown in FIG. 36(a). The output spectrum is measured across all 3 ports on one polarization by covering all switch combinations. The resulting difference between two frequency spectrums is plotted in FIG. 36(b). Three exemplary configurations are chosen which provide: (1) a largest directivity at −30°; (2) a large directivity at +30° using another port; and (3) a large directivity at +30° using the same port as (1) (Port 1) to demonstrate interference rejection in a communication link by both port selection ((1) and (2)) and switch configuration ((1) and (3)). The port and switch combinations of those three configurations are shown in FIG. 36(d). FIG. 36(d) also shows the normalized radiation patterns of those configurations. The source at −30° is then replaced with a modulated source delivering a 100 MHz QPSK signal with IF carrier as 1.5 GHz with 12.4 dBm power into the horn antenna. It is anticipated from the pattern that the configurations with large directivity at −30° (config. (I)) would provide interferer rejection on the antenna surface, while (config. (II)) would be more susceptible to interferer. The SINR/EVM is recorded using VSA by varying the power level of the interference into the horn antenna, as shown in FIG. 36(c), confirms that configuration II is subjective to interference at just −2 dBm interference power level, while configuration I with 10.1 dB suppression maintains 20 dB SINR across −3 to 7 dBm interference power.

A comparison table is shown in FIG. 37. The sensitivity assumes 25 dB SNR while
the corresponding EVM can be estimated using $$SNR = -\left(PAPR + 20 \times \log_{10}\frac{EVM}{100\%}\right).$$

This enables simultaneous pattern and polarization diversity with on-chip antenna integration.

CONCLUSION

As such, embodiments generally disclosed herein are a sub-wavelength multi-port codesign approach between the unit transceiver element and the integrated EM interface to enable a generalized broadband MIMO array with individually programmable element patterns. The co-design approach allows processing of radiated signals at the antenna level distinct from classical arrays. The transmitter and receiver architectures with the integrated EM interface are implemented in 65-nm CMOS and have a bandwidth of 37-73 GHz. Wireless links with data rates up to 12 Gb/s are demonstrated across the spectrum with a wide range of reconfigurability of the active EM interface. The multifunctional EM interface and the broadband transceivers can enable future efficient and compact MIMO arrays for reliable links exploiting frequency, spatial, pattern and polarization diversities.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A multi-port antenna transceiver system, comprising:
a single antenna; and
a plurality of communicating devices coupled to the single antenna, each communicating device comprising a transmitter, a receiver, or a transceiver;
wherein an amplitude and phase of each of the communicating devices is individually controlled to shape at least one element lobe or at least one element notch of one or more element patterns for the single antenna.

2. The transceiver system of claim 1, further comprising a multi-port matching network coupled between the antenna and the plurality of the communicating devices.

3. The transceiver system of claim 1, wherein the element patterns are rotated towards an element maximum to increase scan range.

4. The transceiver system of claim 1, wherein a transmitter element notch of the element patterns is rotated towards a grating lobe to suppress grating lobe radiation.

5. The transceiver system of claim 1, wherein the element patterns are rotated to suppress side lobes.

6. The transceiver system of claim 1, wherein the element patterns are rotated to change polarization.

7. The transceiver system of claim 1, wherein the element patterns are configured to split into two or more directions to create multiple beams.

8. The transceiver system of claim 1, wherein a receiver element notch of the element patterns is rotated towards a spatial interferer to suppress the spatial interferer.

9. The transceiver system of claim 1, wherein at least two spatial beams are processed simultaneously by being de-multiplexed at the antenna.

10. An array of multi-port antenna transceiver systems arranged periodically, each multi-port antenna transceiver system comprising:
a single antenna; and
a plurality of communicating devices coupled to the single antenna, each communicating device comprising a transmitter, a receiver, or a transceiver;
wherein an amplitude and phase of each of the communicating devices is individually controlled to shape at least one element lobe or at least one element notch of one or more element patterns for the single antenna.

11. The array of claim 10, wherein each multi-port antenna transceiver system further comprises a multi-port matching network coupled between the antenna and the plurality of the communicating devices.

12. The array of claim 10, wherein the element patterns are rotated towards an element maximum to increase scan range.

13. The array of claim 10, wherein a transmitter element notch of the element patterns is rotated towards a grating lobe to suppress grating lobe radiation.

14. The array of claim 10, wherein the element patterns are rotated to suppress side lobes.

15. The array of claim 10, wherein the element patterns are rotated to change polarization.

16. The array of claim 10, wherein the element patterns are configured to split into two or more directions to create multiple beams.

17. The array of claim 10, wherein a receiver element notch of the element patterns is rotated towards a spatial interferer to suppress the spatial interferer.

18. The array of claim 10, wherein at least two spatial beams are processed simultaneously by being de-multiplexed at the antenna.

19. A method of operating an array of multi-port antenna transceiver systems, each multi-port antenna transceiver system including a single antenna and a plurality of communicating devices coupled to the single antenna, the method comprising:
individually controlling an amplitude and phase of each of the communicating devices to shape at least one element lobe or at least one element notch of one or more element patterns for the single antenna.

20. The method of claim 19, further comprising rotating the element patterns towards an array maximum to increase scan range.

21. The method of claim 19, further comprising rotating a transmitter element notch of the element patterns towards a grating lobe to suppress grating lobe radiation.

22. The method of claim 19, further comprising rotating the element patterns to suppress side lobes.

23. The method of claim 19, further comprising rotating the element patterns to change polarization.

24. The method of claim 19, further comprising configuring the element patterns to split into two or more directions to create multiple beams.

25. The method of claim 19, further comprising rotating a receiver element notch of the element patterns towards a spatial interferer to suppress the spatial interferer.

26. The method of claim 19, further comprising processing at least two spatial beams simultaneously de-multiplexing the spatial beams at the antenna.

27. A multi-port antenna transceiver system, comprising:
a single antenna; and
a plurality of ports coupled to the single antenna;
the plurality of ports having reconfigurable boundary conditions to shape at least one element lobe or at least one element notch of one or more element patterns for the single antenna.

28. The transceiver system of claim 27, further comprising a multi-port matching network coupled between the antenna and the plurality of ports.

29. The transceiver system of claim 27, wherein the reconfigurable boundary conditions comprise a plurality of switch capacitors and the switch capacitors are tuned to shape one or more element patterns.

30. The transceiver system of claim 27, wherein an element maximum is controlled through the reconfigurable boundary conditions.

31. The transceiver system of claim 27, wherein an element notch is controlled through the reconfigurable boundary conditions.

32. The transceiver system of claim 27, wherein polarization is changed through the reconfigurable boundary conditions.

* * * * *